United States Patent [19]
Hill et al.

[11] Patent Number: 5,915,048
[45] Date of Patent: Jun. 22, 1999

[54] METHOD AND APPARATUS FOR DISCRIMINATING IN-FOCUS IMAGES FROM OUT-OF-FOCUS LIGHT SIGNALS FROM BACKGROUND AND FOREGROUND LIGHT SOURCES

[75] Inventors: Henry A. Hill; Paul H. Oglesby; Douglas A. Ziebell, all of Tucson, Ariz.

[73] Assignee: Zetetic Institute, Tucson, Ariz.

[21] Appl. No.: 08/658,365

[22] Filed: Jun. 5, 1996

[51] Int. Cl.$^6$ ...................................................... G06K 9/40
[52] U.S. Cl. ............................................................ 382/255
[58] Field of Search ...................................... 382/100, 131, 382/255, 274, 275, 278, 321, 181; 356/345, 353

[56] References Cited

U.S. PATENT DOCUMENTS

| | | | |
|---|---|---|---|
| 4,213,706 | 7/1980 | Hill et al. .................................. | 356/353 |
| 4,304,464 | 12/1981 | Hill et al. .................................. | 350/321 |
| 5,248,876 | 9/1993 | Kerstens et al. ......................... | 250/561 |
| 5,592,563 | 1/1997 | Zahaui .................................... | 382/255 |

OTHER PUBLICATIONS

"Three–dimensional analysis of biological specimens utilizing image processing techniques", by David A. Agard and John W. Sedat, SPIE vol. 264 Applications of Digital Image Processing to Astronomy (1980), pp. 110–117.

"Quantitative Analysis of Electrophoretograms: A Mathematical Approach to Super–Resolution", by D. A. Agard, R. A. Steinberg, and R. M. Stroud, Analytical Biochemistry 111, 257–268 (1981).

Chapter 13, "Fluorescence Microscopy in Three Dimensions", by David A. Agard, Yasushi Hiraoka, Peter Shaw, and John W. Sedat, Methods in Cell Biology, vol. 30, pp. 353–377.

"Optical Sectioning Microscopy: Cellular Architecture in Three Dimensions", by David A. Agard, Ann. Rev. Biophys. Bioeng. 1984: 191–219.

"The Use of a Charge–Coupled Device for Quantitative Optical Microscopy of Biological Structures", by Yasushi Hiraoka, John W. Sedat, and David A. Agard, Science, vol. 238, pp. 36–41.

"Three–dimensional analysis by a microlens–array confocal arrangement", by Hags J. Taxon and Hags–Martin Uhde, Applied Optics, vol. 33, No. 4, Feb. 1, 1994, pp. 567–572.

"Charge–coupled Devices in Astronomy", by Jerome Kristian and Morley Blouke, pp. 69–74.

"Two–Photon Laser Scanning Fluorescence Microscopy", by Winfried Denk, James H. Strickler, and Watt W. Webb, Science, vol. 248, pp. 73–76.

(List continued on next page.)

*Primary Examiner*—Phuoc Tran
*Attorney, Agent, or Firm*—Cahill, Sutton & Thomas P.L.C.

[57] ABSTRACT

A method and apparatus for discriminating an in-focus image from an out-of-focus image which may be implemented in accordance with either or both an illumination procedure and a signal detection procedure includes collimating light rays emanating from a point in an object plane in an object to produce collimated rays. The collimated rays are focused onto a spot in an in-focus image plane. Light impinging on the spot is detected to measure the intensity thereof. The phase of a first portion of the collimated rays is shifted to produce a first quantity of phase-shifted rays, and the phase of a second portion of the collimated rays also is shifted to produce a second quantity of phase-shifted rays. The first and second quantities of phase-shifted rays are focused onto the spot. Light including the remaining non-phase-shifted rays and the first and second quantities of phase-shifted rays impinging on the spot is detected to measure the intensity thereof. The intensities measured for the remaining non-phase-shifted rays and the first and second quantities of phase-shifted rays are subtracted from the intensities measured for the rays focused on the spot in the in-focus image plane to cancel the effects of light from the out-of-focus image impinging on the spot to obtain an accurate representation of the object at the point in the object plane.

37 Claims, 28 Drawing Sheets

OTHER PUBLICATIONS

"Laser computed–tomography microscope", by Satoshi Kawata, O. Nakamura, T. Noda, H. Ooki, K. Ogino, Y. Kuroiwa, and S. Minami, Applied Optics, vol. 29, No. 26, Sep. 10, 1990, pp. 3805–3809.

"Scanned laser imaging for integrated circuit metrology", by James T. Lindow, Simon D. Bennett, and Ian R. Smith, SPIE vol. 565 Micron and Submicron Integrated Circuit Metrology (1985), pp. 81–87.

"Confocal Laser Microscope for Submicron Structure Measurement", By Th. Zapf and R. W. Wijnaendts–van–Resandt, Microelectronic Engineering 5 (1986) 573–580.

"Working with the confocal scanning UV–laser microscope: specific DNA localization at high sensitivity and multiple–parameter fluorescence", by Markus Montag, Jorg Kukulies, Reinhard Jorgens, Heinz Gundlach, Michael F. Trendelenburg, and Herbert Spring, Journal of Microscopy, vol. 163, Pt. 2, Aug. 1991, pp. 201–210.

"Spatial and dynamic changes in intracellular $Ca^{2+}$ measured by confocal laser–scanning microscopy in bullfrog sympathetic ganglion cells", by Kenji Kuba, Shao–Ying Hua and Mitsuo Nohmi, Neuroscience Research 10 (1991) 245–259.

"Optical modifications enabling simultaneous confocal imaging with dyes excited by ultraviolet–and visible–wavelength light", by C. Bliton, J. Lechleiter and D. E. Clapham, Journal of Microscopy, vol. 169, Pt. 1, Jan. 1993, pp. 15–26.

"Fundamental and Practical Limits in Confocal Light Microscopy", by J. B. Pawley, Scanning vol. 13, 184–198 (1991).

Chapter 14, "Quantitative Fluorescence Microscopy Using Photomultiplier Tubes and Imaging Detectors", by John E. Wampler, Methods in Cell Biology, vol. 29, pp. 239–267.

Chapter 2, "Validation of an Imaging System: Steps to Evaluate and Validate a Microscope Imaging System for Quantitative Studies", by Zeljko Jericevic, Brent Wiese, Joseph Bryan and Louis C. Smith, Methods in Cell Biology, vol. 30, pp. 47–83.

"Tandem–Scanning Reflected–Light Microscope", by Mojmir Petran and Milan Hadravsky, Journal of the Optical Society of America, vol. 58, No. 5, May 1968, pp. 661–664.

"Real–time confocal scanning optical microscope", by G. Q. Xiao, T. R. Corle, and G. S. Kino, Appl. Phys. Lett., vol. 53, No. 8, Aug. 22, 1988, pp. 716–718.

"Incorporation of imaging into a temporal coherence sensor", by D. Hickman and C. J. Duffy, Optics Letters, vol. 13, No. 10, Oct. 1988, pp. 898–900.

"Development of an Interferometric Technique for Reduction of Background Radiation at 10 $\mu$m", by Henry A. Hill, Final Technical Report, Office of Naval Research Contract No. N00014–81–C–0794, Aug. 9, 1983, pp. 1–21.

"Four Stellar–Diameter Measurements by a New Technique: Amplitude Interferometry", by D. G. Currie, S. L. Knapp, and K. M. Liewer, The Astrophysical Journal, 187:131–134, Jan. 1, 1974.

"A new radio interferometer and its application to the observation of weak radio stars", by M. Ryle, Proceedings of the Royal Soc. of London, A211, 351–75 (1952) Q.41.L72.

METHOD AND APPARATUS FOR DISCRIMINATING IN-FOCUS IMAGES FROM OUT-OF-FOCUS LIGHT SIGNALS FROM BACKGROUND AND FOREGROUND LIGHT SOURCES

BACKGROUND OF THE INVENTION

The invention relates to techniques for rapidly, accurately producing an in-focus image of an object, or a cross-section thereof, wherein the effect of light signals from out-of-focus foreground and/or background light sources are mostly eliminated. Confocal microscopy is finding many applications in life sciences, ophthalmology, industrial inspection, and semiconductor line-width metrology. This is because of the unique three-dimensional (3D) imaging capability of these instruments.

There are two general approaches for determining the volume properties of 3-D microscopical specimens. Such approaches are based on conventional microscopy and confocal microscopy. Generally, the conventional microscopy approach requires less time to acquire the data but more time to process the data for a 3-D image, compared to the confocal microscopy approach. The wide field method (WFM) (D. A. Agard and J. W. Sedat, *Proc. Soc. PhotoOpt. Instrum. Eng.*, Vol. 264, p. 110, 1980; D. A. Agard, et al., *Anal. Biochem.*, Vol. 111, p. 257, 1981; D. A. Agard, et al., *Methods Cell Biol.*, Vol. 30, p. 353, 1989; D. A. Agard, *Annu. Rev. Biophys. Bioeng.*, Vol. 13, p. 191, 1984; Y. Hiroaka, et al., *Sci.*, Vol. 238, p. 36, 1987; W. Denk, et al., *Sci.*, Vol. 248, p. 73, 1990) uses a conventional microscope to sequentially acquire a set of images of adjacent focus planes throughout the volume of interest. Each image is recorded using a cooled charge-coupled device (CCD) image sensor (J. Kristian and M. Blouke, *Sci. Am.*, Vol. 247, p. 67, 1982) and contains data from both in-focus and out-of-focus image planes.

In a conventional imaging system, when a part of the object to be imaged is axially displaced from its best focus location, the image contrast decreases but the brightness remains constant so that displaced, unfocused parts of the image interfere with the view of focused parts of object.

If the system's point-spread function is known and images are obtained for each independent section of the object, known computer algorithms can be applied to such images to effectively remove the signal contributed by the out-of-focus light and produce images that contain only in-focus data. Such algorithms are of several distinct types, are referred to as "computer deconvolutions", and generally require expensive computer equipment and considerable computing time.

The technique of laser computed tomography is implemented using a conventional microscope. The system discussed by S. Kawata, et al., *Appl. Opt.*, Vol. 29, p. 3805, (1990) is based on a principal that is closely related to the technique of X-ray computed tomography, but uses 3-D volume reconstruction rather than 2-D slice reconstruction. Projected images of a thick 3-D sample are collected with a conventional transmission microscope modified with oblique illumination optics, and the 3-D structure of the interior of the sample is reconstructed by a computer. Here, the data is acquired in a time short compared to that required to process data for a 3-D image. In one experiment by Kawata et al., op. cit. , the 80×80×36-voxel reconstruction required several minutes to collect all projections and send them to a minicomputer. Approximately thirty minutes then were required for digital reconstruction of the image, in spite of utilizing a vector processor at a speed of 20 million floating point operations per second (MFLOPS).

In a conventional point or pinhole-confocal microscope, light from a point source is focused within a very small space, known as a spot. The microscope focuses light reflected from, scattered by, or transmitted through the spot onto a point detector. In a reflecting point-confocal microscope the incident light is reflected or back-scattered by that portion of the sample in the spot. Any light which is reflected or back-scattered by the sample outside of the spot is not well focused onto the detector, thus it is spread out so the point detector receives only a small portion of such reflected or back-scattered light. In a transmitting point-confocal microscope, incident light is transmitted unless it is scattered or absorbed by that portion of the sample in the spot. Generally, the point source and point detector are approximated by placing masks containing a pinhole in front of a conventional light source and conventional detector, respectively.

Similarly, in a conventional slit-confocal microscope system, light from a line source is focused into a very narrow elongated space, which is also known as a spot. The slit-confocal microscope focuses light reflected from, scattered by or transmitted through the spot onto a line detector. The line source and line detector can be approximated using a mask with a slit in front of a conventional light source and row of conventional detectors, respectively. Alternately, a line source can be approximated by sweeping a focused laser beam across the object to be imaged or inspected.

Since only a small portion of the object is imaged by the confocal microscope, either the object to be imaged must be moved, or the source and detector must be moved, in order to obtain sufficient image data to produce a complete 2-D or 3-D view of the object. Previous slit-confocal systems have moved the object linearly in a direction perpendicular to the slit to obtain successive lines of 2D image data. On the other hand, point-confocal systems having only one pinhole have to be moved in a 2-D manner in order to acquire 2-D image data and in a 3-D manner in order to acquire a 3-D set of image data. The raw image data are typically stored and later processed to form a 2-D cross-section or a 3-D image of the object that was inspected or imaged. Because of the reduced sensitivity to the out-of-focus images, the processing operation is considerably simpler in comparison to that required when processing data obtained in conventional microscopy approach.

In a system known as the Tandem Scanning Optical Microscope (TSOM), a spiral pattern of illumination and detector pinholes are etched into a Nipkow disk so, as the disk rotates, the entire stationary object is scanned in 2-D. In terms of the optical processing, the TSOM is basically a single point confocal microscope with a means for efficiently scanning a 2-D section one point at a time.

Examples of two techniques implemented to reduce the amount of scanning required to obtain a 2-D image with a confocal arrangement are found in the work of H. J. Tiziani and H. -M. Uhde, *Appl. Opt.*, Vol. 33, p. 567, (1994) and in the patent of Kerstens et al. (U.S. Pat. No. 5,248,876 issued September 1993). The microlens-array confocal arrangement of Tiziani and Uhde op. cit. has out-of-focus image discrimination that is the same as using a multipin-hole source and detector in a confocal configuration. Such a system allows for a number of points to be examined simultaneously but at a compromise in discrimination against out-of-focus images. The higher the density of microlenses, the poorer the ability of the system to discriminate against out-of-focus images, and consequently, an increase in complexity and cost of the computer deconvolutions required to produce a 3-D image. Further, the Tiziani and Uhde op. cit. system has serious limitations in axial range. This range cannot exceed the focal length of the microlens, which is proportional to the diameter of the microlens for a given numerical aperture. Therefore, as the density of the microlenses is increased, there is an associated decrease in the permitted axial range.

The Kerstens et al. op. cit. system incorporates a number of pinholes and matching pinpoint detectors in a confocal arrangement to allow for a number of points to be examined simultaneously. However, as noted in the preceding paragraph, this gain is at a compromise in discrimination against out-of-focus images and as a result an increase in complexity and cost of required subsequent computer deconvolutions. The higher the density of pinholes, the poorer the ability of the system to discriminate against out-of-focus images. The highest discrimination would be achieved when using only one pinhole.

Application of confocal microscopes to inspection of electronics was suggested in Sapf et al., *Microelectronic Engineering*, Vol. 5, p. 573 (1986) and Lindow, et al., *SPIE*, Vol. 565, p. 81 (1985). The axial discrimination provided by confocal systems make them useful in the semi-conductor manufacturing environment. For example, such systems could provide for improved inspection of height dependent features such as delamination, blisters, and thickness of structures and coatings. However, there are some problems associated with using confocal imaging systems for inspection of electronics. For example, single pinhole systems require too much time for scanning the object in two directions. Optical systems for scanning a laser beam over the object are too complex; and the spinning disk approach used in the previous Tandem Scanning Microscope resulted in alignment and maintenance problems.

Thus, none of the prior systems can be configured for rapid and/or reliable three dimensional tomographic imaging, especially in the field of inspection or imaging.

The number of different depth slices required (and therefore the amount of image data collected) depends upon the range of height that must be measured, and also upon the desired height resolution and performance of the optical system. For typical electronics inspection, images of 10 to 100 different depth slices would be required. Furthermore, data in several color bands may be required to differentiate materials. In confocal imaging systems, a separate 2-D scan is required for each desired elevation. If data for multiple color bands is desired, then multiple 2-D scans at each elevation are required. By shifting the focus level, similar data can be obtained from adjacent planes and a 3-D intensity data set can be acquired.

Although the confocal approach is more straightforward and works better, for example in confocal fluorescence work, when the concentration of stained structure is high, the conventional microscopy approach still has several practical advantages. The most important of these is that the latter can utilize dyes that are excited in the ultraviolet (UV) range and these often seem more robust and efficient than those excited in the visible range. Although, a UV laser can be incorporated as the light source of a confocal microscope (M. Montag, et al., *J. Microsc (Oxford)*, Vol. 163 (Pt. 2), p. 201, 1991; K. Kuba, et al., *Neurosci. Res.*, Vol. 10, p. 245, 1991; C. Bilton, et al., *J. Microsc.*, Vol. 196, p. 15, 1993), or UV dyes can be excited with infrared (IR) light using the "two photon" technique (W. Denk, et al., op. cit.), these techniques involve considerable expense and practical difficulty.

Furthermore, the cooled CCD detectors used in conventional microscopy systems collect the data in parallel rather than serially, as does the photomultiplier (PMT) in a confocal microscopy system. As a result, if the CCD can be made to read out more rapidly without degrading its performance, the 3-D data recording rate of the conventional microscopy system may prove to be significantly higher than that of the confocal microscopy system, even though the time needed for computer deconvolution computations means that there might be an additional delay before the data could be actually viewed as a 3-D image.

The signal-to-noise ratio in relation to statistical accuracy must also be considered when making a choice between a CCD detector used to record in parallel a 2-D data array and a slit or pinhole confocal microscope. The well capacity of a 2-D CCD pixel is of the order of 100,000 electrons. This limits the statistical accuracy that can be achieved in a single exposure as compared to that achievable with other photoemissive detectors such as PMT's or photovoltaic devices. Consequently, for those applications where the out-of-focus background contributions are significantly larger than the in-focus image signals, consideration of the signal-to-noise ratio may lead to the conclusion that a 1-D parallel recording of data in a slit confocal microscope will perform better than a 2-D recording of data in a standard microscope configuration or a point by point recording of data in a single pinhole confocal microscope will perform better than a 1-D parallel recording of data in a slit confocal microscope, all other considerations being equal.

When the consideration of statistical accuracies as measured by the signal-to-noise ratios influences the selection of a system such as a slit confocal microscope over a standard microscope, or a single pinhole confocal microscope over a slit confocal microscope, the residual signals from the out-of-focus images for the system chosen can be comparable to or larger than the in-focus signals. Such is the case for example when examining deep into biological samples at optical wavelengths where scattering of optical radiation dominates over absorption. In this case, one is left with the need for a lengthy computer deconvolution, i.e. long compared to the time required to acquire the data. Note that this is in general true for the single pinhole confocal microscope as well as the slit confocal microscope when looking for an in-focus image signal that is much smaller than the residual out-of-focus image signals.

Although it is easier to accurately digitize the signal from a CCD detector than from a PMT (J. B. Pawley, *Scanning*, Vol. 13, p. 184, 1991), the PMT is a single device that can be accurately characterized, whereas the CCD is actually a large array of discrete detectors and additional noise is associated with correcting for the pixel-to-pixel variations in sensitivity and offset that characterize its operation (Y. Hioraka, et al., op. cit.; J. E. Wampler and K. Kutz, *Methods Cell Biol.*, Vol. 29, p. 239, 1989; Z. Jericevic, et al., *Methods Cell Biol.*, Vol. 30, p. 47, 1989).

It should be noted that the above distinction between the photodetectors used in the two methods of 3-D microscopy should not be considered to be complete, because the cooled CCD detector is the most suitable photodetector for those confocal microscopes that accomplish the scanning function by using holes in a spinning disk (M. Pétran, et al., *J. Opt. Soc. Am.*, Vol 58, p.661, 1968; G. Q. Xiao, et al., *Appl. Phys. Letts.*, Vol. 53, p. 716, 1988).

D. Hickman, et al., *Opt. Letts.*, Vol. 13, p. 898 (1980) separated a highly coherent light beam generated by a laser from a non-coherent background (non-laser-generated background) by relying on the differences in temporal coherence to separate the desired and background signals. Their technique is not applicable to the more commonly encountered non-coherent sources or when the background is generated by scattering of the coherent light bear, itself.

FIG. 6 of Hill (1983 Final Report, ONR Contract No. 00014-81-C-0794) shows a system where the images of two telescopes are combined by the use of a beam splitter system. A variant of this type has been used by Currie et al., *Astrophys. J.*, Vol. 187, p. 131 (1974) to recover the diffraction limit of the telescope while observing through the earth's atmosphere. In that work, the properties of the autocorrelation function of the electronic signals $S_1$ and $S_2$ from the two detectors $D_1$ and $D_2$, respectively, detecting the two light beams out of the beam splitter were used to obtain the diffraction-limited performance of the instrument. However, any background at all greatly degrades the ability of the Currie, et al., op. cit. application to achieve the diffraction-limited performance.

An early variant of the concept shown in FIG. 6 of Hill, op. cit. was applied to radio astronomy by M. Ryle, *Proc. Roy. Soc. of London*, Vol. A211, p. 351 (1951). Ryle op. cit. used the technique to separate the radio signal of a point source from an extended uniform source by introducincg an alternating length of time delay line between the electronic signals received from two separate radio antenna detector units. The signals are combined in this case electronically instead of by using a beam splitter system. The degree to which the background discrimination can be achieved depends on how accurately the responsivity of the two respective detectors are known and compensated in the subsequent signal processing, on how immune the electronics in the variable delay-line leg are to changes in the delay-line length, and on the degree of narrow band filtering of the radio signals that is used. If detector arrays are used for $D_1$ and $D_2$, then there must be an independent alternating length of delay line for each complementary pair of detectors in the detector arrays. Also, this technique is not applicable to higher-frequency electromagnetic signals, such as those found in the visual range.

Hill and Oglesby in Hill op. cit. noted that a system such as shown in FIG. 6 of the Hill op. cit. report could be useful in measuring the amount of scattered light in the line-of-sight. In that system, the difference of the normalized electronic signals $S_1$ from detector $D_1$ and $S_2$ from detector $D_2$ contains only contributions for the common field of view (FOV) of the two telescopes, where the point source response functions for $S_1$ and $S_2$ are used for normalization. Application of each of the three above described variants is limited to highly localized light point sources. The filters $Q_1$ and $Q_2$ are used in order to meet the narrow wavelength passband requirements for those applications where the source itself is not narrowband.

What is needed is a system that combines the parallel data acquisition feature of a conventional microscopy system, reduced sensitivity to pixel-to-pixel variations in multidetector systems such as the CCD, the reduced sensitivity of the image data to out-of-focus images inherent in confocal microscopy systems, and the reduced requirement of computer deconvolutions associated with reduced sensitivity to out-of-focus images.

SUMMARY OF THE INVENTION

It is an object of the invention to provide a tomographic imaging technique which conveniently reduces or eliminates the effect of light from out-of-focus image points.

Accordingly, it is an object of the invention to provide rapid, reliable three dimensional tomographic imaging.

It is another object of the invention to provide an improved technique for tomographic imaging wherein effects of out-of-focus light images are greatly reduced or eliminated.

It is another object of the invention to provide an improved technique for tomographic imaging wherein effects of observing through a turbulent medium are greatly reduced or eliminated.

It is another object of the invention to provide an improved technique for tomographic imaging wherein restrictions of the band width of the usable radiation are greatly reduced or eliminated.

It is another object of the invention to provide an improved technique for tomographic imaging wherein speckle imaging techniques can be employed to obtain diffraction limited images in the presence of a large background.

It is another object of the invention to provide an improved technique for tomographic imaging wherein a reference grid is superimposed on the image for improved metrological processes.

It is another object of the invention to provide an improved tomographic imaging technique which avoids the shortcomings of the above described prior art.

It is another object of the invention to provide an improved tomographic illumination technique.

It is further object of the invention to provide an improved tomographic illumination technique which reduces or avoids effects of illumination of object points outside of a desired object plane.

It is another object of the invention to provide an improved technique for tomographic illumination wherein effects of illuminating through a turbulent medium are greatly reduced or eliminated.

It is another object of the invention to provide an improved technique for tomographic illumination wherein restrictions of the bandwidth of the usable radiation are greatly reduced or eliminated.

It is another object of the invention to provide a tomographic imaging technique which allows simultaneous imaging of an object in separate image planes.

It is another object of the invention to provide a tomographic imaging technique which allows simultaneous imaging of an object at different wavelengths.

It is another object of the invention to provide a tomographic imaging technique which allows simultaneous imaging of an object in separate image planes and at different wavelengths.

It is another object of the invention to provide a convenient technique for tomographic imaging in a desired plane in an object despite movement thereof.

Briefly described, and in accordance with one embodiment thereof, the invention provides a method and system for discriminating an in-focus image from an out-of-focus image by collimating light rays emanating from a point in an object plane in an object to produce collimated rays. The collimated rays are focused onto a spot in an in-focus image plane. Light impinging on the spot is detected to measure its intensity. The phase of a first portion of the collimated rays is shifted to produce a first quantity of phase shifted rays, and the phase of a second portion of the collimated rays is shifted to produce a second quantity of phase shifted rays.

The first and second quantities of phase shifted rays are focused onto the spot. The first and second quantities of phase shifted rays impinging on the spot are detected to measure the intensity thereof The measured intensities are subtracted to cancel the effects of light from the out-of-focus image to obtain an accurate representation of the object. In one embodiment, the object is illuminated by collimating radiation from a source and directing the collimated radiation onto a grid. Rays emanating from a point of the grid are collimated. The collimated rays are focused onto object material at a point in an object plane, to thereby illuminate the object material. The rays emanating from the illuminated object are imaged onto a spot in an image plane and the intensity due to the imaged rays is measured. The phases of first and second quantities of the collimated rays focused onto the spot in the image plane are shifted. The phase-shifted first and second quantities of the collimated rays are focused onto the spot in the image plane. The first and second quantities of phase shifted rays impinging on the spot are detected to measure the intensity thereof. The intensities measured are combined to produce an accurate image of the illuminated object material. The grid then is shifted relative to the object material to illuminate portions of the object material not previously illuminated. The procedure then is repeated. In one embodiment, the object is illuminated by collimating radiation from a source and directing the collimated radiation onto a grid. Rays emanating from a point of the grid are collimated. The collimated rays are focused onto object material at a point in an object plane, to thereby illuminate the object material. The ravs emanating from the illuminated object are imaged onto a spot in an image plane and the intensity due to the Imaged rays is measured. The phases of first and second quantities of the collimated rays focused onto object material at a point in the object plane are shifted. The phase-shifted first and second quantities of the collimated rays are focused onto the object material to illuminate it. Phase-shifted rays emanating from the illuminated object material are imaged onto the spot, and the intensity due to the imaged rays is measured. The intensities measured are combined to produce an accurate image of the illuminated object material. The grid then is shifted relative to the object material to illuminate portions of the object material not previously illuminated. The procedure then is repeated. In one embodiment, the collimated rays are split into first and second quantities The first quantity of collimated rays is focused onto a first spot in a first in-focus image plane, and the second quantity of collimated rays is focused onto a second spot in a second in-focus image plane. The intensities of light impinging on the first and second spots are measured before and after shifting the phase of a first portion of the first quantity of collimated rays to produce a first quantity of phase shifted rays and also shifting the phase of a second portion of the first quantity of collimated rays, to produce a second quantity of phase shifted rays, and shifting the phase of a first portion of the second quantity of collimated rays to produce a third quantity of phase shifted rays and also shifting the phase of a second portion of the second quantity of collimated rays, to produce a fourth quantity of phase shifted rays. The first and second quantities of phase shifted rays are focused onto the first spot, and the third and fourth quantities of phase shifted rays are focused onto the second spot. The intensity due to first and second quantities of phase shifted rays impinging on the first spot and the intensity due to the third and fourth quantities of phase shifted rays impinging on the second spot are measured. The measured intensities are combined to cancel the effects of out-of-focus light and simultaneously obtain two representations of the object at two different points in the object plane.

DETAILED DESCRIPTION OF THE PREFERRED EMBODIMENTS

The present invention permits the separation of a cross-sectional "slice" of three-dimensional image space or region from background light produced by superimposed out-of-focus images of structures before and behind the slice under scrutiny. A section or slice of an object under scrutiny may be illuminated with a spatial pattern, such as a grid pattern, while the regions of the object before and behind the illuminated slice remain in effect unilluminated. The technique of the invention may also be used to produce a grid pattern of fluorescence by a slice of an object, with the remaining regions of the object before and behind the slice under excitation (e.g., in a fluorescent condition) remains in effect in a nonfluorescent state. In accordance with the invention, tomographic illumination or fluorescence may be used separately or in conjunction with tomographic imaging The described tomographic techniques can separate a desired signal in an image plane from "background" and "foreground" signals generated by various mechanisms. Such background and foreground signals may be (1) out-of-focus images of sections of an object other than the slice being imaged, (2) scattering of a desired signal, (3) scattering of signals originating from sources other than the slice being imaged, and/or (4) thermal radiation. Scattering sites and thermal radiation sources may be located in the space before and/or behind the object slice under examination.

The "enabling technology" of the present invention which is common to tomographic illumination, tomographic fluorescence, and tomographic imaging is described herein only for tomographic imaging embodiments of the invention. Such description is particularly applicable to the use of tomographic imaging to examine a slice of an object which either is illuminated by a source of radiation or which itself is a source of radiation. Tomographic fluorescence with and without the support of tomographic imaging is applied to the study of normally non-radiating objects that can be put into a fluorescent state. Tomographic illumination in conjunction with the support of tomographic imaging is described with respect to the study of a slice of an object that either normally is non-radiating or is not illuminated.

Figure 1:
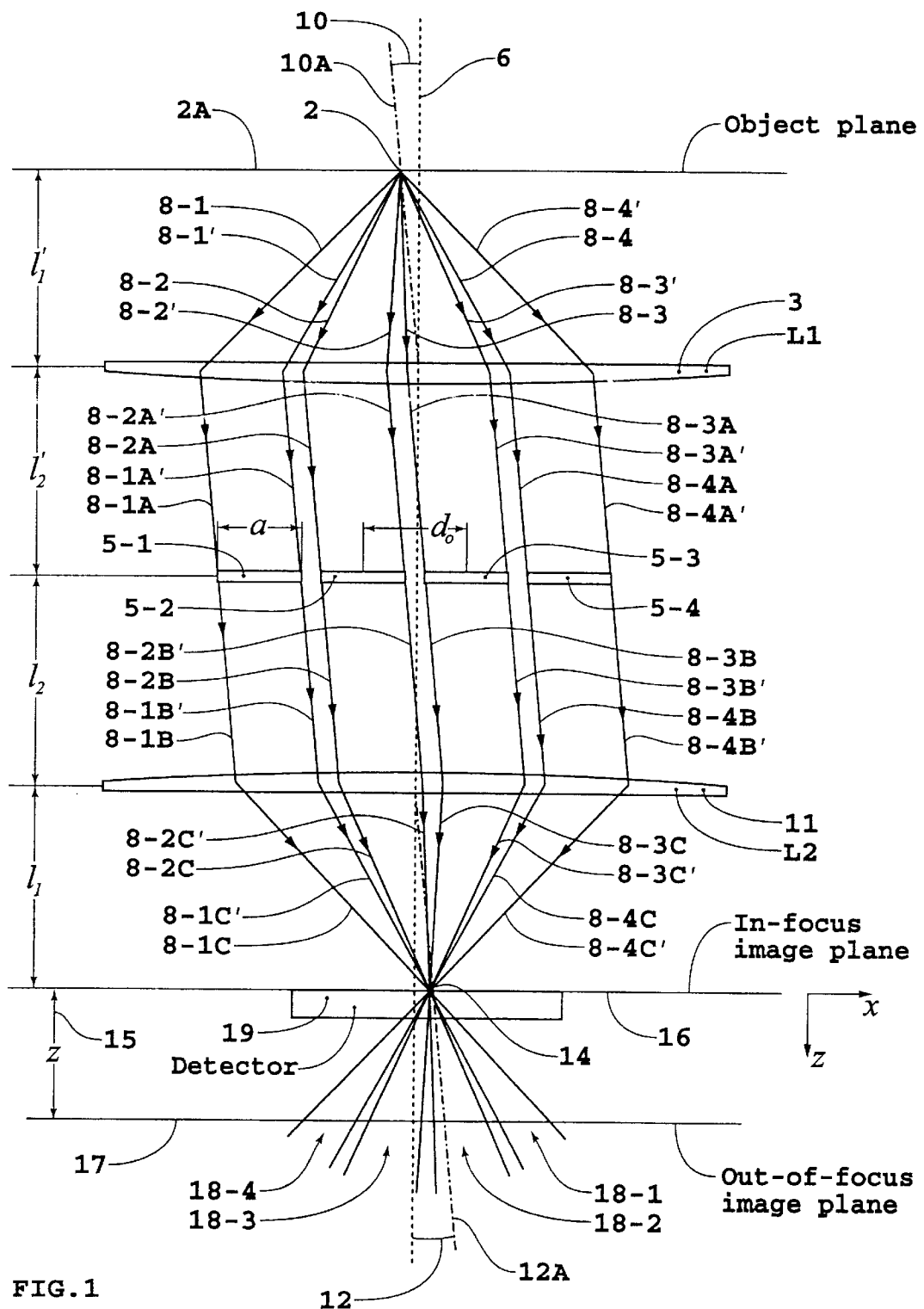
FIG. 1 is a schematic diagram illustrating a basic embodiment of the invention.

The technique of the present invention is implemented with any of five different levels of discrimination against out-of-focus images. In the first level (Level 1), the point source transfer function of an imaging system is manipulated in only one direction by introducing a one dimensional pattern of phase changes. In the second level (Level 2), the point source transfer function is manipulated in two orthogonal directions by introducing a two dimensional pattern of phase changes. A "Level 2" implementation leads to a more effective discrimination of out-of-focus images from in-focus images than a "Level 1" implementation. In the third level (Level 3), the 2-D image data obtained by a Level 1 or 2 discrimination is convoluted with a spatial filter function that is equal to or similar to the tomographic point source transfer function for system. For the fourth level (Level 4), the transmission function for the pupil function of the system is modified. The application of either Level 3 or Level 4 discrimination leads to a further reduction of background over that achieved by a Level 1 or 2 discrimination. Also the Level 3 and Level 4 discriminations can be used together to effect yet a further reduction of background over that achieved by using just a Level 3 or Level 4 discrimination. It is necessary to consider only a "Level 1" implementation, as shown in FIG. 1, to understand the basic idea of the present invention vis-a-vis Level 1 and Level 2 discriminations. It is also necessary to only consider the implementation of the different levels of discrimination in the case of a pinhole confocal microscope to understand the basic idea of the present invention.

FIG. 1 shows a basic embodiment 1 of the background light discriminating system of the present invention, wherein a plurality of light rays 8-1,-1',-2,-2',-3,-3',-4,-4' etc. are emitted from a point source 2 located in an object plane 2A. Those rays enter a collimating lens 3 (lens L1) having an optical axis aligned with system optical axis 6. An imaging lens 11 (lens L2) aligned with optical axis 6 is located a suitable distance from collimating lens L1. A suitable number m of rectangular phase shifters 5-1,-2,-3,-4, etc. are located between collimating lens L1 and Imaging lens L2, so that their respective optical axes are parallel to optical axis 6. (For convenience, phase shifters 5-1,-2,-3,-4 also are referred to as phase shifters PS1, 2, 3, 4, respectively). These phase shifters each have width of "a", and have a center-to-center spacing of "$d_0$".

As shown in FIG. 1, rays 8-3 and 8-3' emerge from collimating lens 3 as rays 8-3A and 8-3A', respectively, and rays 8-4 and 8-4' emerge from collimating lens 3 as rays 8-4A and 8-4A', respectively. Parallel rays 8-3A and 8-3A' (and all rays between them) pass through phase shifter 5-3 and are forwarded by collimating lens 11 onto image point 14 in "in-focus" plane 16. Rays 8-3B and 8-3B' emerging from phase shifter 5-3 (and all rays between them) pass through imaging lens 11 and emerge as rays 8-3C and 8-3C' and are focused by imaging lens 11 onto image point 14 in "in-focus" image plane 16.

In FIG. 1, an "out-of-focus image plane 17 is coplanar to in-focus image plane 16. The x and z cartesian coordinate axes are indicated, with the y axis extending out of the plane of FIG. 1. The origin of the coordinate system is located at the intersection of the optical axis 6 and the in-focus image plane 16. Out-of-focus image plane 17 is spaced the distance z from in-focus image plane 16, as indicated by arrow 15 in FIG. 1.

In FIG. 1, the angle $\Theta'_{x0}$ is identified by arc 10 between optical axis 6 and a straight line 10A between point source 2 and the intersection of optical axis 6 with collimating lens 3. Similarly, the angle $\Theta_{x0}$ is indicated by arc 12 between optical axis 6 and a straight line 12A between image point 14 and the intersection of optical axis 6 with imaging lens 11.

In FIG. 1, the image 14 of point source 2 can be detected by a detector 19 (as can any other point located in object plane 2A and focused onto a corresponding point in in-focus image plane 16). Rays emanating from source point 2 form "bundles" of rays that pass through phase shifters 5-1,-2,-3,-4, respectively, and are focused into image point 14.

Phase shifters 5-1,-2,-3,-4 can be of the electro-optical type or the type shown in subsequently described FIG. 9.

The phase shifts are produced in the "bundles" of light passing through phase shifters 5-1,-2,-3,-4, respectively, and then the bundles focused by imaging lens 11 onto image point 14 and then diverge as four "bundles" of light 18-1,-2,-3, and -4. The bundle of rays between 8-1C and 8-1C' converge to a focus at point 14 and then diverge as the bundle of rays 18-1. Likewise, the bundle of rays between 8-2C and 8-2C', 8-3C and 8-3C', 8-4C and 8-4C' diverge from focal point 14 as the bundle of rays 18-2, 18-3, and 18-4, respectively. If detector 19 is located in out-of-focus image plane 17, no intensity changes can be detected as the result of the phase shifts which result in the bundles 18-1,-2,-3,-4 being formed.

If detector 19 is located in out-of-focus image plane 17, a first set of intensity measurements is taken, and then a predetermined phase shift, e.g., π radians or λ/2 in optical path, is introduced in each of phase shifters 5-1 and 5-3 and a second set of intensity measurements is then made by detector 19 in out-of-focus image plane 17, no changes in light intensity will have occurred. There is no change in intensity since the intensity detected is equal to the square of the amplitude of a signal. The π phase shift changes the sign of the amplitude but not the intensity because $(-1)^2=1$.

Consequently, if the second intensity measurement is subtracted from the first at each pixel of detector 19, all the light emanating from point source 2 (which is an "out-of-focus" source with respect to out-of-focus image plane 17) is canceled except for the diffracted light of each bundle.

However, if detector 19 is located in in-focus image plane 16 as shown, and the above procedure is repeated by taking a first measurement of intensities in in-focus image plane 16, then Introducing a π phase in, say, phase shifters 5-1 and 5-3 and then taking a second set of intensity measurements by means of detector 19, the second set of intensity measurements will be different than the first. Subtracting the second set of intensity measurements from the first does riot result in cancellation of the light. This is because in the focal plane 16, the beams defined by the boundary sets 18-1/18-2, 18-3/18-4, 18-5/18-6, and 18-7/18-8 are all focused at the same point in space and thus can and do generate an interference pattern unlike what happens in the out-of-focus image plane 17. The character of the interference pattern changes as different sets of phase shifts are introduced by 5-1,-2,-3,-4.

Consequently, light coming from point sources before or behind object plane 2A will not be in focus at points in in-focus image plane 16, and the set of phase shifts introduced by phase shifters 5-1,-2,-3,-4 do not result in intensity changes. This fact can be used in accordance with the present invention to discriminate in-focus images from out-of-focus foreground and/or background light.

Point source 2 could emit light because it has been stimulated by other radiation. (For example, point 2 could be a phosphorescent source being stimulated by X-rays.) Or, point source 2 could emit light as a result of its own energy. Or, point source 2 could be an object emitting light because it is being illuminated by another light source.

It should be appreciated that the above principle applies for any electromagnetic radiation, electron beams as used in electron microscopes, or even acoustic waves for which suitable collimating lenses, imaging lenses, and phase shifters can be provided. For applications wherein the amplitude of the beam is detected, the function of producing the square of the signal must be done in the electronic processing following the detector.

In FIG. 1, phase shifters 5-1,-2,-3,-4 produce phase shifts $\chi_1$, $\chi_2$, $\chi_3$, and $\chi_4$, respectively (note that the number of phase shifters may be other than four). The apertures for each of the four phase shifters are identical rectangles with widths "a" measured in the x direction and lengths "a'" measured in the y direction (which is perpendicular to the plane of FIG. 1).

The phase shifters 5-1,-2,-3,-4 can also be a set of concentric annular rings. The performance of the system with respect to background compensation is significantly different than the one for phase shifters that are rectangular in cross-section. For this reason, such a system will be discussed later as a variant.

It is known that the x dependent factor of the "point source transfer function" $T_{ps}(z=0)$ for the in-focus image assuming a diffraction limited optical system with 2m phase shifter elements is $$T^t_{ps}(z=0) = \left(\frac{1}{2}\right)\left(\frac{a}{d_0}\right)^2 \left\{\text{sinc}\left[\frac{ka}{2}(\sin\Theta_{x0} - \right.\right. \tag{1}$$

$$\left.\left.\sin\Theta_x)\right]\right\}^2 \left\{\frac{\sin m\,[kd_0(\sin\Theta_{x0} - \sin\Theta_x) + \chi'_1]}{m\sin[kd_0(\sin\Theta_{x0} - \sin\Theta_x) + \chi'_1]}\right\}^2 \cdot$$

$$\{1 + \cos[kd_0(\sin\Theta_{x0} - \sin\Theta_x) + \chi'_2]\}$$

where "." denotes multiplication, z is the out-of-focus distance defined in FIG. 1, the angles $\Theta_x$ and $\Theta_{x0}$ are defined by the equations tan $\Theta_x$=(x/s) and tan $\Theta_{x0}$=(x$_0$/s), s=z+l$_1$+ l$_2$[1-(l$_1$/f$_2$)], f$_2$ is the focal length of lens L2, l$_1$, l$_2$, and d$_0$ are defined in FIG. 1, k=2π/λ, λ is the wavelength of the radiation, and $$\chi_n = \left(n - m - \frac{1}{2}\right)\chi'_1 + \frac{1}{2}(-1)^n\chi'_2; \quad n = 1, 2, \ldots, 2m. \tag{2}$$

The distances x and x$_0$ are measured on the focal plane 16. The intensity at (x,y$_0$) in the image plane located at z as a result of a point source such as 2 in the object plane 2A is obtained by multiplying the T$_{ps}$(z), the point source transfer function, by (2md$_0$a'A/λs)$^2$ where A is the amplitude produced at the phase shifter plane by the respective point source. The distances y and y$_0$ are defined in a manner analogous to that for x and x$_0$. If the point source transfer function is simple, little or no processing is required to produce a good image from intensity data measured in in-focus image plane 16.

The x dependent factor of the tomographic point source transfer function T$^t_{ps}$(z=0) for the in-focus image in plane 16 is $$T^t_{ps}(z=0) = \left(\frac{1}{2}\right)\left(\frac{a}{d_0}\right)^2 \left\{\text{sinc}\left[\frac{ka}{2}(\sin\Theta_{x0} - \right.\right. \tag{3}$$

$$\left.\left.\sin\Theta_x)\right]\right\}^2 \left\{\frac{\sin m\,[kd_0(\sin\Theta_{x0} - \sin\Theta_x) + \chi'_1]}{m\sin[kd_0(\sin\Theta_{x0} - \sin\Theta_x) + \chi'_1]}\right\}^2 \cdot$$

$$\cos[kd_0(\sin\Theta_{x0} - \sin\Theta_x)].$$

The definition of the "tomographic point source transfer function" T$^t_{ps}$(z) is $$T^t_{ps}(z) = \left(\frac{1}{2}\right)[T_{ps}(z, \chi'_2 = 0) - T_{ps}(z, \chi'_2 = \pi)]. \tag{4}$$

Figure 2A:
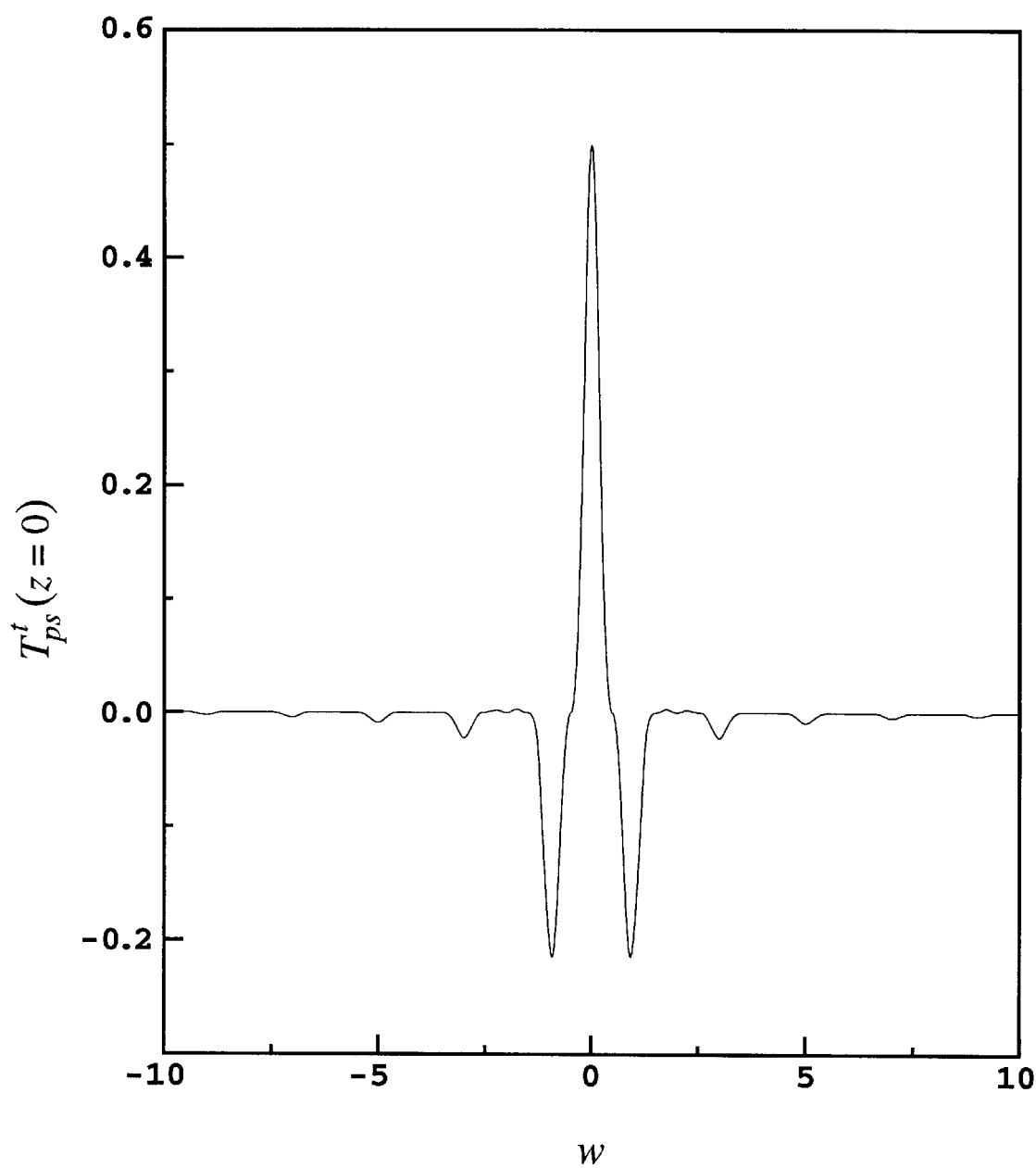
FIG. 2A is a graph illustrating the tomographic point source transfer function obtained for a Level 1 discrimination with the four phase shifting element system (m=2) of FIG. 1 as a function of $w=(kd_0/\pi)(\sin \Theta_{x0} - \sin \Theta_x)$ at y=0 and z=0.

The function T$^t_{ps}$(z=0) is plotted in FIG. 2A as a function of w=(kd$_0$/π)(sin $\Theta_{x0}$−sin $\Theta_x$) for a=d$_0$ and m=2. The quantity kd$_0$ sin $\Theta$ is the optical path difference in radians between two rays going from point 2 to points x and x$_0$, respectively, on plane 16 and the two rays separated by a distance d$_0$ at the phase shifter.

Figure 3:
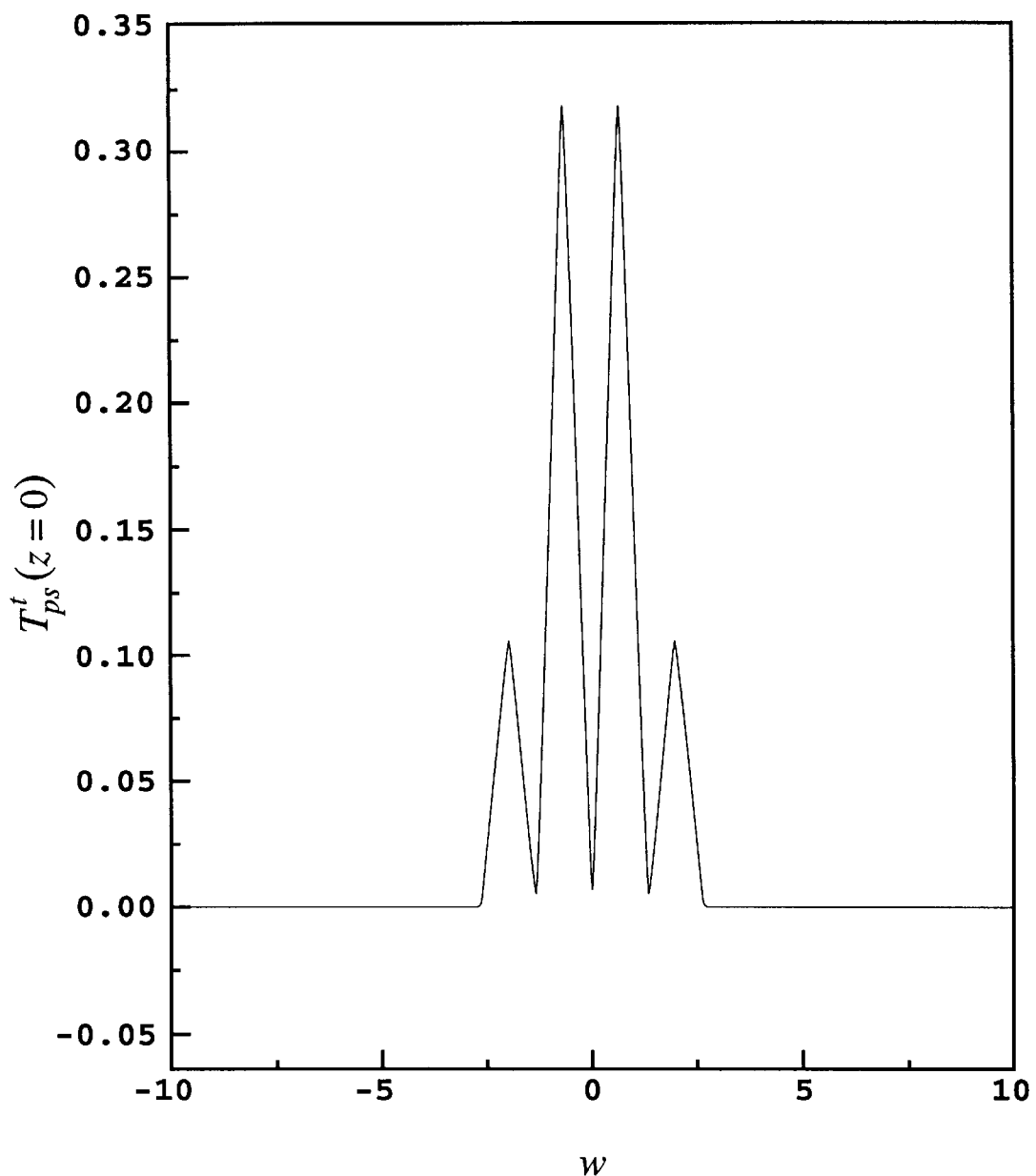
FIG. 3 is a graph illustrating a Fourier transform of the tomographic point source transfer function in the x direction at y=0 and z=0 for a four phase shifting element (m=2) system of FIG. 1.

The Fourier transform of T$^t_{ps}$(z=0), $\tilde{T}^t_{ps}$(z=0), is shown in FIG. 3 for a four phase shifting element system The central peak and the two negative peaks on either side of this peak in FIG. 2A show the imaging system in question essentially generates the second derivative of the object. This feature is also evident in FIG. 3 where the magnitude of the Fourier transform is greatly reduced at the lower spatial frequencies (e.g. the generation of a second derivative removes the low frequency information content in the image). It is shown in the discussion on source illumination that the low frequency information can be obtained as well as the higher frequency information by selective illuminations of the object in an ordered set of measurements.

For a system with 2m phase shifting elements, $\tilde{T}^t_{ps}$(z=0) is given by $$\tilde{T}^t_{ps}(z=0) = \left(\frac{1}{2}\right)\left(\frac{a}{md_0}\right)^2 \left[\Lambda\left(\frac{f_s\lambda}{d_0}\right)\right] * \{\delta[u + (2m-1)kd_0]e^{i(2m\chi'_1)} + \tag{5}$$

$$3\delta[u + (2m-3)kd_0]e^{i(2m-2)\chi'_1} + \ldots + (2m-1)\delta(u + kd_0)e^{+i2\chi'_1} +$$

$$(2m-1)\delta(u - kd_0)e^{-i2\chi'_1} + \ldots + 3\delta[u - (2m-3)kd_0]e^{-i(2m-2)\chi'_1} +$$

$$\delta[u - (2m-1)kd_0]e^{-i2m\chi'_1}\}$$

where δ(x) is the delta function, * denotes convolution, f$_s$ is the spatial frequency, u=2πf$_s$ is the angular spatial frequency, and Λ(x) is the triangle function $$\Lambda(x) = \begin{cases} 1 - |x|, & |x| \le 1 \\ 0, & |x| > 1 \end{cases} \tag{6}$$

The number of phase shifter elements may also be an odd number, with the respective tomographic point source transfer function T$^t_{ps}$(z=0) exhibiting properties and information content very similar to that given by equation (3) for an even number of phase shifting elements.

The point source transfer function for the out-of-focus image can be written in terms of the Fresnel integrals C(v) and S(v) where $$C(v) = \int_0^v \sin\frac{\pi}{2}(v')^2 dv' \tag{7}$$

$$S(v) = \int_0^v \sin\frac{\pi}{2}(v')^2 dv'.$$

Thus the out-of-focus point source transfer functions have Fresnel diffraction type of distributions.

Figure 4A:
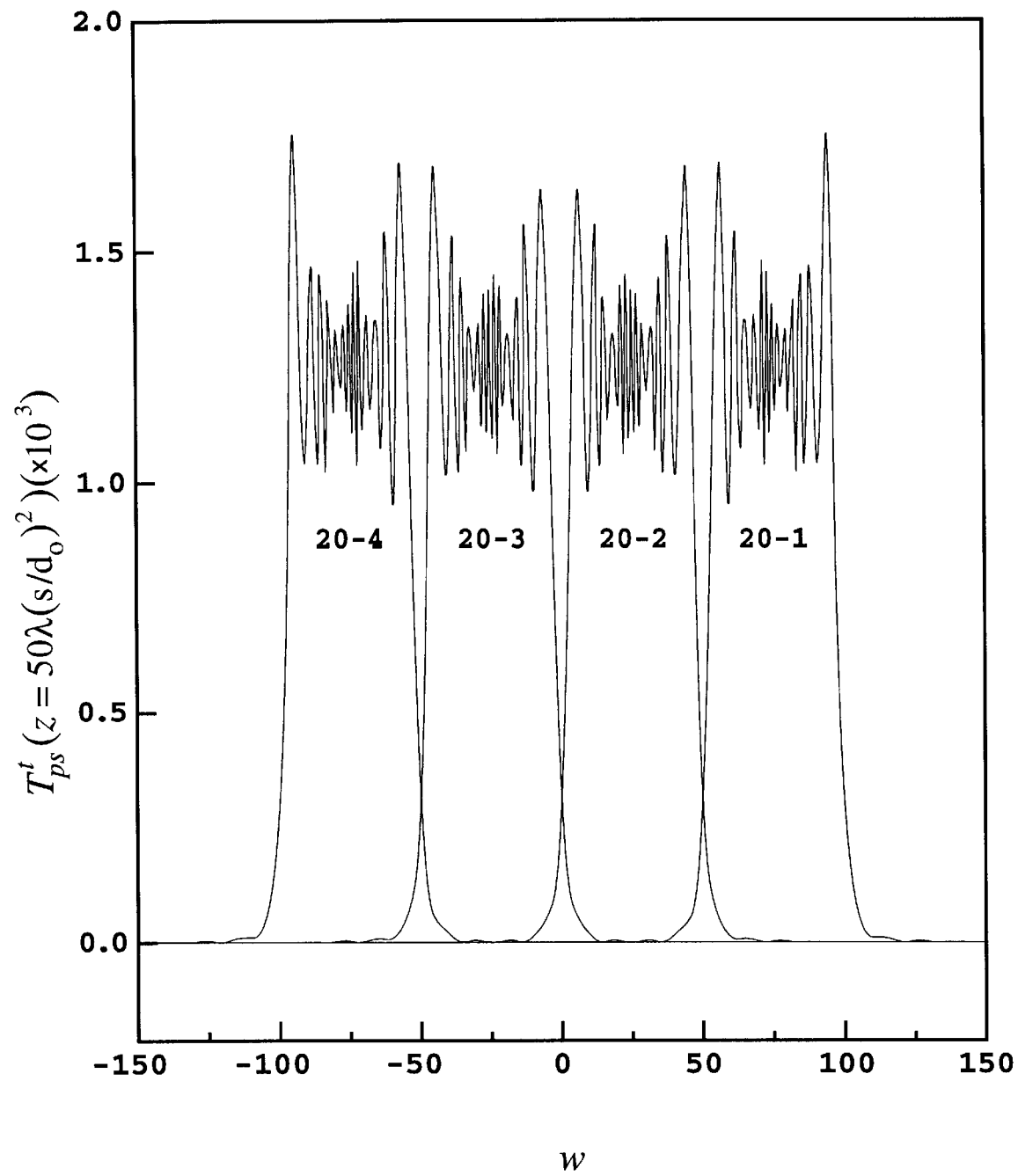
FIG. 4A is a graph showing the out-of-focus point source transfer function for the four phase shifting element system (m=2) of FIG. 1 as a function of $w=(kd_0/\pi)(\sin \Theta_{x0} - \sin \Theta_x)$ at y=0 and z=50 $\lambda(s/d_0)^2$. The contributions 20-1, -2, -3, -4 from the wavefronts passing through each of the phase shifter elements are indicated, with the interference terms omitted for clarity.
Figure 4B:
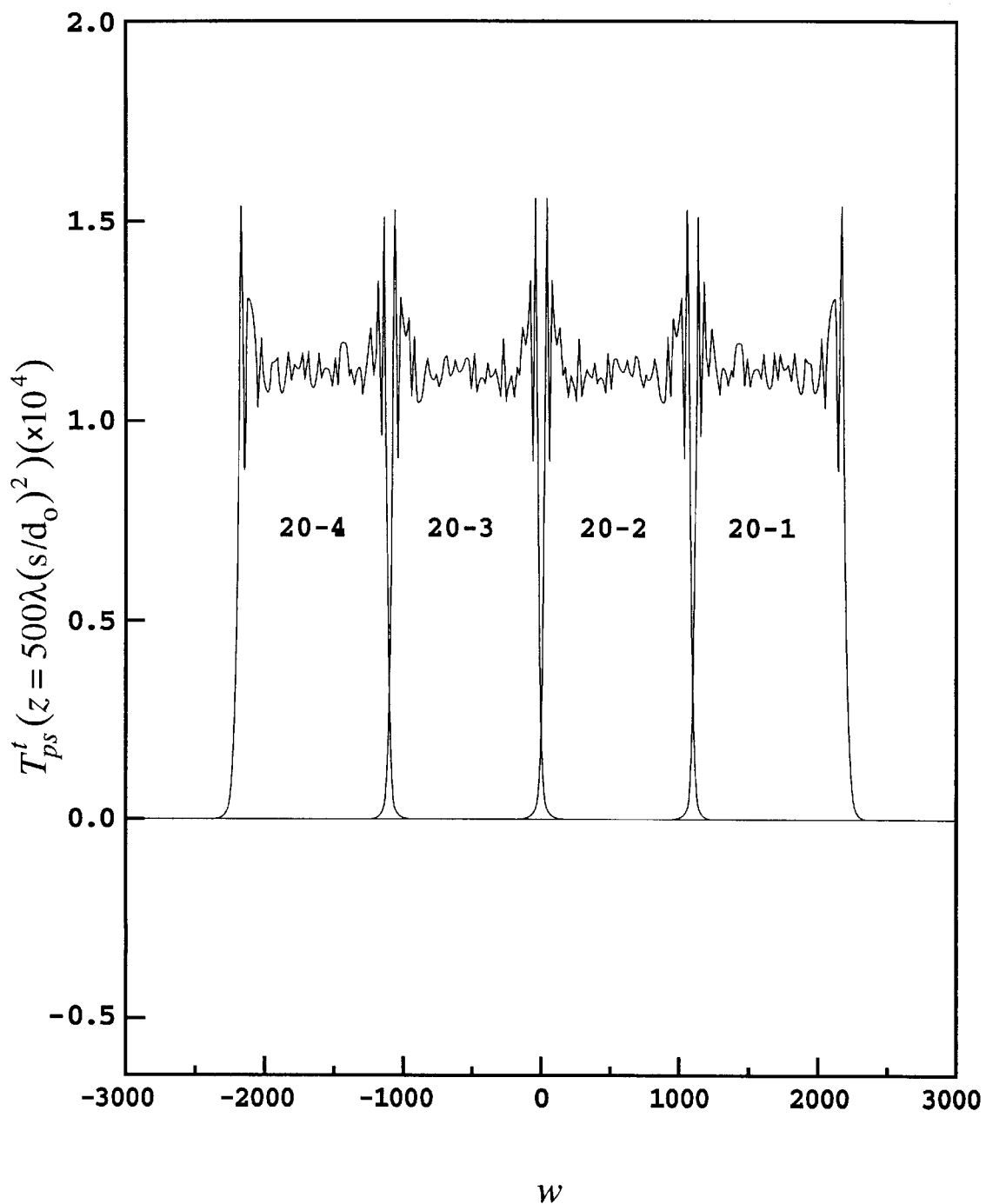
FIG. 4B is a graph showing the out-of-focus point source transfer function for the four phase shifting element system (m=2) of FIG. 1 as a function of $w=(kd_0/\pi)(\sin \Theta_{x0} - \sin \Theta_x)$ at y=0 and z=500 $\lambda(s/d_0)^2$. The contributions 20-1, -2, -3, -4 from the wavefronts passing through each of the phase shifter elements are indicated, with the interference terms omitted for clarity.
Figure 4C:
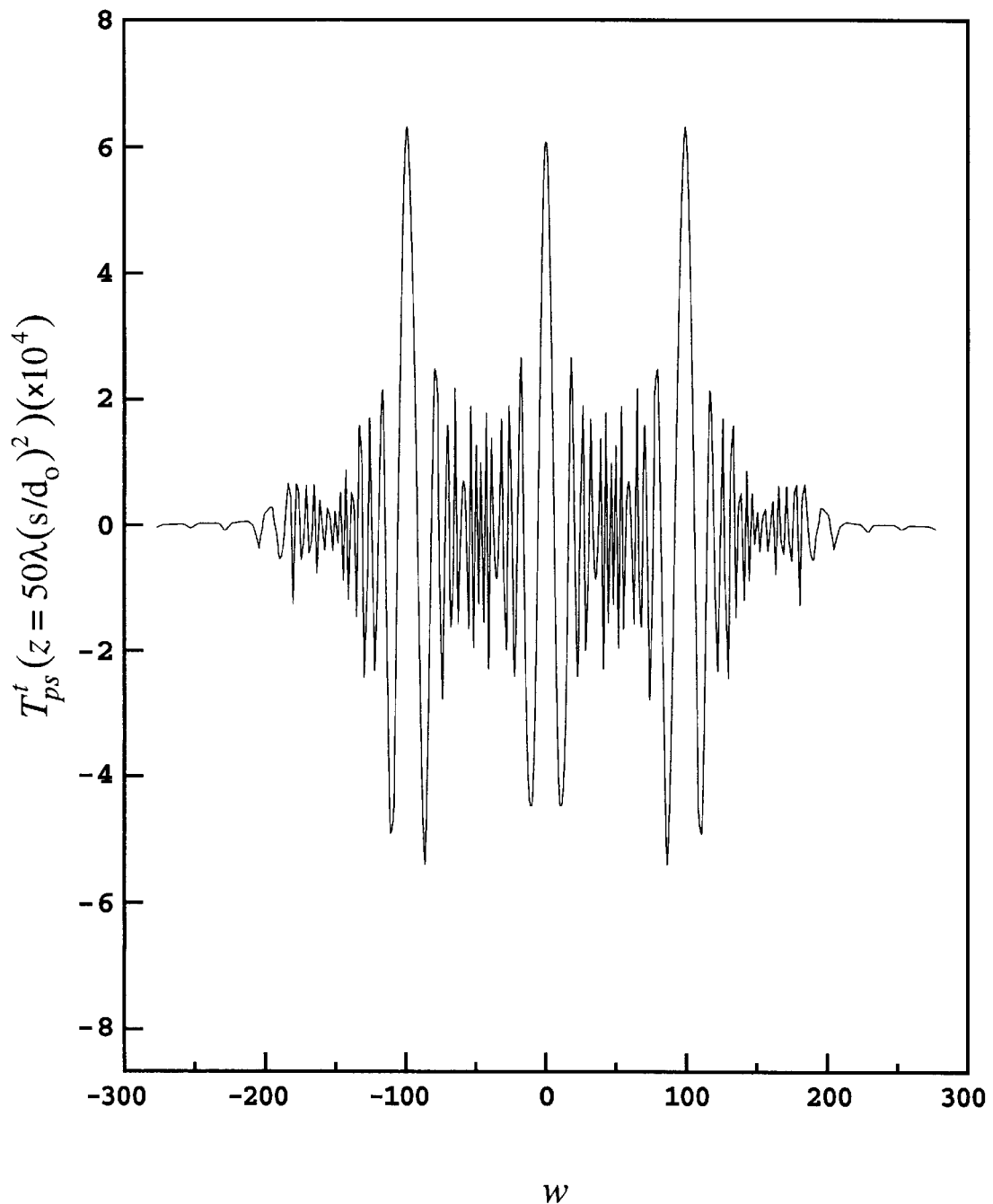
FIG. 4C is a graph showing the out-of-focus tomographic point source transfer function obtained with a Level 1 discrimination for the four phase shifting element system (m=2) of FIG. 1 as a function of $w=(kd_0/\pi)(\sin \Theta_{x0} - \sin \Theta_x)$ at y=0 and z=50 $\lambda(s/d_0)^2$.
Figure 4D:
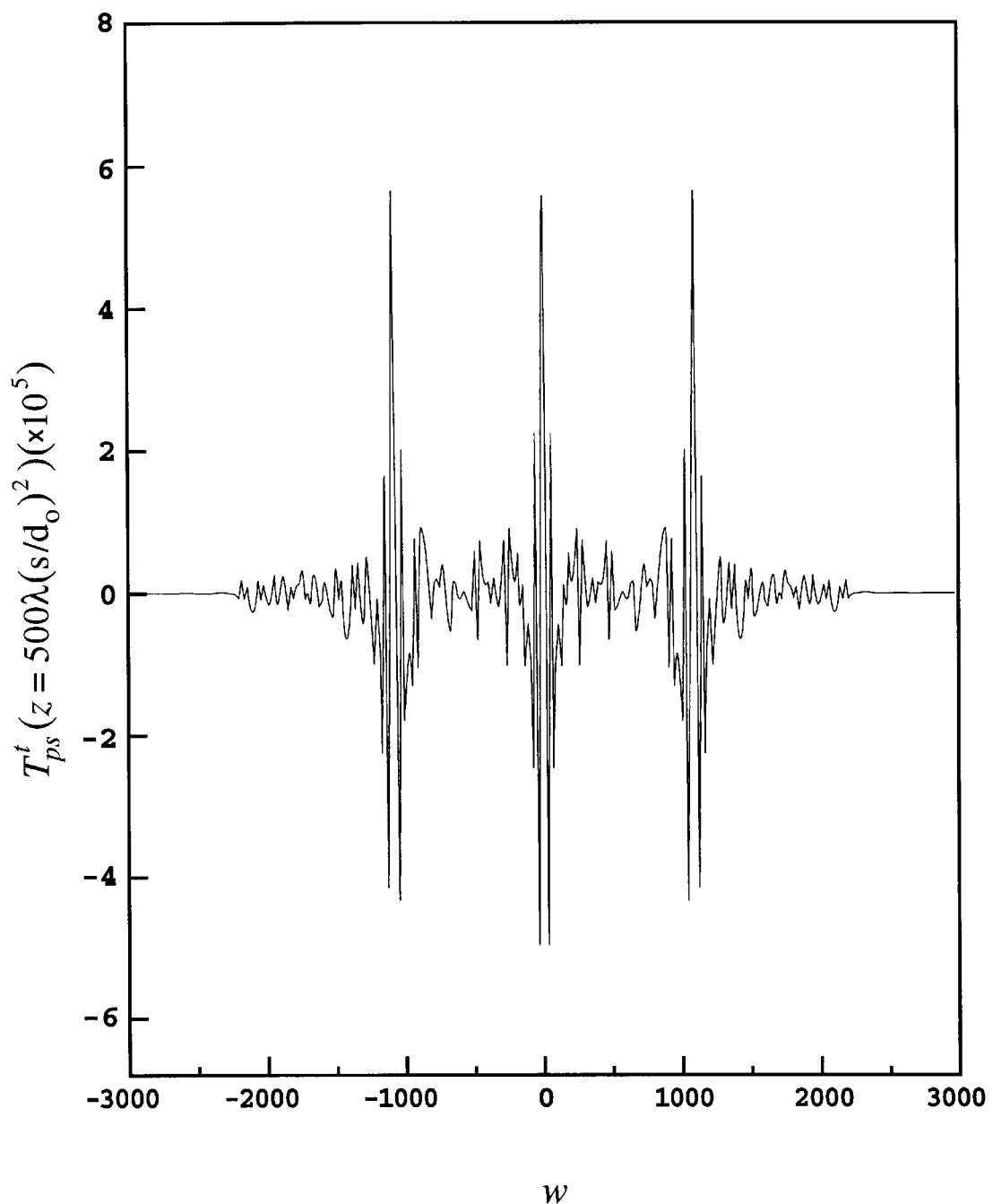
FIG. 4D is a graph showing the out-of-focus tomographic point source transfer function obtained with a Level 1 discrimination for the four phase shifting element system (m=2) of FIG. 1 as a function of $w=(kd_0/\pi)(\sin \Theta_{x0} - \sin \Theta_x)$ at y=0 and z=500 $\lambda(s/d_0)^2$.

Two typical distributions for the out-of-focus point source transfer function T$_{ps}$(z) are shown in FIGS. 4A and 4B for z=50 λ(s/d$_0$)$^2$ and z=500 λ(s/d$_0$)$^2$, respectively, for a system using 4 phase shift elements (m=2) and χ'$_1$=0. The contributions 20-1,-2,-3,-4 from the wavefronts passing through each of the phase shifters are shown, with the interference terms omitted for clarity. The tomographic point source transfer function T$^t_{ps}$(z) for each of the out-of-focus images, obtained by subtracting signals recorded for χ'$_2$=0 and π, are shown in FIGS. 4C and 4D, respectively.

The effective reductions in T$^t_{ps}$(z) for the out-of-focus images relative to T$_{ps}$(z) are given by the ratio of the areas of the two respective "envelopes" shown in FIGS. 4A, 4B, 4C, and 4D, and are of the order of 10 and 100, respectively. Note from these results that the effectiveness of discrimination of an in-focus image from an out-of-focus image improves as the out-of-focus distance z shown in FIG. 1 is increased. If the effect of the y dimension is included, the effectiveness of discrimination against the out-of-focus images is proportional to the square of the out-of-focus distance, i.e., proportional to $z^2$.

Note that the only part of the signal that contributes to the tomographic out-of-focus signal is the overlap of the complex amplitudes produced by diffraction. Since at a given x, there will in general be only one of the wavefronts of the set 20-1,-2,-3,-4 that will be large as evident from the respective $T_{ps}(z)$, this leads to a reduced value for the respective $T'_{ps}(z)$.

A slice of an object under examination by tomographic imaging may be a plane that is at an angle to optical axis 6 of the system. Or, the slice may be curved. Furthermore, two or more slices of the object may be examined simultaneously by tomographic imaging. Or, each slice may be measured at a different wavelength and/or at a different time. These features may be useful in observing a sequence of events in time, and also may be valuable in normalizing a set of data against changes in illumination or motion of an object under examination. The optical configuration shown in FIG. 5 is an example of a system designed to examine two sections simultaneously or otherwise.

Figure 5:
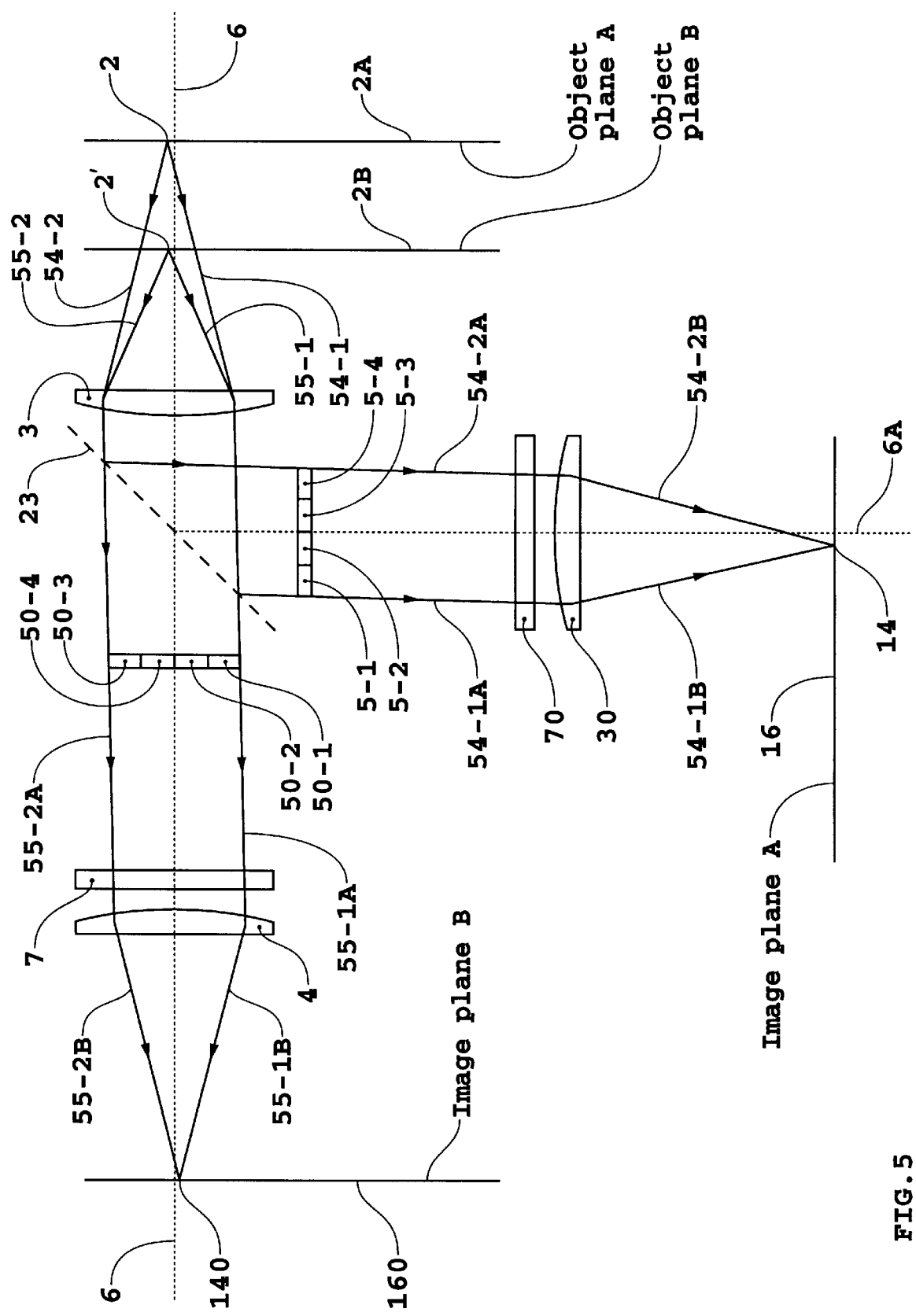
FIG. 5 is a schematic diagram of an embodiment of the invention capable of simultaneously examining two distinct cross-sectional "slices" in an object space. The slices may also be examined at two different times and/or at two different wavelengths.

In FIG. 5, a point source 2 located in object plane 2A emits or reflects rays 54-1 and 54-2, which enter collimating lens 3. Rays 54-1 and 54-2 exit collimating lens 3; some are partially reflected as rays 54-1A and 54-2A by beam splitter 23 and pass through a number of phase shifters 5-1,-2,-3,-4 to outer imaging lens 30. Those rays are focused by imaging lens 30 as rays 54-1B and 54-2B onto image point 14 in a first image plane 16. A second point source 2' located in object plane 2B emits or reflects rays 55-1 and 55-2, which enter collimating lens 3. Rays 55-1 and 55-2 exit collimating lens 3; some are partially transmitted as rays 55-1A and 55-2A by beam splitter 23 and pass through a number of phase shifters 50-1,-2,-3,-4 to outer imaging lens 4. Those rays are focused by imaging lens 4 as rays 55-1B and 55-2B onto image point 140 in a second image plane 160. Those rays could have a wavelength which is the same or different than the wavelength of rays 54-1B and 54-2B. If the light that is radiated from the object point 2 in plane 2A and the object point 2' in plane 2B contains light with wavelengths $\lambda_1$ and $\lambda_2$, respectively, narrowband optical filters 7 and 70 can be placed in front of lenses 4 and 30, respectively, such that the detector at image plane A detects light at wavelength $\lambda_1$ and the detector at image plane B detects light at wavelength $\lambda_2$. If it is desired to obtain one image at time $t_1$ and a second image at time $t_2$, and if $t_2-t_1$ is less than the minimum time required for a single detector to record two images, shutters can be placed in front of the detectors at detector planes A and B such that the shutter at plane A is triggered at $t_1$ and the shutter of plane B is triggered at $t_2$. The second point source 2' located in object plane 2B may be selected to be same as or different from the point source 2 located in object plane 2A when the object plane 2B is selected to be same as object plane 2A.

A high sensitivity of $T'_{ps}(s=0)$ given by equation (3) is maintained for the in-focus image using the phase shift schedule of equation (2) as long as the phase of the factor cos $[kd_0(\sin \Theta_{x0}-\sin \Theta_x)]$ meets the condition that $$\sigma[kd_0(\sin \Theta_{x0}-\sin \Theta_x)-r\pi] \lesssim \pi/4 \qquad (8)$$

for the permitted values of $kd_0(\sin \Theta_{x0}-\sin \Theta_x)$, where $\sigma(x)$ is the standard deviation of x and r is an integer. The $r\pi$ term in equation (8) represents the set of permitted values of $kd_0(\sin \Theta_{x0}-\sin \Theta_x)$ which give rise to the peaks in $$\left\{ \frac{\sin m[kd_0(\sin\Theta_{x0}-\sin\Theta_x)+\chi'_1]}{m\sin[kd_0(\sin\Theta_{x0}-\sin\Theta_x)+\chi'_1]} \right\}^2. \qquad (9)$$

Note that the factor given in equation (9) permits those combinations of k and ($\sin \Theta_{x0}-\sin \Theta_x$) such that $$\sigma[kd_0(\sin\Theta_{x0}-\sin\Theta_x)-r\pi+\chi'_1] \lesssim \left(\frac{1.4}{m}\right). \qquad (10)$$

Therefore, the requirement expressed in equation (8) is satisfied for $$m \tilde{>} 2. \qquad (11)$$

The contributions to the signals are permitted for the values of $kd_0(\sin \Theta_{x0}-\sin \Theta_x)$ which have a hyperbolic correlation between ($\sin \Theta_{x0}-\sin \Theta_x$) and k. Therefore an additional restriction may be placed on k so that the corresponding permitted values of k and ($\sin \Theta_{x0}-\sin \Theta_x$) will permit an image to be obtained from the detector that will yield an improved signal-to-noise ratio (in respect to strength of in-focus signals to strength of out-of-focus signals). For this to be the case, it is necessary to require that $$\sigma(\sin\Theta_{x0}-\sin\Theta_x) \lesssim \frac{\pi}{4kd_0} \qquad (12)$$

where $\pi/(kd_0)$ corresponds to the change in ($\sin \Theta_{x0}-\sin \Theta_x$) associated with an incremental change in r of 1. From equation (10), we also obtain the relationship $$(kd_0)^2 [\sigma(\sin\Theta_{x0}-\sin\Theta_x)]^2 + (kd_0)^2(\sin\Theta_{x0}-\sin\Theta_x)^2\left(\frac{\sigma_k}{k}\right)^2 \lesssim \frac{2}{m^2}. \qquad (13)$$

Choosing to operate in a mode where each of the two terms on the left hand side of equation (13) contribute equally to the left side, then $$(kd_0)\sigma(\sin\Theta_{x0}-\sin\Theta_x) \lesssim \frac{1}{m} \qquad (14)$$

and $$(kd_0)(\sin\Theta_{x0}-\sin\Theta_x)\left(\frac{\sigma_k}{k}\right) \lesssim \frac{1}{m}. \qquad (15)$$

By comparing equations (12) and (14), we obtain the additional constraint $$m \tilde{>} \frac{4}{\pi}. \qquad (16)$$

This condition is satisfied when the condition of equation (11) is met. The corresponding value for $(\sigma_k/k)$ is obtained by combining equation (15) with the equation $kd_0(\sin \Theta_{x0}-\sin \Theta_x)=(r\pi-\chi'_1)$. The result is $$\left(\frac{\sigma_k}{k}\right) \lesssim \begin{cases} \frac{1}{m}\frac{1}{(r\pi - \chi'_1)}; & r\pi - \chi' \gtrsim 1 \\ \sim 1; & r\pi - \chi' \approx 0 \end{cases} \quad (17)$$

There is a limitation on the range of the values of r that must be determined. This limitation comes from consideration of signal-to-noise ratio. For each peak in $\mathrm{sinc}^2[(kd_0/2)(\sin\Theta_{x0}-\sin\Theta_x)]$ that contributes to the observed signal, there is an improved signal strength. However, as the number of peaks included is increased and thus the maximum value of r, $r_{max}$, is increased, the bandwidth on k must be reduced according to equation (17). The relative strength of the signal as a function of $r_{max}$ is given in Table 1 for the case of $\chi'_1=0$ and m=2. Thus, the tomographic imaging technique is effective for extended sources, i.e. non point like sources that extend in the x' and y' directions (the primes refer to variables such as x and y in the source "space") with no intrinsic restriction on the range of $\Theta'_{x0}$ and $\Theta'_{y0}$ and for relatively broadband operations in $\lambda$ as evident from the third column in Table 1. This column presents the maximum value of $(\sigma_k/k)_{max}$ given by equation (17) that can be used with m=2.

The point source transfer function for observing through a turbulent medium is $$T_{ps,m} = T_{ps} * T_m \quad (18)$$

where $T_m$ is the point source transfer function for the turbulent medium. The Fourier transform of $T_{ps}*T_m$ is $$\tilde{T}_{ps,m} = \tilde{T}_{ps}\tilde{T}_m \quad (19)$$

Thus, the corresponding Fourier transform of the tomographic point source transfer function is $$\tilde{T}^t_{ps,m} = \tilde{T}^t_{ps}\tilde{T}_m \quad (20)$$

$T_m$ is very well represented by a Gaussian distribution $$T_m = \frac{1}{\sqrt{2\pi}\,\sigma}e^{-\frac{(\Theta_{x0}-\Theta_x)^2}{2\sigma^2}}. \quad (21)$$

TABLE 1

| $r_{max}$ | Relative Signal Strength | $(\sigma_k/k)^a$ |
|---|---|---|
| 0 | 0.497 | ~1 |
| 1 | 0.899 | 0.159 |
| 3 | 0.950 | 0.063 |
| 5 | 0.966 | 0.032 |
| 7 | 0.975 | 0.023 |

$^a(\sigma_k/k)$ for m = 2 where $\sigma^2$ is the variance of $T_m$ and $\sigma$ is measured in radians.
The Fourier transform of $T_m$ is given by $$\tilde{T}_m = e^{-\frac{u^2\sigma^2}{2}}. \quad (22)$$

The lowest frequency peak in $T^t_{ps}$ is located at the frequency $$f_s = \frac{d_0}{\lambda}. \quad (23)$$

It is apparent from equations (20) and (22) that a relatively large value for $T^t_{ps}$ is maintained at $f_s=(d_0/\pi)$ when $$\tilde{T}_m > \mathrm{or} \approx \frac{1}{e} \quad (24)$$

or $$\frac{u^2\sigma^2}{2} < \mathrm{or} \approx 1. \quad (25)$$

Using equations (23) and (25) and the relation $u=2\pi f_s$, it follows that the values of $d_0$ that can be used are constrained by the condition $$d_0 < \mathrm{or} \approx \frac{\lambda}{\sqrt{2}\,\pi\sigma}. \quad (26)$$

Thus, it is possible to configure the tomographic imaging system to maintain a relatively high sensitivity for spatial frequencies below the cut off frequency imposed by $T_m$.

A diffraction limited image, i.e. an image with maximum allowed spatial frequency information, may be obtained on the image up to the maximum frequency of $f_s=2m(d_0/\pi)$ by the implementation of speckle imaging technology.

Figure 2B:
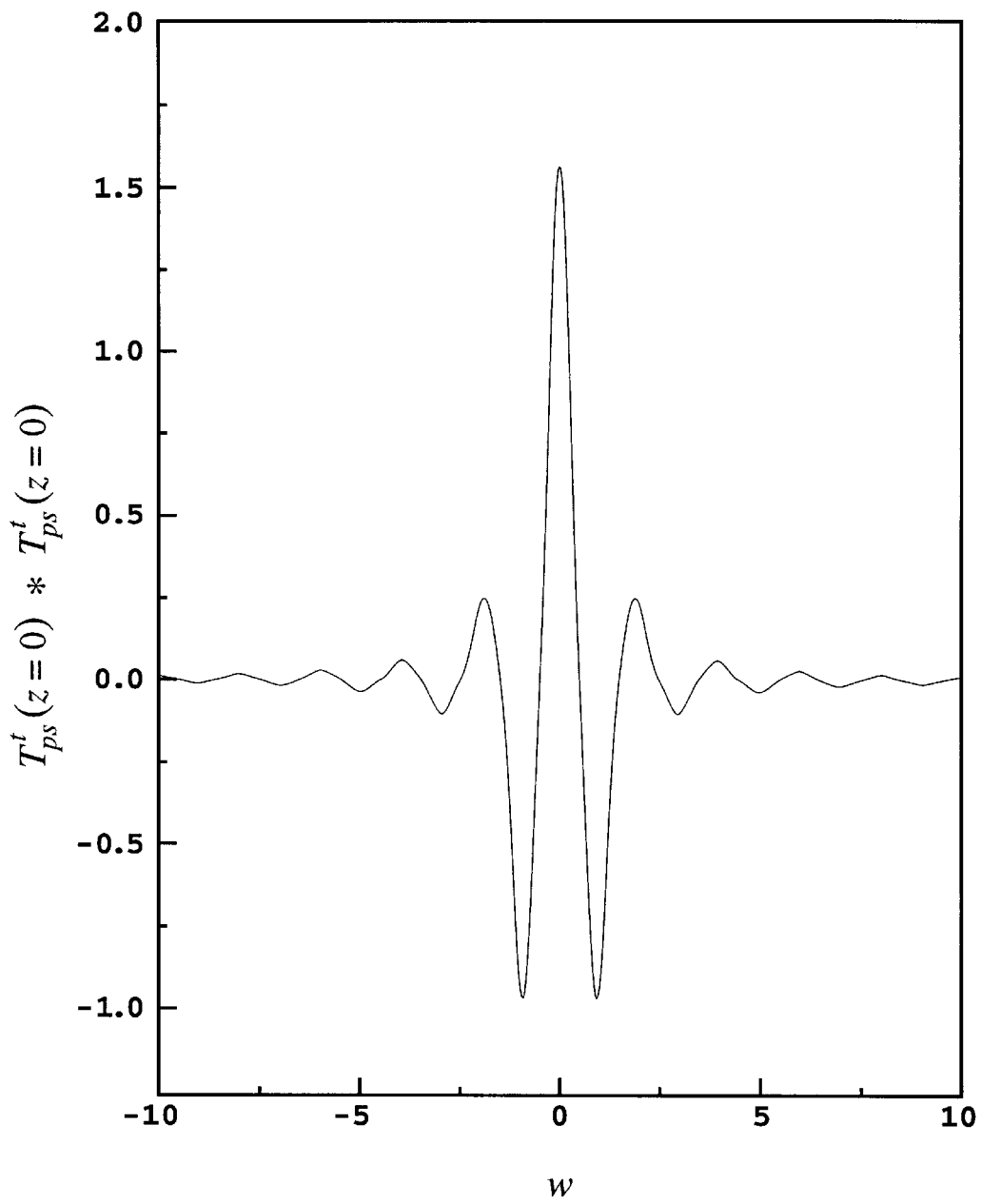
FIG. 2B is a graph illustrating the tomographic point source transfer function obtained for a Level 3 discrimination applied in conjunction with a Level 1 discrimination for the four phase shifting element system (m=2) of FIG. 1 as a function of $w=(kd_0/\pi)(\sin \Theta_{x0} - \sin \Theta_x)$ at y=0 and z=0.
Figure 4E:
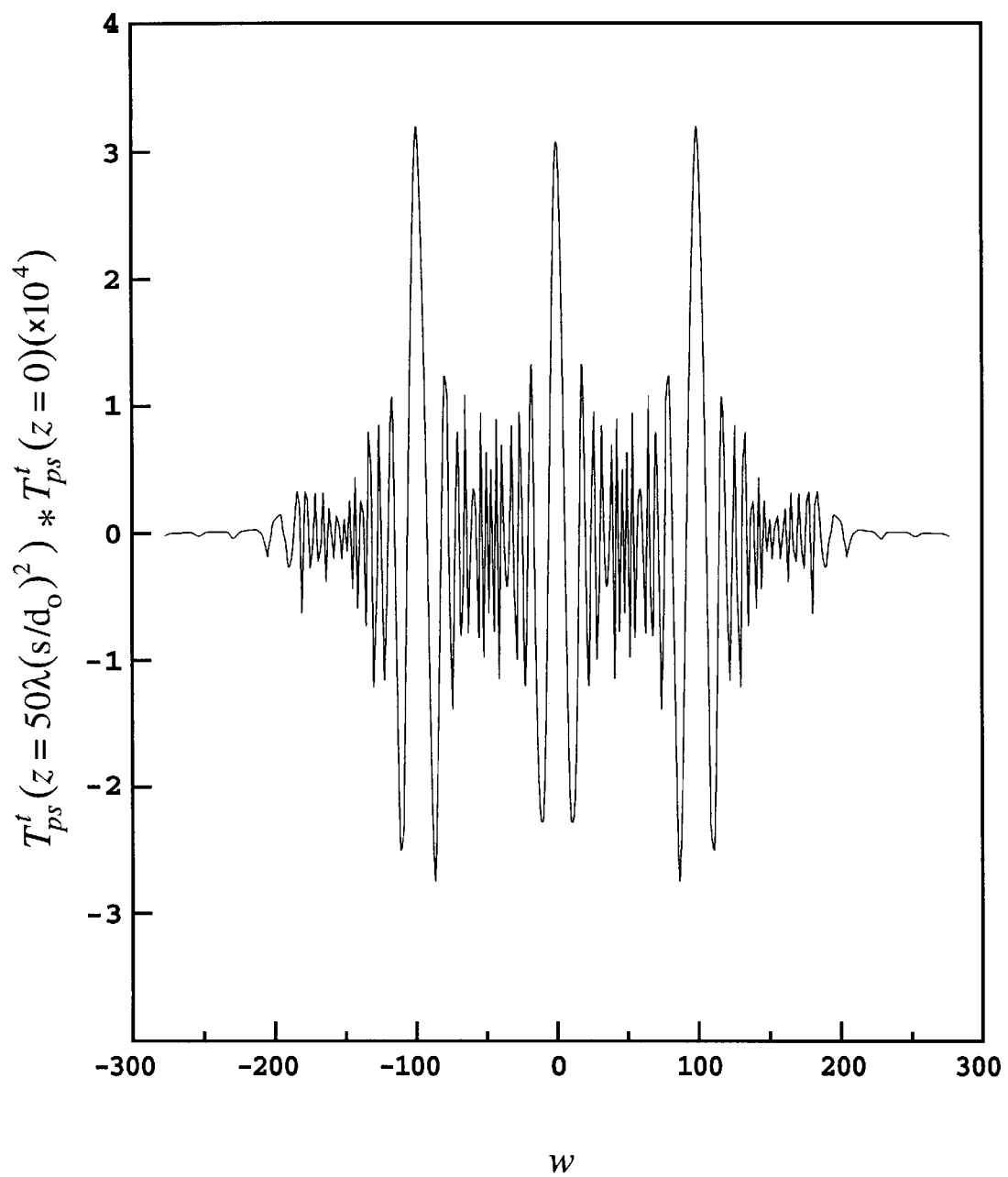
FIG. 4E is a graph showing the out-of-focus tomographic point source transfer function obtained for a Level 3 discrimination applied in conjunction with a Level 1 discrimination for the four phase shifting element system (m=2) of FIG. 1 as a function of $w=(kd_0/\pi)(\sin \Theta_{x0} - \sin \Theta_x)$ at y=0 and z=50 $\lambda(s/d_0)^2$.
Figure 4F:
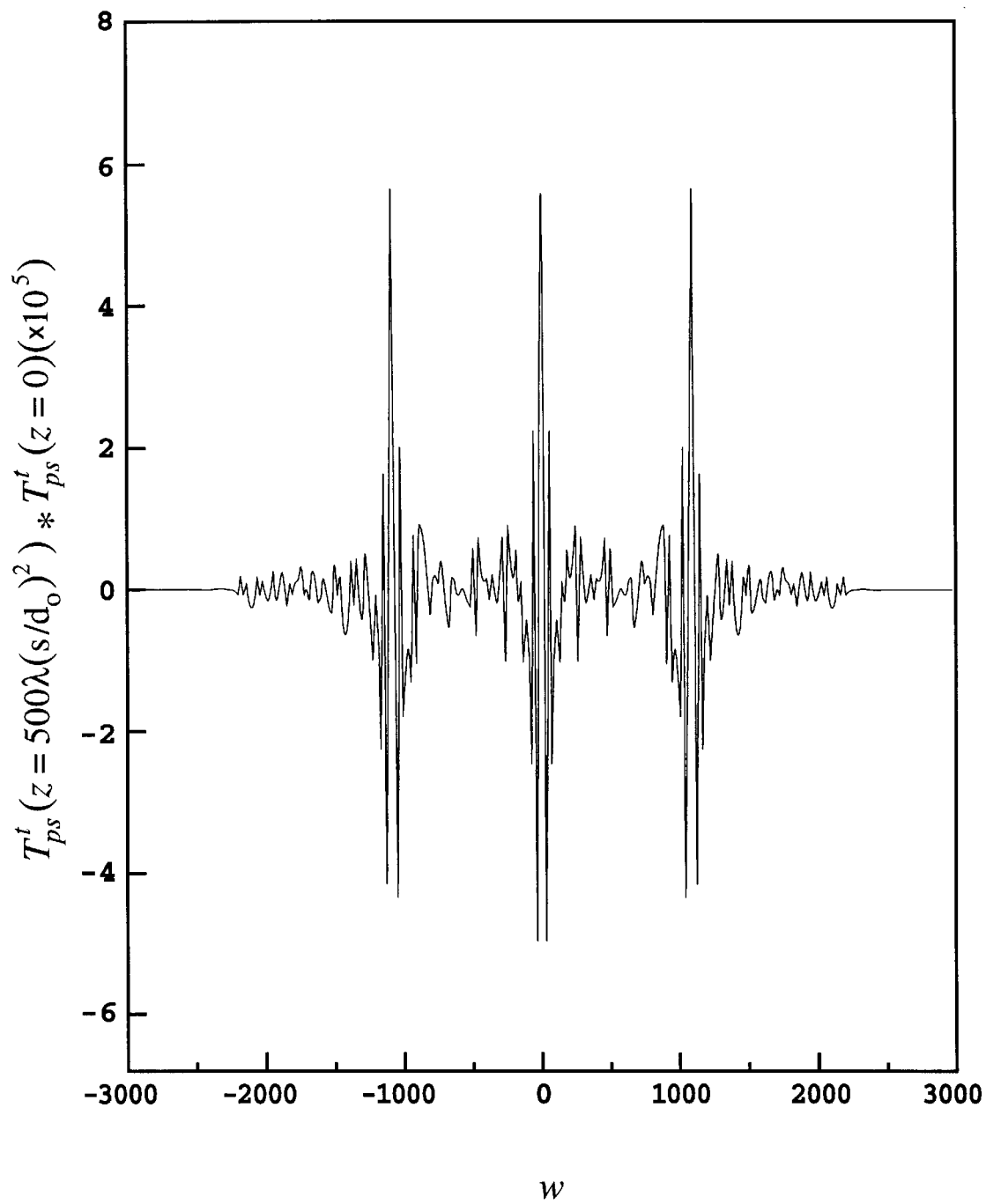
FIG. 4F is a graph showing the out-of-focus tomographic point source transfer function obtained for a Level 3 discrimination applied in conjunction with a Level 1 discrimination for the four phase shifting element system (m=2) of FIG. 1 as a function of $w=(kd_0/\pi)(\sin \Theta_{x0} - \sin \Theta_x)$ at y=0 and z=500 $\lambda(s/d_0)^2$.

The Level 3 discrimination is implemented by convoluting the observed tomographic signals with the in-focus tomographic point source transfer function. The convolution may be done in either software or hardware. Examples of the improved performance using computer generated convolutions are shown in FIGS. 2B, 4E, and 4F. Note that the resulting point source transfer function plotted in FIG. 2B retains high sensitivity for in-focus images relative to the greatly reduced point source transfer function for the out-of-focus image shown in FIGS. 4E and 4F.

Figure 10:
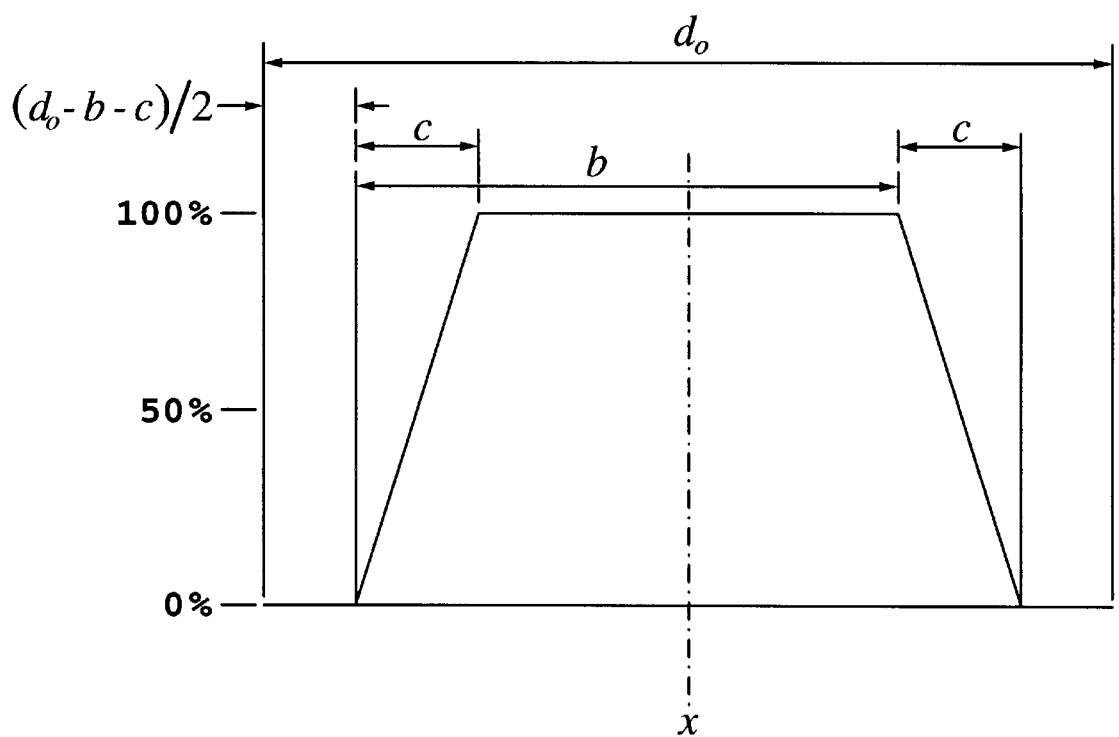
FIG. 10 is a diagram of an apodizing scheme shown in one dimension for a rectangular phase shifter element.

The Level 4 discrimination is implemented by introducing an appropriate apodization of the phase shift elements. An example of an effective apodization scheme is shown in FIG. 10. The x dependent factor of the in-focus point source transfer function for the system using this scheme is $$T_{ps}(z=0) = \quad (27)$$

$$\frac{1}{2}\left(\frac{b}{d_0}\right)^2\left[\mathrm{sinc}\frac{kb}{2}(\sin\Theta_{x0}-\sin\Theta_x)\right]^2\left[\mathrm{sinc}\frac{kc}{2}(\sin\Theta_{x0}-\sin\Theta_x)\right]^2 \cdot$$

$$\left\{\frac{\sin m[kd_0(\sin\Theta_{x0}-\sin\Theta_x)+\chi'_1]}{m\sin[kd_0(\sin\Theta_{x0}-\sin\Theta_x)+\chi'_1]}\right\}^2 \{1+$$

$$\cos[kd_0(\sin\Theta_{x0}-\sin\Theta_x)+\chi'_2]\}$$

where b and c are defined in FIG. 10.

The corresponding x dependent factor of the in-focus tomographic point source transfer function is $$T^t_{ps}(z=0) = \tag{28}$$

$$\frac{1}{2}\left(\frac{b}{d_0}\right)^2 \left[\text{sinc}\frac{kb}{2}(\sin\Theta_{xo} - \sin\Theta_x)\right]^2 \left[\text{sinc}\frac{kc}{2}(\sin\Theta_{xo} - \sin\Theta_x)\right]^2 \cdot$$

$$\left\{\frac{\sin m[kd_0(\sin\Theta_{xo} - \sin\Theta_x) + \chi'_1]}{m\sin[kd_0(\sin\Theta_{xo} - \sin\Theta_x) + \chi'_1]}\right\}^2 \cos[kd_0(\sin\Theta_{xo} - \sin\Theta_x)].$$

Figure 11:
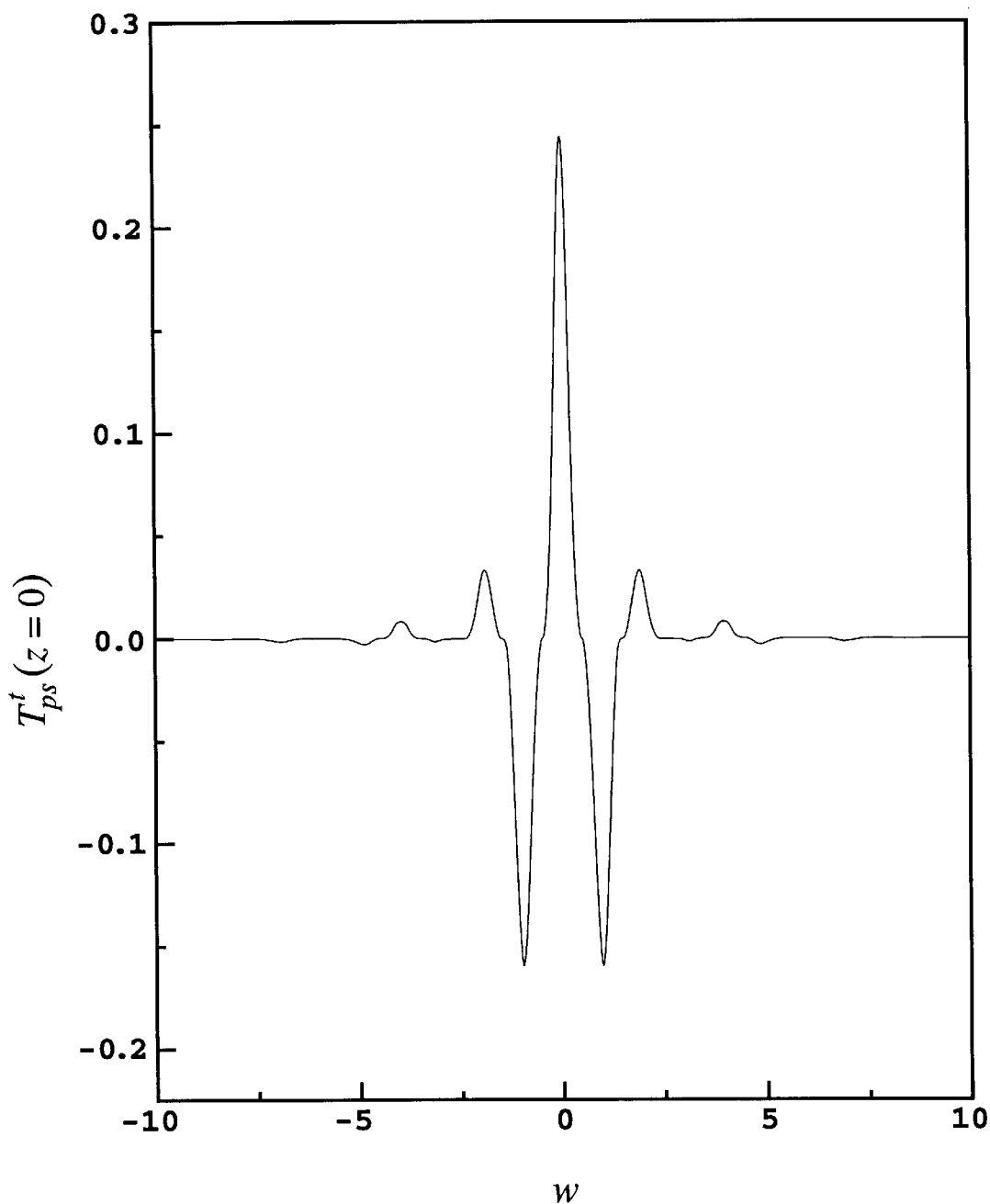
FIG. 11 illustrates 1-D $T^r_{ps}(z=0)$ for Level 4 discrimination using the apodizing scheme of FIG. 10 with $(b/d_0)=0.70$ and $(c/d_0)=0.15$ and m=2 as a function of $w=(kd_0/\pi)(\sin \Theta_{x0} - \sin \Theta_x)$.
Figure 12A:
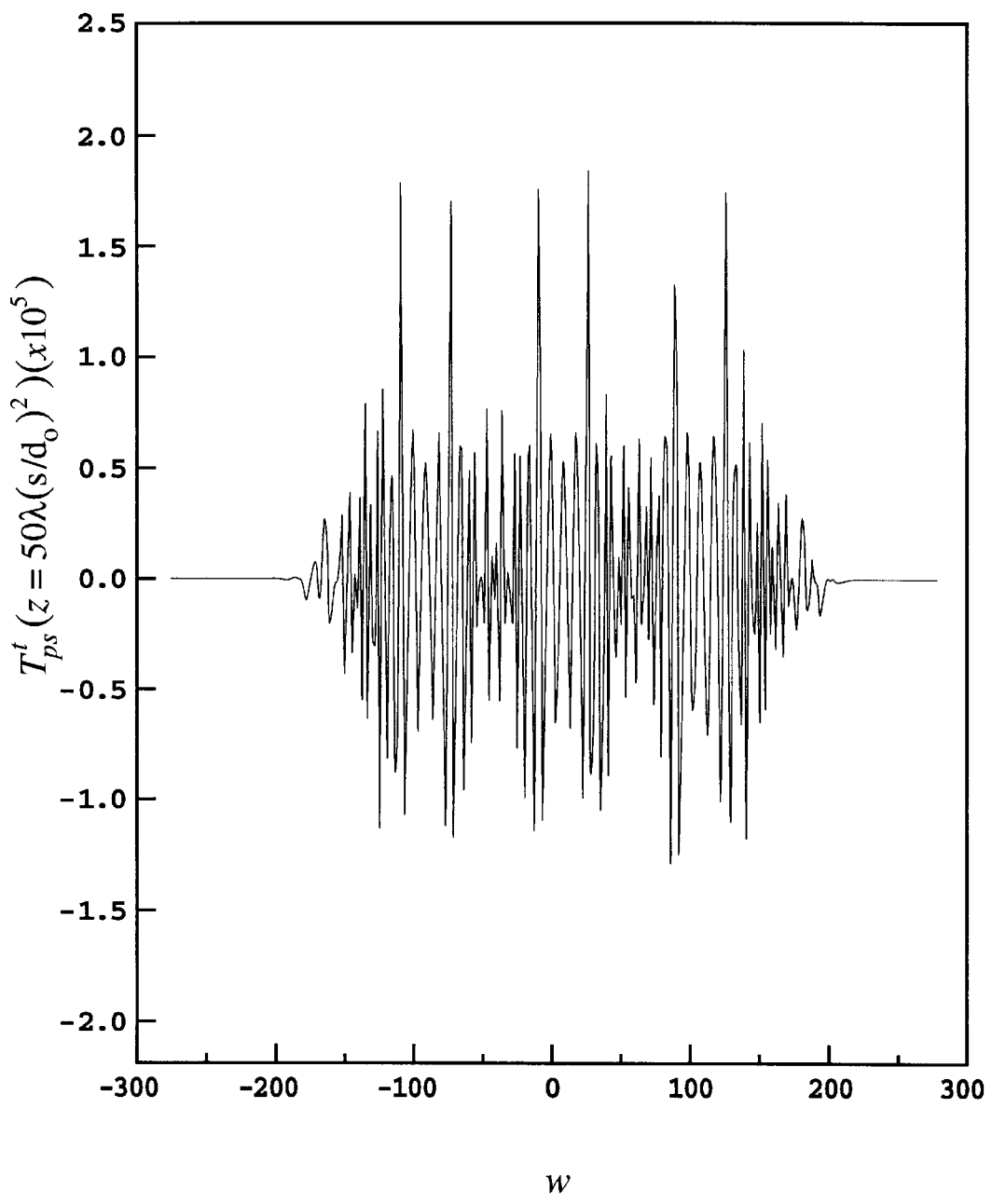
FIG. 12A is a graph showing the out-of-focus tomographic point source transfer function obtained with a Level 4 discrimination applied in conjunction with a Level 1 discrimination using the apodizing scheme of FIG. 10 with $(b/d_0)=0.70$ and $(c/d_0)=0.15$ for the four phase shifting element system (m=2) of FIG. 1 as a function of $w=(kd_0/\pi)(\sin \Theta_{x0} - \sin \Theta_x)$ at y=0 and $z=50 \lambda(s/d_0)^2$.
Figure 12B:
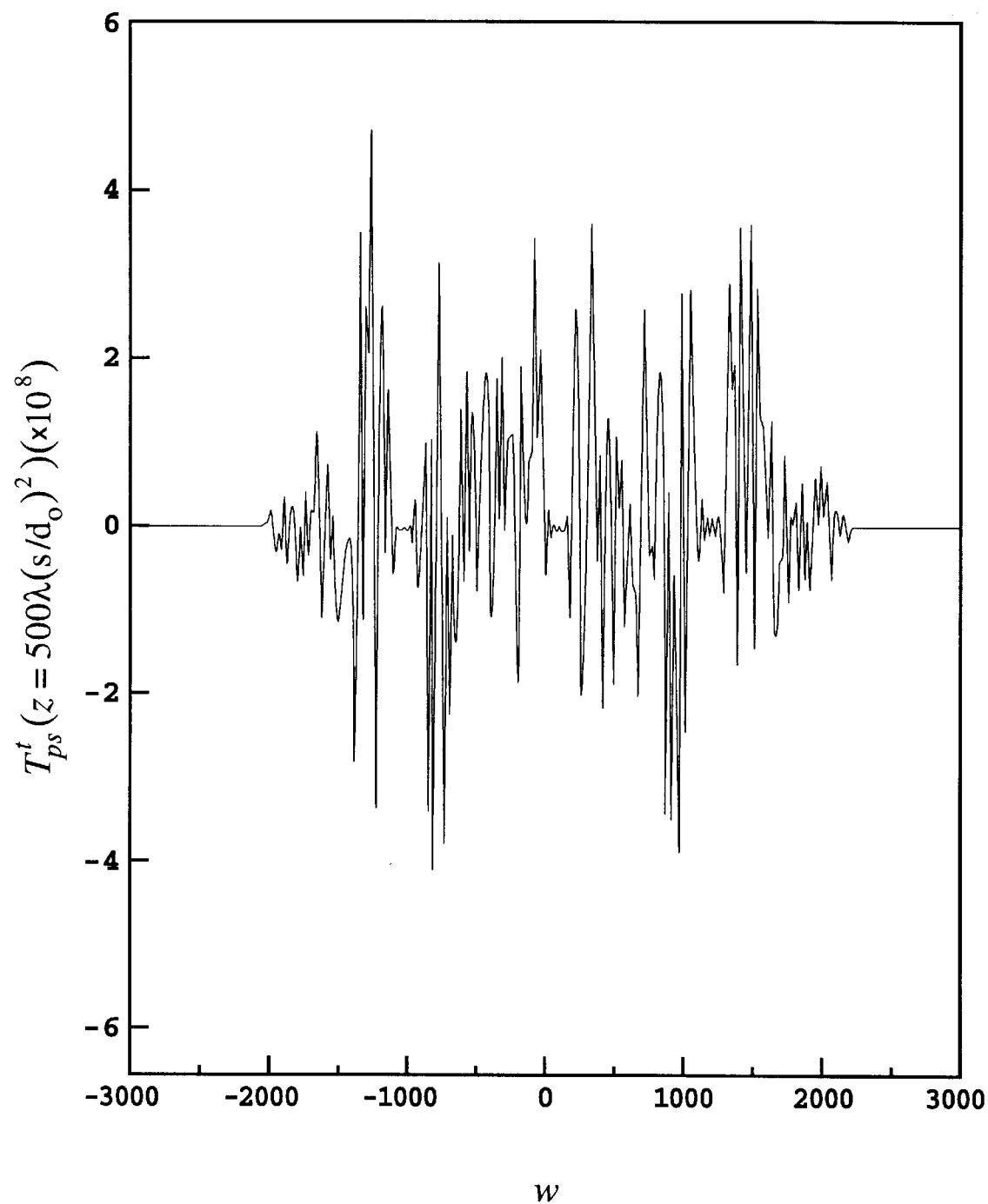
FIG. 12B is a graph showing the out-of-focus tomographic point source transfer function obtained with a Level 4 discrimination applied in conjunction with a Level 1 discrimination using the apodizing scheme of FIG. 10 with $(b/d_0)=0.70$ and $(c/d_0)=0.15$ for the four phase shifting element system (m=2) of FIG. 1 as a function of $w=(kd_0/\pi)(\sin \Theta_{x0} - \sin \Theta_x)$ at y=0 and $z=500 \lambda(s/d_0)^2$.

The function $T^t_{ps}(z=0)$ is plotted in FIG. 11 for the case of $(c/d_0)=0.70$ and $(c/d_0)=0.15$ in a system using 4 phase shift elements (m=2) and $\chi'_1=0$. Corresponding examples of $T^t_{ps}$ for out-of-focus images at $z=50\ \lambda(s/a)^2$ and $z=500\ \lambda(s/a)^2$ are shown in FIGS. 12A and 12B, respectively. A comparison of the results in FIGS. 12A and 12B with those in FIGS. 4C and 4D, respectively, shows that there is a significant improvement in the reduction of the out-of-focus background in comparison to that obtained using non apodized phase shifters. In this case the reduction is proportional to $(1/z^{7/2})$.

Figure 13:
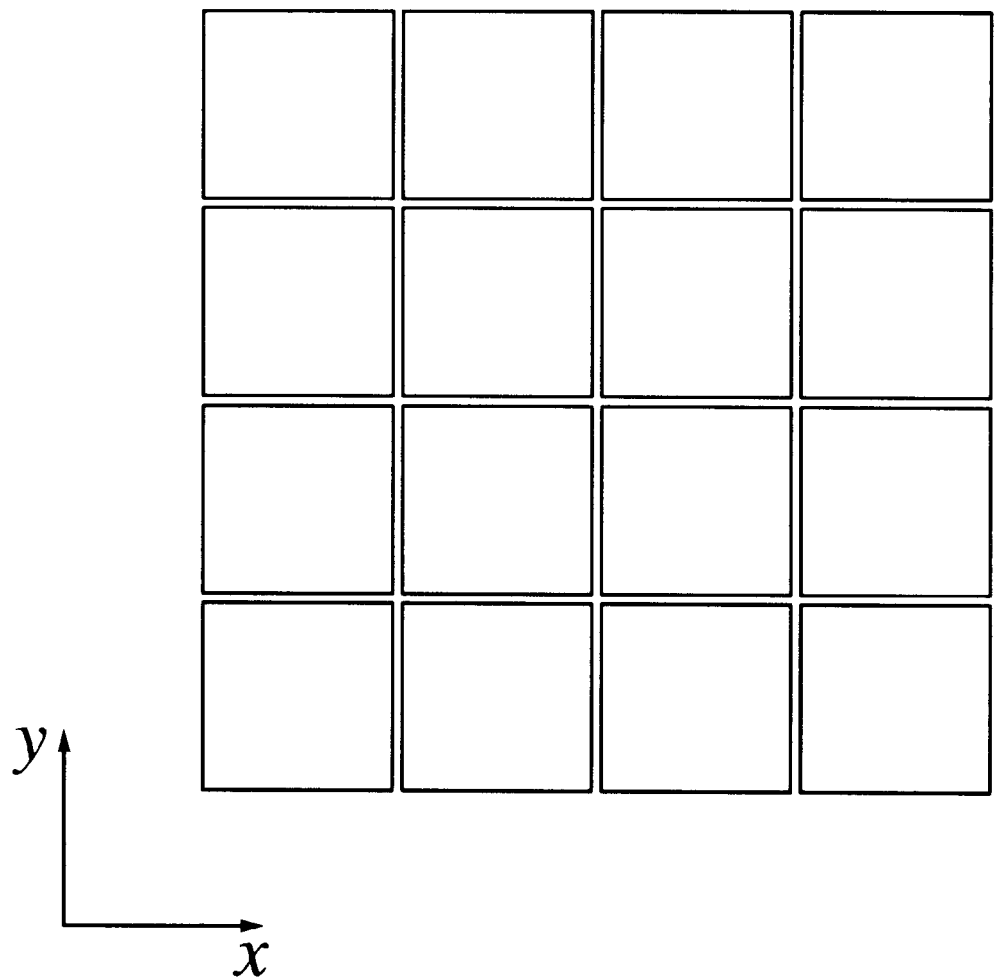
FIG. 13 illustrates a 2-D phase shifter plan where the elements are square in cross section and contain 4×4 elements.

The Level 2 discrimination is implemented by introducing a 2-D pattern of phase shift changes An example of a 2-D phase shifter which may be used in conjunction with the apodizing system of the Level 4 discrimination is shown in FIG. 13. The in-focus point source transfer function for the system employing such a scheme with apodization is $$T_{ps}(z=0) = \tag{29}$$

$$\left(\frac{1}{2}\right)\left(\frac{b}{d_0}\right)^2 \left[\text{sinc}\frac{kb}{2}(\sin\Theta_{xo} - \sin\Theta_x)\right]^2 \left[\text{sinc}\frac{kc}{2}(\sin\Theta_{xo} - \sin\Theta_x)\right]^2 \cdot \left(\frac{1}{2}\right)$$

$$\left(\frac{b}{d_0}\right)^2 \left[\text{sinc}\frac{kb}{2}(\sin\Theta_{yo} - \sin\Theta_y)\right]^2 \left[\text{sinc}\frac{kc}{2}(\sin\Theta_{yo} - \sin\Theta_y)\right]^2 \cdot$$

$$\left\{\frac{\sin m[kd_0(\sin\Theta_{xo} - \sin\Theta_x) + \chi'_1]}{m\sin[kd_0(\sin\Theta_{xo} - \sin\Theta_x) + \chi'_1]}\right\}^2$$

$$\left\{\frac{\sin m[kd_0(\sin\Theta_{yo} - \sin\Theta_y) + \chi'_3]}{m\sin[kd_0(\sin\Theta_{yo} - \sin\Theta_y) + \chi'_3]}\right\}^2 \cdot$$

$$\{1 + \cos[kd_0(\sin\Theta_{xo} - \sin\Theta_x) + \chi'_2]\}$$

$$\{1 + \cos[kd_0(\sin\Theta_{yo} - \sin\Theta_y) + \chi'_4]\}$$

where the phase shift for phase shifter (l,n) is $$\chi_{ln} = \left(l - m - \frac{1}{2}\right)\chi'_1 + \left(n - m - \frac{1}{2}\right)\chi'_3 + \frac{1}{2}(-1)^l \chi'_2 + \frac{1}{2}(-1)^n \chi'_4 \tag{30}$$

for l=1, ... ,2m and n=1, ... ,2m. The (l,n) sets correspond to the (x,y) coordinates of the phase shifter elements.

The tomographic point source transfer function is defined as $$T^t_{ps} = \left(\frac{1}{4}\right)[T_{ps}(\chi'_2 = 0, \chi'_4 = 0) + T_{ps}(\chi'_2 = \pi, \chi'_4 = \pi) - \tag{31}$$

$$T_{ps}(\chi'_2 = \pi, \chi'_4 = 0) - T_{ps}(\chi'_2 = 0, \chi'_4 = \pi)]$$

and for the in-focus image, is given by the equation $$T^t_{ps}(z=0) = \tag{32}$$

$$\left(\frac{1}{2}\right)\left(\frac{b}{d_0}\right)^2 \left[\text{sinc}\frac{kb}{2}(\sin\Theta_{xo} - \sin\Theta_x)\right]^2 \left[\text{sinc}\frac{kc}{2}(\sin\Theta_{xo} - \sin\Theta_x)\right]^2 \cdot \left(\frac{1}{2}\right)$$

$$\left(\frac{b}{d_0}\right)^2 \left[\text{sinc}\frac{kb}{2}(\sin\Theta_{yo} - \sin\Theta_y)\right]^2 \left[\text{sinc}\frac{kc}{2}(\sin\Theta_{yo} - \sin\Theta_y)\right]^2 \cdot$$

$$\left\{\frac{\sin m[kd_0(\sin\Theta_{xo} - \sin\Theta_x) + \chi'_1]}{m\sin[kd_0(\sin\Theta_{xo} - \sin\Theta_x) + \chi'_1]}\right\}^2$$

$$\left\{\frac{\sin m[kd_0(\sin\Theta_{yo} - \sin\Theta_y) + \chi'_3]}{m\sin[kd_0(\sin\Theta_{yo} - \sin\Theta_y) + \chi'_3]}\right\}^2 \cdot$$

$$\cos[kd_0(\sin\Theta_{xo} - \sin\Theta_x) + \chi'_2]\cos[kd_0(\sin\Theta_{yo} - \sin\Theta_y) + \chi'_4]$$

Figure 14A:
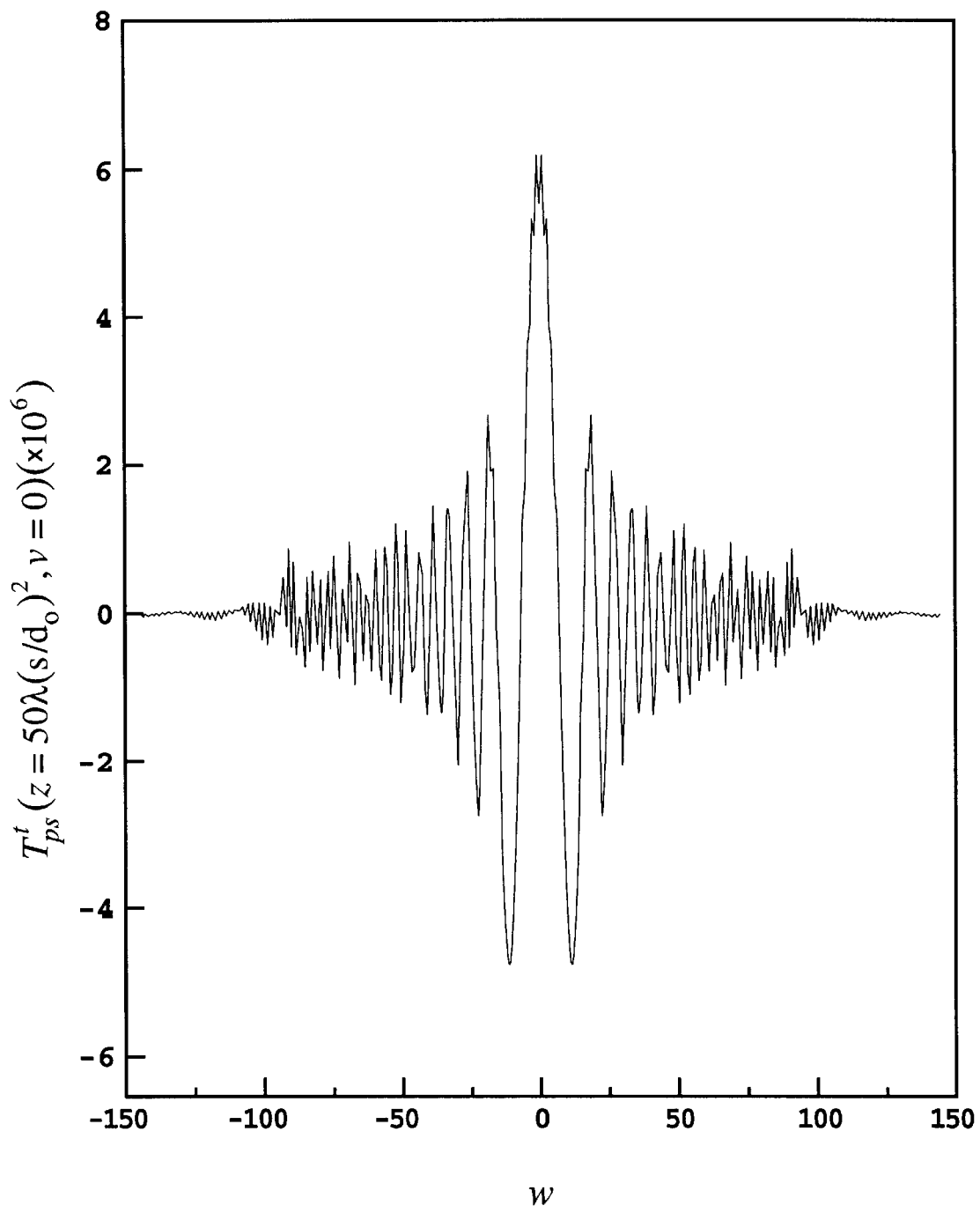
FIG. 14A is a graph showing the out-of-focus tomographic point source transfer function obtained with a Level 4 discrimination applied in conjunction with a Level 2 discrimination as a function of $w=(kd_0/\pi)(\sin \Theta_{x0} - \sin \Theta_x)$ at $v=(kd_0/\pi)(\sin \Theta_{y0} - \sin \Theta_y)=0$ and $z=50 \lambda(s/d_0)^2$. The Level 4 discrimination is achieved using the apodizing scheme of FIG. 10 with $(b/d_0)=0.70$ and $(c/d_0)=0.15$ for both the x and y directions.
Figure 14B:
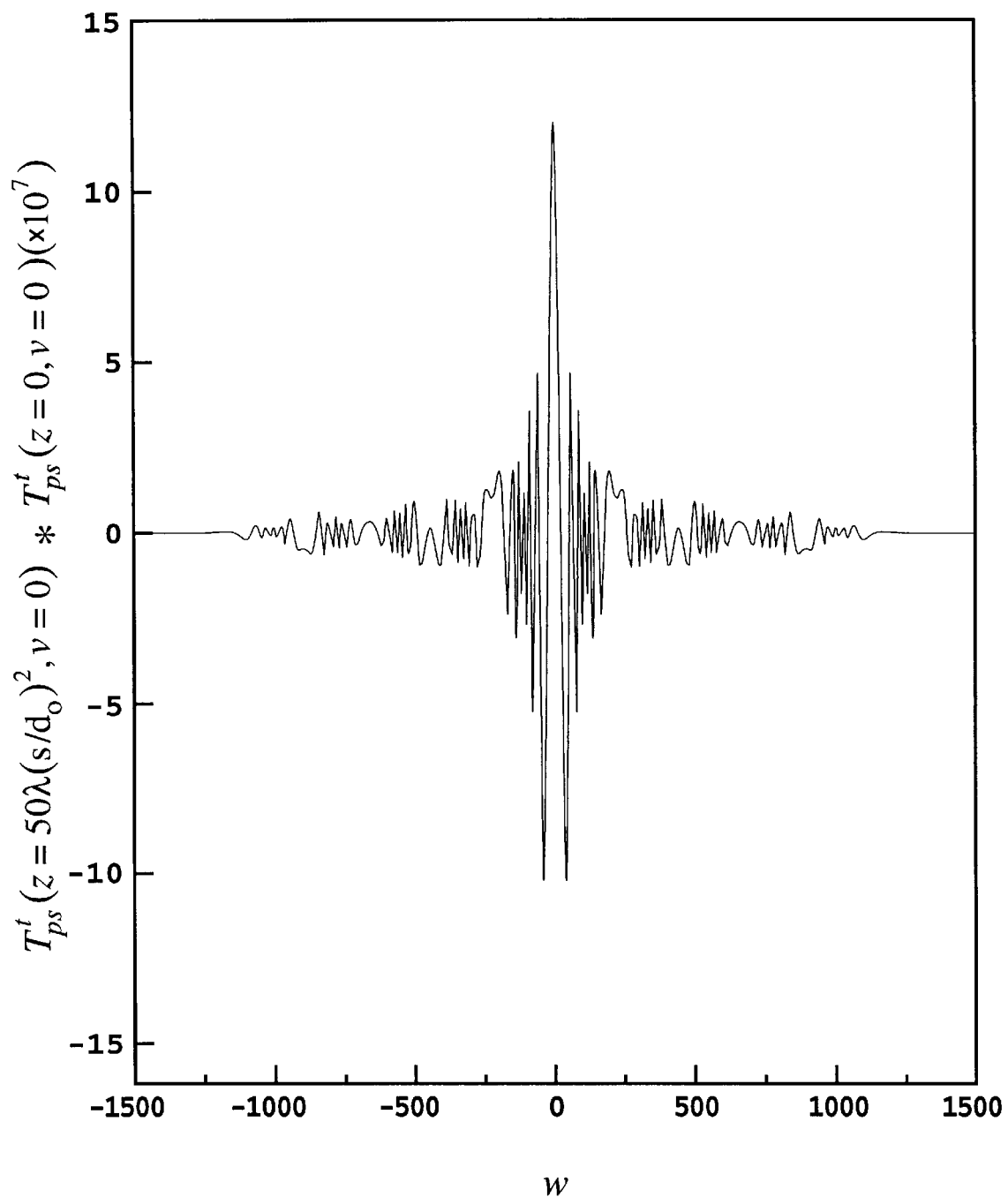
FIG. 14B is a graph showing the out-of-focus tomographic point source transfer function obtained with a Level 4 discrimination applied in conjunction with a Level 2 discrimination as a function of $w=(kd_0/\pi)(\sin \Theta_{x0} - \sin \Theta_x)$ at $v=(kd_0/\pi)(\sin \Theta_{y0} - \sin \Theta_y)=0$ and $z=500 \lambda(s/d_0)^2$. The Level 4 discrimination is achieved using the apodizing scheme of FIG. 10 with $(b/d_0)=0.70$ and $(c/d_0)=0.15$ for both the x and y directions.

This function plotted as a function of w with v=0 where $v=(kd_0/\pi)(\sin\Theta_{yo} - \sin\Theta_y)$ is the same as the one shown in FIG. 11. Corresponding examples of $T^t_{ps}$ for out-of-focus images with v=0 at $z=50\ \lambda(s/d_0)^2$ and $z=500\ \lambda(s/d_0)^2$ are shown in FIGS. 14A and 14B, respectively. A study of the properties of $T^t_{ps}$ given by equation (32) shows that in the case of $(b/d_0)=0.70$ and $(c/d_0)=0.15$ in a system using 4 phase shift elements (m=2) and $\chi'_1=0$, the reduction of the out-of-focus background is proportional to $(1/z^5)$. A comparison of the results in FIGS. 14A and 14B with those in FIG. 11 are in support of this conclusion.

It is important to note that the $T^t_{ps}$ is obtained with four different combinations of $\chi'_2$ and $\chi'_4$. However the combinations $$T_{ps}(\chi'_2=0,\chi'_4=0) + T_{ps}(\chi'_2=\pi,\chi'_4=\pi) \tag{33}$$

and $$T_{ps}(\chi'_2=\pi,\chi'_4=0) + T_{ps}(\chi'_2=0,\chi'_4=\pi) \tag{34}$$

can each be obtained with only one read-out of a CCD detector. Thus, the advantages of using the two dimensional matrix of phase shifters can be utilized without increasing the number of readouts beyond the two required to obtain the $T^t_{ps}$ of equation (3).

The Level 1 and 2 discriminations are introduced to reduce the signal due to constructive interference of the amplitude of an out-of-focus image with itself. There are also interference terms between the amplitude of the in-focus image and the amplitudes of the out-of-focus images. These mutual interference terms will however be greatly reduced as long as an incoherent source is used. If further reduction is required beyond that achieved with a non coherent source, a further reduction can be affected by frequency modulation of the source so that the frequency of the out-of-focus amplitudes is different from the frequency of the interfering in-focus amplitudes. The two frequencies will in general be different because of the difference in time of arrival at the detector of the in-focus and out-of-focus amplitudes, respectively.

Figure 15:
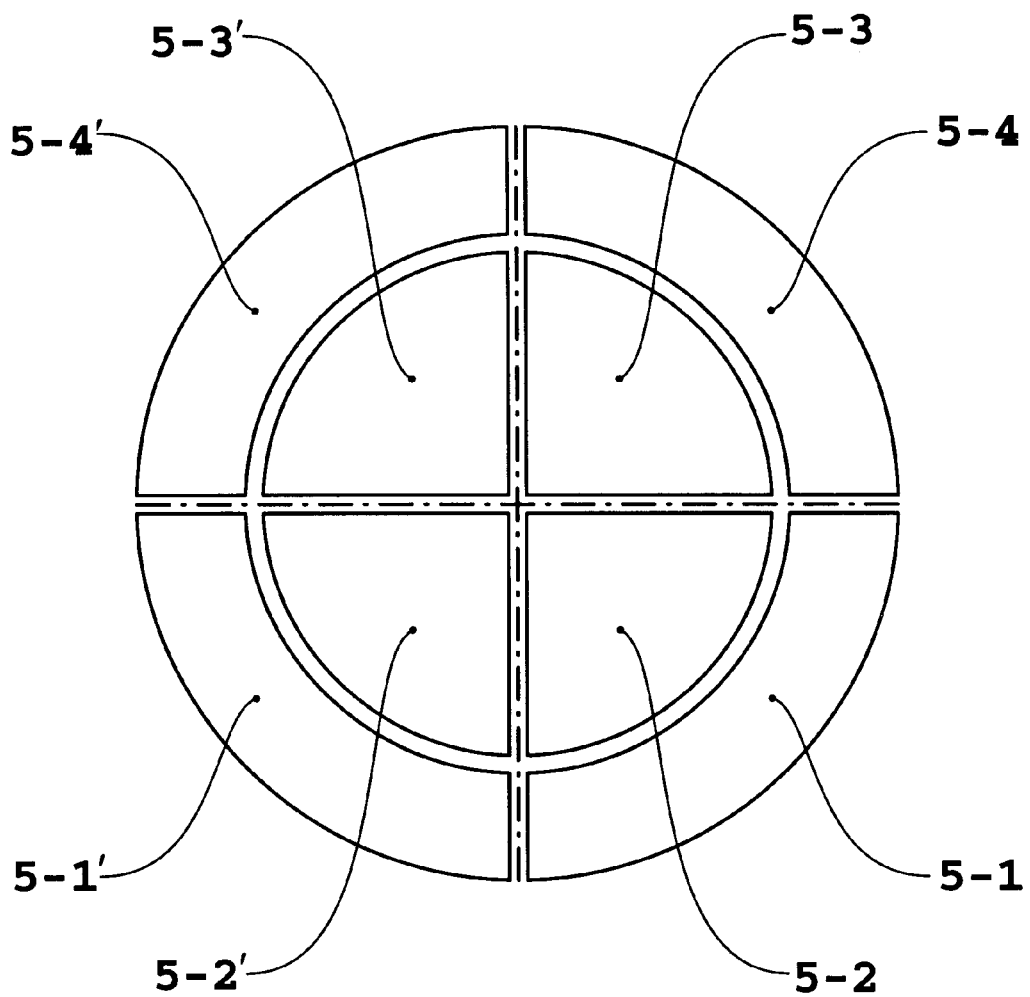
FIG. 15 illustrates phase shifter plan where the elements are sections of concentric annular rings.

The cross-sectional shape of the phase shifter elements and their spatial arrangement can be quite different from the rectangular arrangements for which performances have been given. A configuration encountered for example in phase contrast microscopes is a series of concentric annular rings. The background discrimination for such phase shifter elements would be similar to the Level 1 discrimination. If the annular rings were divided into sectors, then a Level 2 type of background discrimination could be arranged. An example of such a phase shifter is shown in FIG. 15, in which phase shifter elements 5-1, -2, -3, -4, and 5-1', -2', -3', -4' provide phase shifts in a two dimensional pattern.

The techniques described above for shifting the phases of the incident beam and processing intensity data in the image plane to discriminate against out-of-focus background/foreground light sources as described above in the context of tomographic imaging also may be used to produce what is equivalent to a slice of the object being put into a fluorescent state with a particular grid pattern, with the remaining space before and behind the slice under excitation remaining effectively in a non fluorescent state. This is achieved by using tomographic imaging to image a radiation source with a preselected spatial pattern (i.e., a grid pattern) into the slice of the object under study. The tomographic point source transfer function for such tomographic fluorescent slice will be the same as that defined by equation (3) as long as the time lapse between the sets of excitations is much greater than the lifetime of the fluorescent state.

Figure 6A:
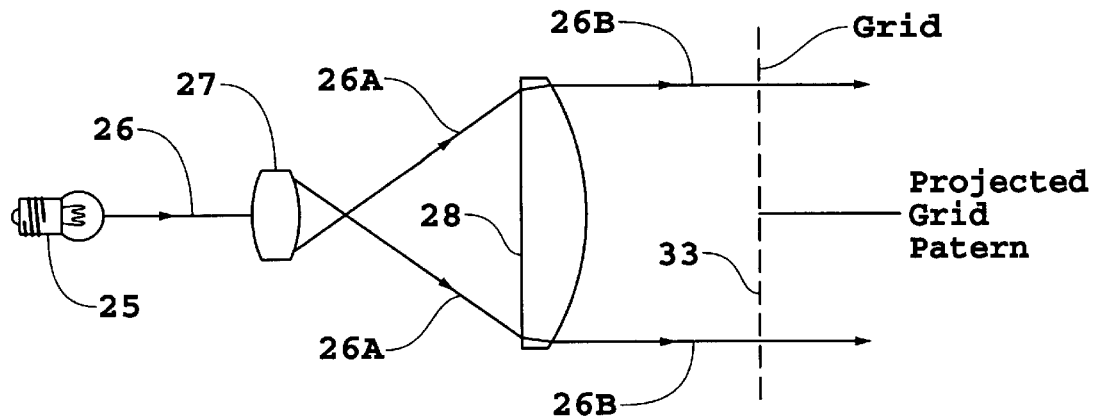
FIG. 6A is a schematic diagram of a light source for tomographic illumination of an object and/or stimulating tomographic fluorescence of an object.

FIG. 6A shows a suitable light source that can be used to provide a radiation source with a preselected spatial or grid pattern as mentioned above. A non coherent light source 25 emits non coherent light 26, which enters a short focal length lens 27 from which rays 26A diverge and then enter collimating lens 28. A portion of the collimated rays 26B then pass through a physical grid pattern 33.

Figure 6B:
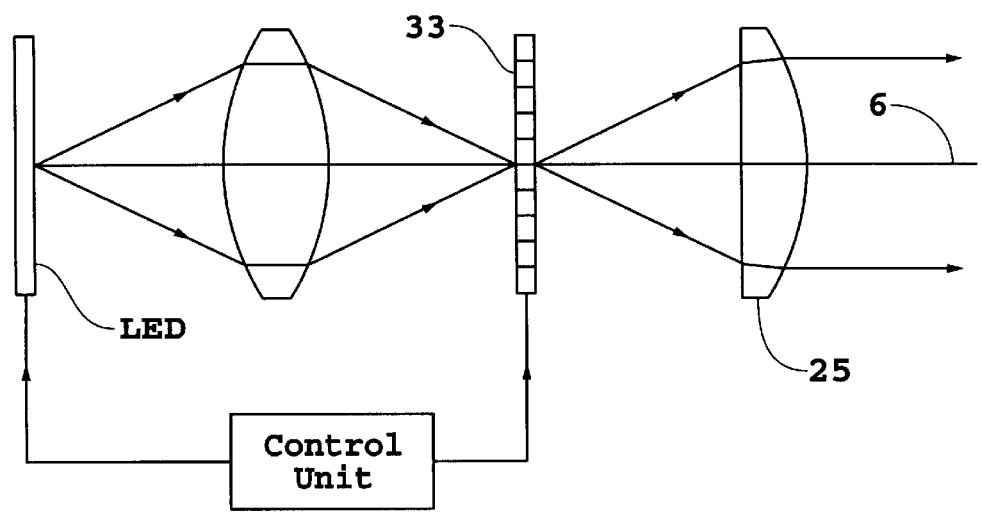
FIGS. 6B, C, D, E, and F show different source schemes to reduce interference effects (speckle pattern generation) in the out-of-focus images.
Figure 6C:
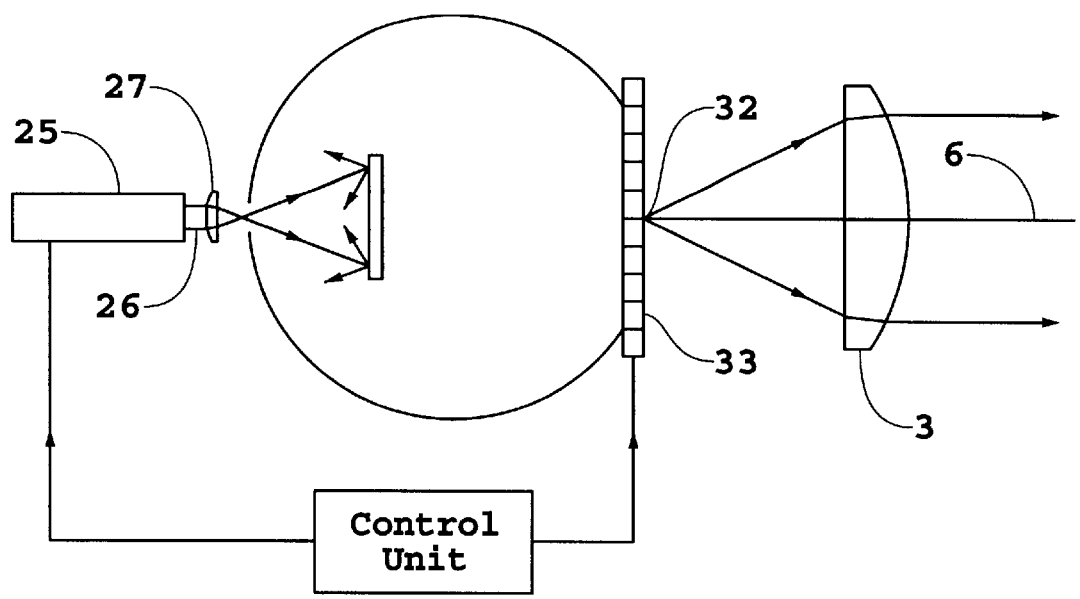

The light source in FIG. 6A could be an incandescent lamp, an arc or electric discharge. Another extended non coherent source is a light emitting diode (LED) as shown in FIG. 6B. FIG. 6C employs a sphere whose interior wall is coated with a highly reflective layer such as ®SPECTRALON. The light from the source 25 enters the chamber and is scattered by a plate which is highly reflecting. The light emerging from the grid 33 will be made non coherent by introducing a small amount of acoustic vibration on the first scattering plate. The loss of coherence is evident by the disappearance of a speckled pattern in the beam emerging at grid 33.

Figure 6D:
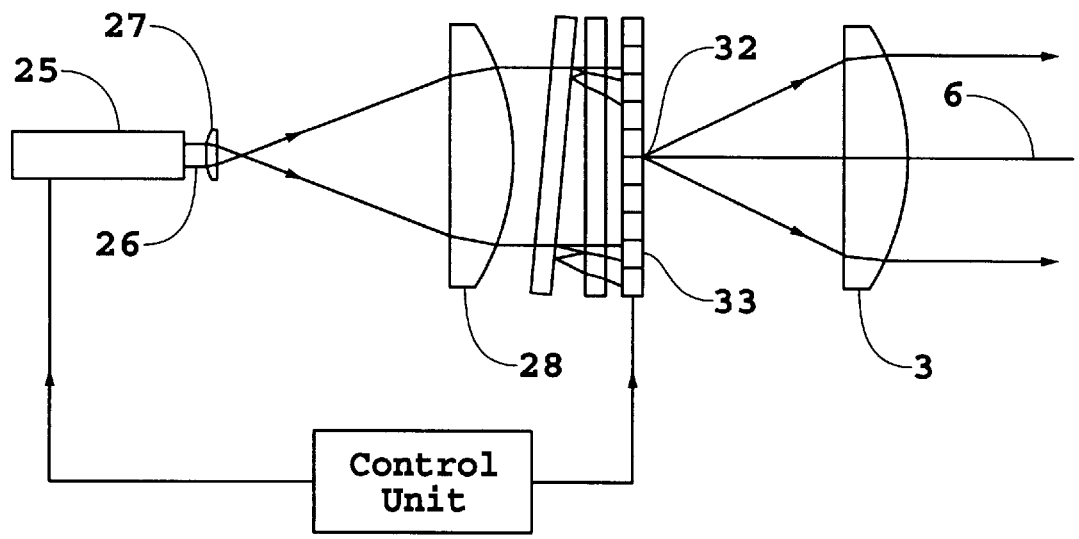
Figure 6E:
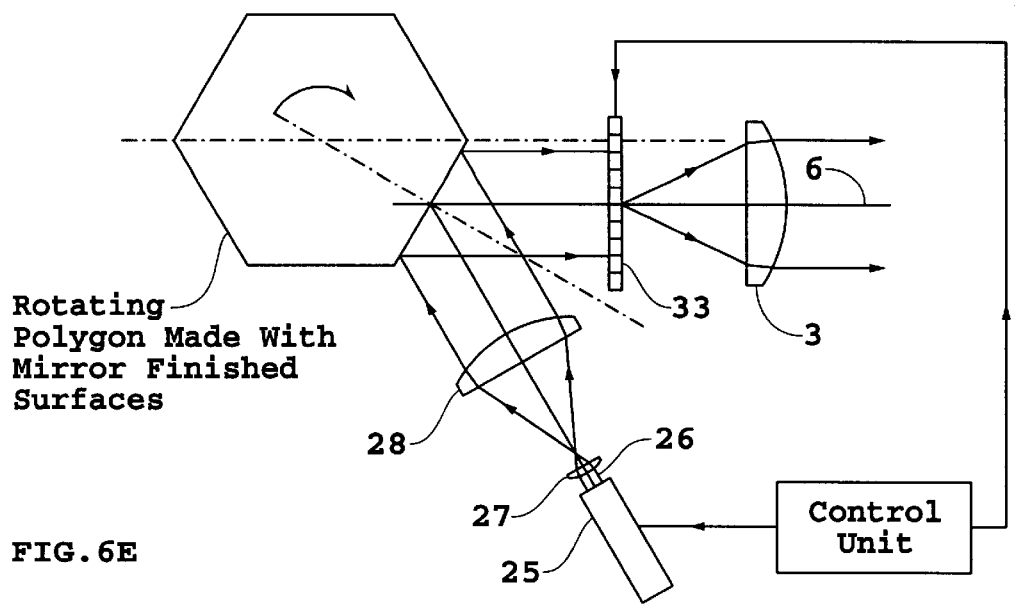
Figure 18:
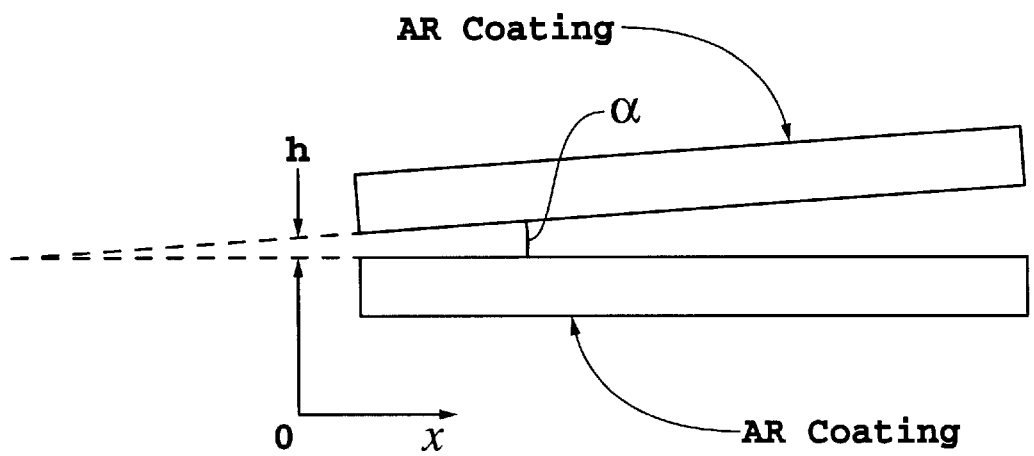
FIG. 18 is a schematic diagram of filter based on variant of the Fabry-Perot interferometer with a wedge angle α.

The source systems shown in FIGS. 6D and 6E eliminate coherence across the grid 33 by establishing a different light frequency for each grid row at grid 33. For the FIG. 6D system, the light source 25 with a spectral line width for example of the order of one nanometer is available in some diode lasers. After lens 28, there is a Fabry-Perot interferometer with a wedge angle between the Fabry-Perot plates. The frequency of the passbands for this filter depends on the location on the filter and therefore on the location on the grid 33. An example of this type of filter is shown in FIG. 18 and is a variant of a Fabry-Perot interferometer. The system in FIG. 6E can employ a narrow line laser for source 25 and uses a spinning polygon with reflecting faces to introduce a Doppler shift in the frequency of the radiation. The degree of Doppler shift depends on the point of reflection from the polygon face. Thus, the frequency of radiation will depend on the location on the grid 33.

Figure 6F:
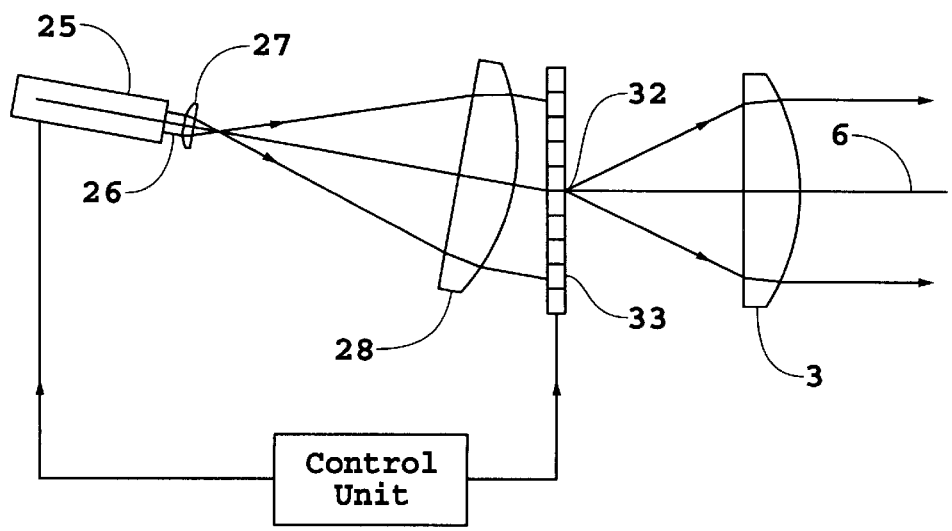

The source system shown in FIG. 6F does not eliminate coherence across the grid 33 but introduces a fixed relative phase shift in going from one grid row to the next grid row. By adjusting the angle between axis of light source 25 and lens 28 and the axis 6, this relative phase shift can be set, for example, at $\pi/2$ radians or 90°. This will eliminate all interference effects between one row of grid 33 and its first, third, fifth, etc. neighboring rows. The grid pattern will diffract a significant amount of light in the lens 3 so that the system can serve as an effective source.

In all of the source configurations in FIGS. 6A–F, the light source 25 can be operated in a pulsed mode so as to optimize the light available when the detector 19 is integrating or receiving light. This will keep the average power down for a given image signal, a particularly important feature when examining biological systems.

The option to use a radiation source with a translatable grid 33 containing a preselected spatial pattern as shown in FIGS. 6A–F can be significant. From tomographic imaging data, it is possible to obtain the Fourier transform of the in-focus image of a cross sectional slice of an object except for the spatial Fourier components at and/or near zero frequency (cf. FIG. 3), while exhibiting a greatly reduced sensitivity to the Fourier transform of out-of-focus images. This limitation can be overcome by the following procedure. The first step is to generate a series of images obtained by employing the tomographic imaging technology: the first tomographic image is obtained with the source grid 33 in one position and the subsequent nth image obtained with the grid 33 shifted by control unit by $(n-1)a"/2$ where a" is the width of transmission elements of source grid 33. The number of images obtained will be equal to $2b"/a"$ where b" is the center-to-center spacing between grid rows. The optimum performance will in general be obtained for $b"=2a"$ and a" equal to the resolvable source size. If not illuminating through a turbulent medium, the optimum value for a" will be the diffraction limited size. The addition of the series of images will produce a composite image of the object plane that contains with relatively high sensitivity the spatial Fourier components at and/or near zero spatial frequencies as well as the higher spatial frequencies while retaining a greatly reduced sensitivity to out-of-focus images at all spatial frequencies. The addition and subtraction of various combinations of images selected from the set can be designed to produce a composite image with enhanced information about the object plane at the higher spatial frequencies.

Tomographic imaging used in conjunction with tomographic fluorescence gives rise to even more effective discrimination between in-focus images and out-of-focus images than using tomographic fluorescence alone.

Figure 7:
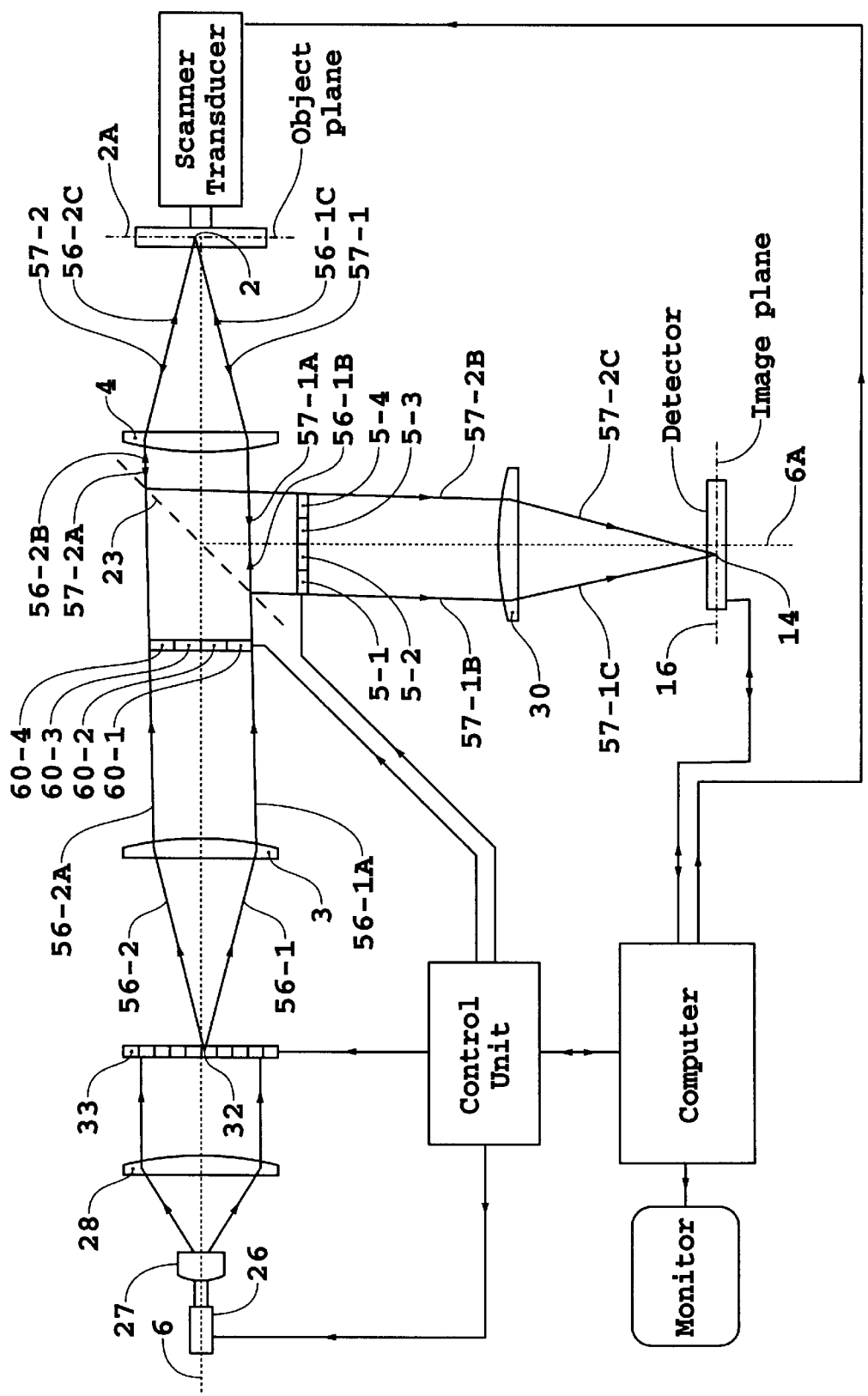
FIG. 7 is a schematic diagram of an embodiment of the invention in back scattering configuration that permits utilization of (1) both tomographic fluorescence and tomographic imaging, or (2) both tomographic imaging and tomographic illumination of an object.

An example of an optical configuration that permits the utilization of both tomographic fluorescence and tomographic imaging is shown in FIG. 7. In FIG. 7, the object to be imaged includes an object point 2 in object plane 2A. Light ray 56-1 and 56-2 are emitted or reflected from a point 32 of a spatial grid 33 of a non-coherent light source such as the one shown in FIG. 6 enter collimating lens 3. Parallel rays 56-1A and 56-2A exit collimating lens 3 and pass through phase shifters 60-1-2,-3,-4. Some of them pass through beam splitter 23 as rays 56-1B and 56-2B and enter imaging lens 4.

Rays 56-1B and 56-2B transmitted through beam splitter 23 are focused by imaging lens 4 as rays 56-1C and 56-2C onto object point 2 in object plane 2A, thereby illuminating and/or stimulating object point 2. Object point 2 then reflects or emits rays 57-1 and 57-2 back to imaging lens 4 which collimates rays 57-1 and 57-2 to produce rays 57-1A and 57-2A, some of which are reflected downward by beam splitter 23 as rays 57-1B and 57-2B, which pass through phase shifters 5-1,-2,-3,-4, enter imaging lens 30, and are focused onto point 14 in image plane 16.

A first "exposure" $I_1$ of object points such as 2 in object plane 2A can be taken by means of a detector located in image plane 16 to measure the intensity values. A second "exposure" $I_2$ then is taken with the phase shifters 5-1 and 5-3 adjusted to change the phase by, for example, $\pi$ of light passing through these two phase shifters and focused by imaging lens 30. The resulting image data is subtracted from the first, producing image data in which light scattered from "object space" behind or front of object plane 2A is canceled (tomographic imaging). Third and fourth "exposures" $I_3$ and $I_4$ can be taken in which image intensity data in image plane 16 is measured with the same sequence of phase shift combinations, used in the first and second exposures, respectively, except that phase shifters 60-1 and 60-3 adjusted by, for example, π. The fourth image data is subtracted from the third, again producing image data in which light scattered from the "object space" behind or in front of the object plane 2A is reduced. Both these two sets of image data have reduced the light arising from scattering in the object other than that from the object plane 2A itself (tomographic imaging). A further reduction of the scattered light can be achieved by subtracting the difference of the third and fourth image data sets from the difference of the first and second image data sets. This subtracting reduces the contribution of the out-of-focus image intensity of the source 33 in object 16 (tomograpic imaging plus tomograpic illumination). This results in a level of discrimination of in-focus image data from scattered light data that roughly speaking is equal to the multiplication of the reduction factors achieved in the source (tomograpic illumination) and image sections (tomograpic imaging).

The difference of the first and third image data sets produces an image data in which light from the source grid 33 that is in the "object space" behind or in front of the object plane 2A is effectively reduced. This is referred to as tomographic illumination if observing light scattered or transmitted by the object or tomographic fluorescence if observing fluorescent light from the object. One can choose to reduce the background by using the tomographic imaging technique, the tomographic fluorescence technique, or both simultaneously. In any one of these three modes of operation, the requisite image data sets can be obtained with only two read-outs of an integrating detector such as a CCD.

The formulas for the tomographic image $I^t$ in terms of $I_1$, $I_2$, $I_3$, $I_4$ of properties of the source function S of the source 33, and the scattering (or transmitting) function O of object 16 are $$I^t = \left(\frac{1}{4}\right)[(I_1 + I_4) - (I_2 + I_3)] \qquad (35)$$

and $$I^t T^t_{ps,i} * [O(T^t_{ps,f} * S)] \qquad (36)$$

where $T^t_{ps,i}$ is equal to $T^t_{ps}$ for the object imaging section using the phase shift schedule given in equation (2). The $T^t_{ps,f}$ is given by the equation $$T^t_{ps,f} = \left(\frac{1}{2}\right)[T_{ps}(\chi'_6 = 0) - T_{ps}(\chi'_6 = \pi)] \qquad (37)$$

for the source imaging section using the phase shift schedule $$\chi_n = \left(n - m - \frac{1}{2}\right)\chi'_5 + \frac{1}{2}(-1)^n \chi'_6; \quad n = 1, ..., 2m \qquad (38)$$

in the source section phase shifter 60 where $\chi_n$ is the phase shift introduced by the nth element of phase shifter 60.

The broadband feature of the tomographic imaging can be of value when using fluorescent sources that have relatively broad emission lines. All of the spectrum of the fluorescence radiation not overlapping the spectrum of the excitation source can be used to optimize the signal-to-noise ratio.

The introduction of a fluorescent object with a selected spatial (grid) pattern can make it possible to measure the speed of blood in blood vessels and capillaries, in addition to making it possible to obtain information at or near zero Fourier spatial frequencies. This can be accomplished by operating the source 25 in a pulsed mode and watching for systematic shifts in the images of fluorescing "slices" of the blood as a function of the delay between the time when the source is pulsed and the time when the tomographic fluorescent image is obtained. A typical value for the lifetime of a fluorescence state would have to be roughly a few milliseconds to accomplish accurate determination of blood flow speeds of a few millimeters per second.

Figure 8:
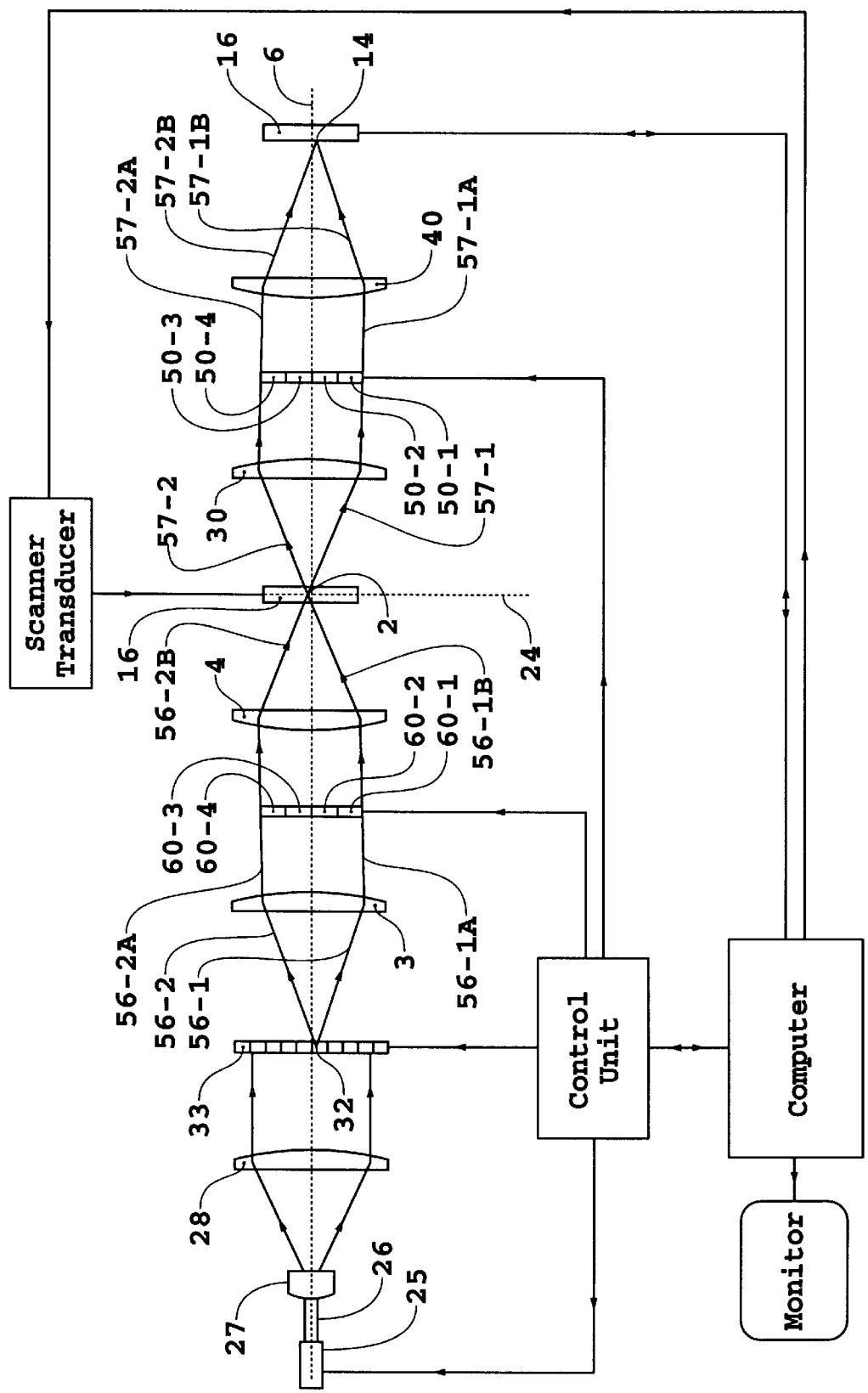
FIG. 8 is a schematic diagram of an embodiment of the invention in transmission configuration that permits utilization of (1) both tomographic fluorescence and tomographic imaging, or (2) both tomographic imaging and tomographic illumination of an object.

Tomographic imaging used in conjunction with tomographic fluorescence or illumination in the optical configuration shown in FIG. 7 is designed to measure the radiation emitted at an average angle of $\Phi=\pi$ with respect to the average direction of the light beam used for excitation or illumination. However, other average values of $\Phi$ are achievable. An example of an optical configuration having an average of $\Phi=0$ is shown in FIG. 8.

Improved performance of the background compensating system for broadband sources will be obtained when the phase shift produced by the phase shifters is not dependent on wavelength. In order to provide such a phase shift over a broad frequency range, the optical path difference between the two telescopes referred to in Hill op. cit. must be a linear function of wavelength, with the optical path difference increasing linearly with wavelength. By replacing the phase shifter $PS_1$ and $PS_2$ of FIG. 16 with the phase shifters of the type shown in FIG. 9, it is possible to meet the broadband requirements by appropriately designing $PS_1$ and $PS_2$ as types such as disclosed Hill et al. in U.S. Pat. No. 4,213,706 issued Jul. 22, 1980 and Hill et al. in U.S. Pat. No. 4,304,464 issued Dec. 8, 1981, both incorporated herein by reference.

Figure 9:
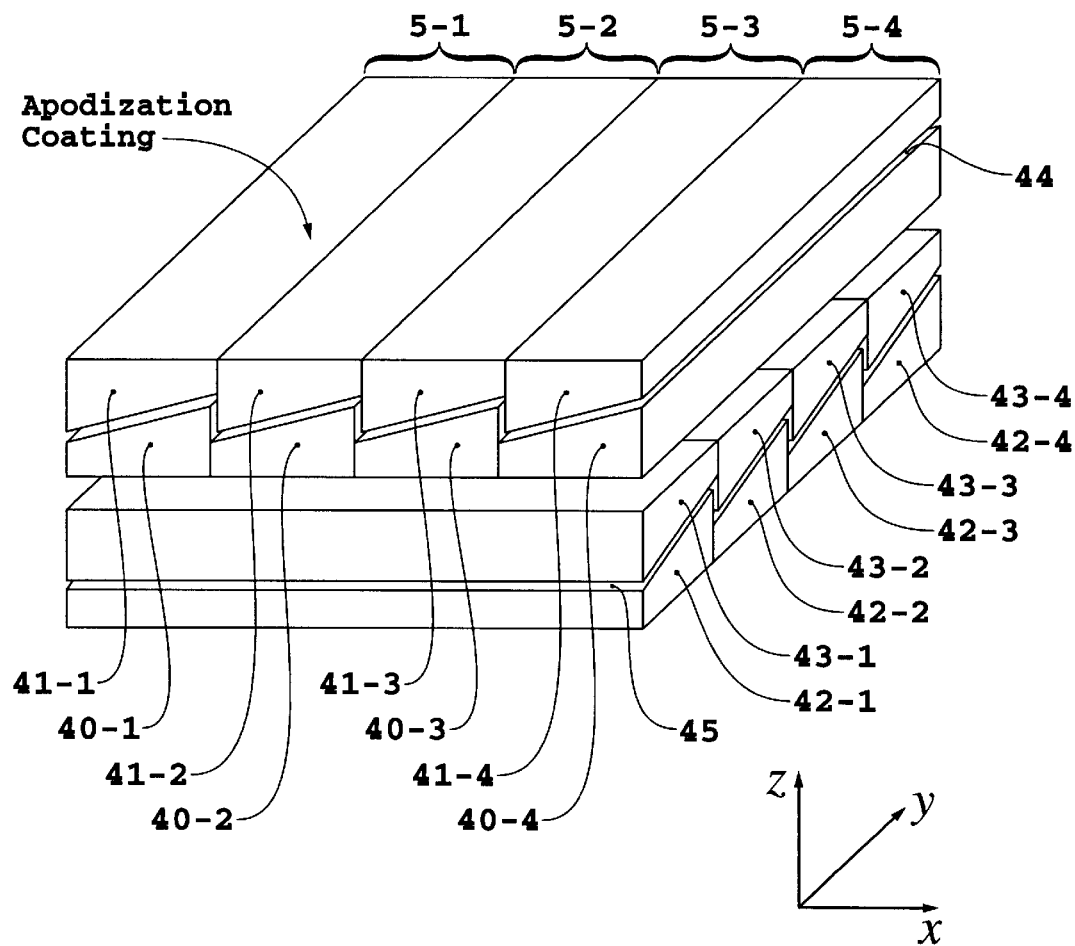
FIG. 9 is a diagram of a broadband 2-D phase shifter useful in the various embodiments of the present invention.
Figure 17:
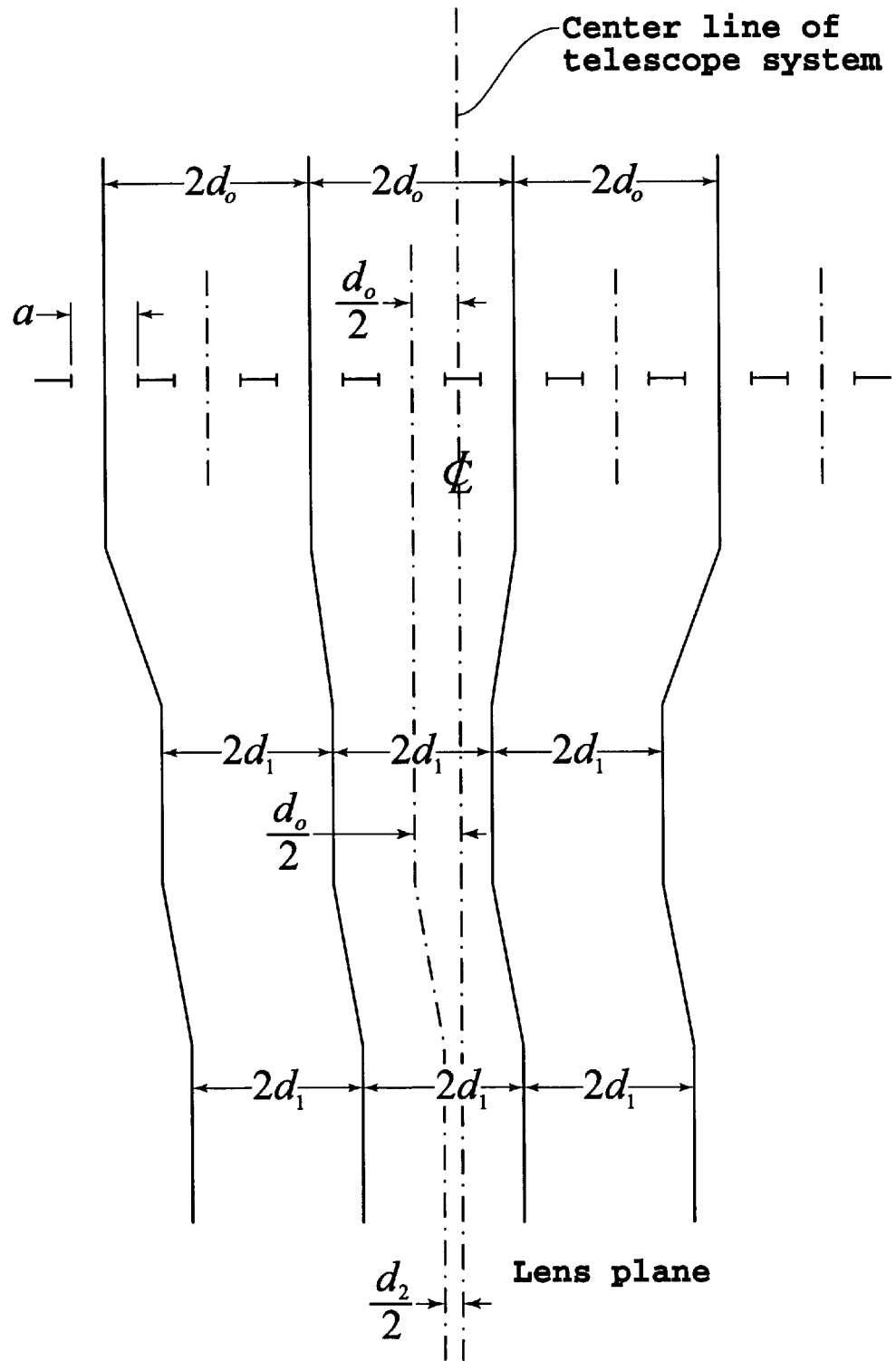
FIG. 17 illustrates a schedule of lateral shears used in one half of optical system shown in FIG. 16.

A design of a broadband phase shifter for the embodiments of FIGS. 7A, 7B, and 17 is shown in FIG. 9, which is based on above mentioned U.S. Pat. No. 4,304,464. Sections 40-1, 40-3, 41-1, 41-3, 42-1, 42-3, 43-1, and 43-3 are plates of glass of a particular type, and plates 40-2, 40-4, 41-2, 41-4, 42-2, 42-4, 43-2, and 43-4 are plates of glass of another type having a different index of refraction. Numerals 44 and 45 designate air gaps, which might be approximately 0.5 millimeters wide. The changes in the phase shift χ are achieved by moving the panel 40 in the ±x direction relative to the panel 4', for example by means of a piezoelectric transducer. Arrows 5-1, 5-2, 5-3, and 5-4 correspond to the portions of the phase shifter of FIG. 9 which in turn correspond to phase shifters 5-1, 5-2, 5-3, and 5-4 in the various embodiments of FIGS. 1, 7, and 8. The total thickness of glass of each such phase shifting section therefore changes if plate 40 is shifted in the ±x direction relative to plate 41. The device produces a broadband change in optical path or a change in phase shift, i.e. a change in phase shift over a broad range of wavelengths that is Independent of λ.

Figure 16:
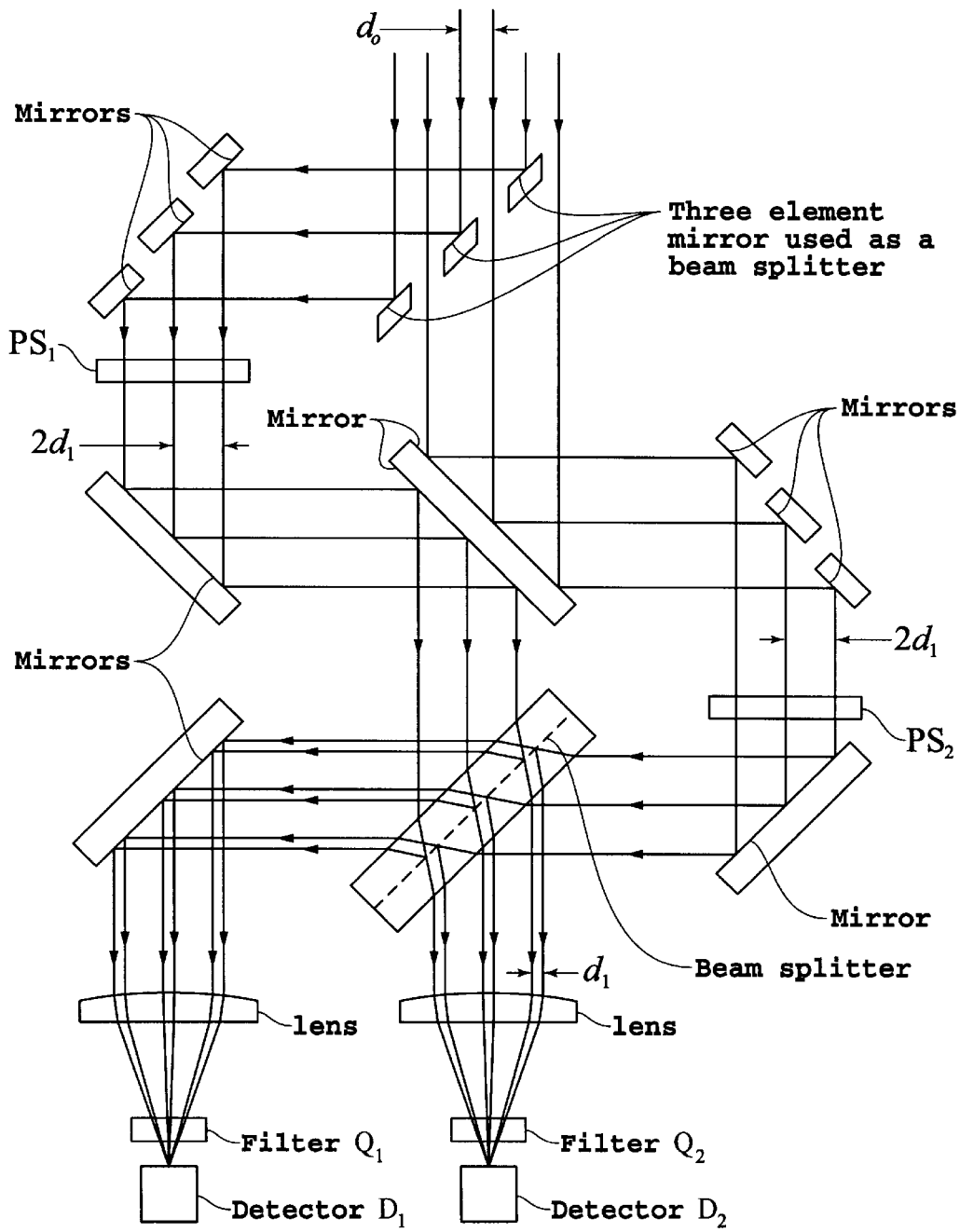
FIG. 16 is a schematic diagram of optical system where a set of lateral shears are introduced into sections of the wave front of an optical beam in addition to phase shifts.

Improvements in performance in and the incorporation of additional features to the tomographic imaging and tomographic illumination techniques are possible with the system shown in FIG. 16. The system of FIG. 16 is a generalization or the basic system shown in FIG. 1 and introduces a set of lateral shears in addition to a set of phase shifts in different portions of the incoming wavefront. The schedule of the lateral shears for one half of the system in FIG. 16 is reproduced in FIG. 17. The point source spread function $T_{ps}$ for the system which incorporates the set of lateral shears shown in FIG. 17 with 2m spatial beam-splitter elements and rectangular apertures is $$T_{ps} = \left(\frac{1}{2}\right)\left(\frac{a}{d_0}\right)^2 \left\{\text{sinc}\left[\frac{ka}{2}\left(\sin\Theta_{x0} - \right.\right.\right. \quad (39)$$

$$\left.\left.\left.(\sin\Theta_x)\right]\right\}\right)^2 \left\{\frac{\sin m[k(d_0\sin\Theta_{x0} - d_1\sin\Theta_x) + \chi''_1]}{m\sin[k(d_0\sin\Theta_{x0} - d_1\sin\Theta_x) + \chi''_1]}\right\}^2 \cdot$$

$$\{1 + \cos[k(d_0\sin\Theta_{x0} - d_2\sin\Theta_x) + \chi''_2]\}.$$

where $\chi_n = [(n-m-\frac{1}{2})\chi''_1 + (\frac{1}{2})(-1^n)\chi''_2]$ for $n=1,2,\ldots,2m$ are the phase shifts introduced by the phase shifters as shown in FIG. 16. Note that in order that there be no $\chi''_2$ dependent contribution from background signals in the geometric limit, $$a \leq d_0. \quad (40)$$

However, there will remain under this condition a background signal dependent on $\chi''_2$ as a result of diffraction.

Note that the basic system is a special case of the more general system when $$a=d_0,\ d'_0=d_0,\ d_1=d_0,\ d_2=d_0,\ \chi''_1=0,\ \chi''_2=\chi. \quad (41)$$

Let this special case be denoted as Variant 1.

A second example of a viable system, Variant 2, that meets the condition of equation (40), i.e., $a \leq d_0$, is realized with $$a=d_0,\ d'_0=d_0,\ d_1=0,\ d_2=d_0,\ \chi''_2=\chi''_1+\chi''. \quad (42)$$

The $T'_{ps}$ for this system is obtained from $(\frac{1}{2})[T_{ps}(\chi''=0) - T_{ps}(\chi''=\pi)]$ and is $$T'_{ps} = \left(\frac{1}{2}\right)\left\{\text{sinc}\left[\frac{kd_0}{2}(\sin\Theta_{x0} - \sin\Theta_x)\right]\right\}^2 \left\{\frac{\sin m(kd_0\sin\Theta_{x0} + \chi''_1)}{m\sin(kd_0\sin\Theta_{x0} + \chi''_1)}\right\}^2 \cdot \quad (43)$$

$$\cos[k(d_0\sin\Theta_{x0} - d_2\sin\Theta_x) + \chi''_1].$$

The interpretation of images for this $T'_{ps}$ will remain relatively simple and the relative signal strength remain relatively high as long as the phase of $\sin(kd_0 \sin \Theta_{x0}+\chi''_1)$ meets the condition $$\sigma(kd_0\sin\Theta_{x0} + \chi''_1) \lesssim \frac{\pi}{4} \quad (44)$$

for each maximum or transmission peak of $$\left[\frac{\sin m(kd_0\sin\Theta_{x0} + \chi''_1)}{m\sin(kd_0\sin\Theta_{x0} + \chi''_1)}\right]^2, \quad (45)$$

But the numerator of equation (45) actually is the factor that determines $\sigma(kd_0 \sin \Theta_{x0}+\chi''_1)$ with the result that $$\sigma(kd_0\sin\Theta_{x0} + \chi''_1 - p\pi) = \frac{1.4}{m} \quad (46)$$

where $$kd_0 \sin \Theta_{x0}+\chi''_1=p\pi \quad (47)$$

for the transmission peaks of equation (45) and p is an integer. Thus the condition of equation (44) is met for $$m \geq 2 \quad (48)$$

It is desirable to place an additional restriction on k so that the corresponding values of k and $\Theta_{x0}$ will permit an image to be obtained from the detector that will yield an improved signal-to-noise ratio (in respect to strength of in-focus signal to strength of out-of-focus signals). For this to be the case, it is necessary to require that $$\sigma(\sin\Theta_{x0}) \lesssim \frac{\pi}{4kd_0} \quad (49)$$

where $\pi/(kd_0)$ corresponds to the change in $(kd_0 \sin \Theta_{x0}+\chi''_1)$ as a result of a change in p by 1.

From equation (46), we find $$(kd_0)^2\sigma^2(\sin\Theta_{x0}) + (kd_0)^2(\sin\Theta_0)^2\left(\frac{\sigma_k}{k}\right)^2 = \frac{2}{m^2}. \quad (50)$$

Choosing to operate in a mode where each of the two terms on the left hand side of equation (50) contribute equally to the left hand side, then $$kd_0\sigma(\sin\Theta_{x0}) = \frac{1}{m} \quad (51)$$

and $$kd_0\sin\Theta_{x0}\left(\frac{\sigma_k}{k}\right) = \frac{1}{m}. \quad (52)$$

By comparing equations (49) and (51), we conclude that $$m \gtrsim \frac{4}{\pi}. \quad (53)$$

Thus the condition on m set by equation (48) is the more restrictive one. The corresponding value for $(\sigma_k/k)$ is obtained by combining equations (47) and (52). The result is $$\left(\frac{\sigma_k}{k}\right) = \frac{1}{mp\pi\left(1 - \frac{\chi''}{p\pi}\right)}. \quad (54)$$

Note the restriction on the $p\sigma_k$ product in equation (54) or a corresponding restriction on the $(\sin \Theta_{x0})\sigma_k$ product in equation (52) since $(p\pi-\chi'_1)$ is proportional to $\sin \Theta_{x0}$ (cf. equation (47)).

The system represented by the $T'_{ps}$ of equation (43) has all of the tomographic applications in the tomographic imaging, tomographic illumination, and tomographic fluorescence of the applications of Variant 1. Variant 2 also has another important feature. Variant 2 may be thought of as mapping onto the object space or i.e., onto $\Theta'_{x0}$ a reference grid with a spacing $\Delta(\sin \Theta'_{x0})=\Delta(\sin \Theta_{x0})$ between grid lines given by $$\Delta(\sin\Theta_{x0}) = \frac{\lambda}{2d_0}. \quad (55)$$

In particular, information on the object is accessible only at a specific set of values of $\Theta_{x0}$ given by equation (47). Other sets of values of $\Theta_{x0}$ are accessible by making a change in the optical axis of the system or a change in $\chi''_1$. If $\lambda$ and $d_0$ are known, then the set of object space angles conjugate to $\Theta_{x0}$ given by equation (47) is equivalent to an absolute angle calibration grid for a reference use in metrology. The system can also be used to produce grid lines that are narrower than the width of the detector pixels, thus effectively improving the spatial resolution of the detector.

Variant 2 shares with Variant 1 the property of exhibiting a reduced sensitivity to the low spatial frequency Fourier components of the object section being imaged. If it is possible to use a translatable grid patterned source such as described in FIGS. 6A, B, C, D, E, F, this reduced sensitivity of Variant 2 can be overcome by the procedure used to overcome the same problem encountered with Variant 1.

There is another variant, Variant 3, that although it is not as effective in background compensation as Variants 1 and 2, it does not have the reduced sensitivity of Variants 1 and 2 to the low spatial Frequency Fourier components of the section of the object being imaged. Variant 3 is realized with $$a = 2d_0, \ d'_0 = d_0, \ d_1 = 0, \ d_2 = d_0, \ \chi_2 = \chi_1 + \chi. \tag{56}$$

The $T^t_{ps}(z=0)$ for this system is $$T^t_{ps}(z=0) = \tag{57}$$

$$2\{\text{sinc}\,[kd_0(\sin\Theta_{x0} - \sin\Theta_x)]\}^2 \left[\frac{\sin m(kd_0\sin\Theta_{x0} + \chi_1)}{m\sin(kd_0\sin\Theta_{x0} + \chi_1)}\right]^2 \cdot$$

$$\cos[kd_0(\sin\Theta_{x0} - \sin\Theta_x) + \chi_1 + \chi].$$

Variant 3 can also be used to map a set of reference grid lines on the image space angle $\Theta_{x0}$. The locations of the reference grid lines is also given by equation (47).

The restriction on the $p\sigma_k$ product expressed by equation (54) can be replaced with a less restrictive one by placing an appropriate optical filter in front of detector 16 or in front of lens 30 and lens 40 in FIGS. 7 and 8, respectively. Two examples of filters are given. The first to be considered permits broadband operation in k but at a loss of the use of a reference grid. The second example to be given will allow an increased bandwidth operation while maintaining the reference grid but at a loss in range of $\Theta_{x0}$ being observed.

The filter for the first example is placed immediately in front of the detector 16 and is a variant of a Fabry-Perot interferometer shown in FIG. 18, where the Fabry-Perot plates are not adjusted plane parallel but with a specific wedge angle $\alpha$. The transmission function $T_f$ for the filter is given by $$T_f(\Theta_x, \lambda) = \frac{1}{\left(1 + F\sin^2\frac{\delta}{2}\right)} \tag{58}$$

where F is related to the finesse $\mathcal{F}$ of the interferometric filter system, $$\delta = 2n'k(h\cos\Theta_x + f_1\tan\alpha\sin\Theta_x), \tag{59}$$

n' is the index of refraction for medium in the Fabry-Perot interferometer cavity, and h is the cavity separation at $\Theta_x = 0$ (cf. Section 7.6.1, Born and Wolf, *Principles of Optics*, Pergamon Press, 1959). The factor F can be written as $$F = \frac{4R}{(1-R)^2} \tag{60}$$

and $$F = \frac{4}{\pi^2}\mathcal{F}^2 \tag{61}$$

where R is the reflectivity of the interferometer cavity surfaces. The finesse is the ratio of the wavelength spacing $\Delta\lambda_{fsr}$, the free spectral range, between contiguous orders of the Fabry-Perot interferometer and the full-width at half maximum (FWHM) $\Delta\lambda$ of the respective transmission peaks.

The wavelength of a passband $\lambda_q$ is obtained from equations (58) and (59) as $$\lambda_q = 2n'\left(\frac{h\cos\Theta_x + f_1\tan\alpha\sin\Theta_x}{q}\right) \tag{62}$$

where q is an integer. By requiring that h=0 when $\Theta_x=0$, the relation between $\Theta_x$ and $\lambda_q$ is $$\lambda_q = \left(\frac{2n'f_1\tan\alpha}{q}\right)\sin\Theta_x. \tag{63}$$

For $\alpha$ chosen so that $$\alpha = \tan^{-1}\left(\frac{d_0}{n'f_1}\right), \tag{64}$$

the $\lambda_q - \Theta_x$ relation becomes $$k_q d_0 \sin\Theta_x = q\pi \tag{65}$$

where $k_q = (2\pi/\lambda_q)$. For each transmission peak, $$\Delta\lambda_q = \left(\frac{\Delta\lambda_{fsr}}{\mathcal{F}}\right). \tag{66}$$

From the definition of $\mathcal{F}$ and the definition of $\Delta\lambda_{fsr}$, $$\Delta\lambda_{fsr} = \left(\frac{\lambda_q}{q}\right), \tag{67}$$

and using an imposed restriction $\sigma_k = (\Delta\lambda_q/2)$, we have for $\sigma_k/k$ the result $$\left(\frac{\sigma_k}{k}\right) = \left(\frac{1}{2q}\right)\left(\frac{1}{\mathcal{F}}\right). \tag{68}$$

Thus, the square root of the second term in equation (50) is $$(kd_0\sin\Theta_{x0})\left(\frac{\sigma_k}{k}\right) = \left(\frac{\pi}{2}\right)\left(\frac{1}{\mathcal{F}}\right). \tag{69}$$

The condition set by equation (52) will be satisfied when $$\mathcal{F} = \left(\frac{\pi}{2}\right)m \qquad (70)$$

and $$\mathcal{F} \gtrsim m^2. \qquad (71)$$

This is achieved for the example case of m=2 (cf. equation (60)) with a $$R \gtrsim \frac{1}{2}. \qquad (72)$$

The remaining point to be considered is the $(kd_0)^2[\sigma(\sin \Theta_{x0})]^2$ term of equation (50). The values of $\Theta_{x0}$ are given by $$k_q d_0 \sin[\Theta_{x0}(p)] = \pi p - \chi''_1 \qquad (73)$$

where p is an integer. Noting that when the filter precedes the detector, $k_q = k_p$. Using this relation and combining equations (65) and (73) to eliminate $k_q$ and $k_p$ leads to the following equation:

$$\sin[\Theta_{x0}(p)] = \frac{p}{q}\left(1 - \frac{\chi''_1}{p\pi}\right)\sin\Theta_x. \qquad (74)$$

The $$\mathrm{sinc}^2\left\{\frac{k_q d_0}{2}\{\sin[\Theta_{x0}(p)] - \sin\Theta_x\}\right\}$$

factor in equation (57) permits non-negligible values for $T^t_{ps}$ when $$\left|\frac{k_q d_0}{2}\{\sin[\Theta_{x0}(p)] - \sin\Theta_x\}\right| \lesssim \frac{\pi}{2} \qquad (75)$$

as shown from information in Table 1. Substitution for $k_q d_0$ in equation (75) the value expressed by equation (65) gives $$|\sin[\Theta_{x0}(p)] - \sin\Theta_x| \lesssim \frac{\sin\Theta_x}{q} \qquad (76)$$

or $$\sin\Theta_x\left(1 - \frac{1}{q}\right) \lesssim \sin[\Theta_{x0}(p)] \lesssim \sin\Theta_x\left(1 + \frac{1}{q}\right). \qquad (77)$$

Combining equations (74) and (77) to eliminate $\Theta_{x0}(p)$, we find that $$\left(1 - \frac{1}{q}\right) \lesssim \left(\frac{p}{q}\right)\left(1 - \frac{\chi''_1}{p\pi}\right) \lesssim \left(1 + \frac{1}{q}\right). \qquad (78)$$

The variance of $\sin[\Theta_{x0}(p)]$, $<\sigma\{\sin[\Theta_{x0}(p)]\}>^2$, can be evaluated from equations (74), (76), and (78). The result for $\sigma\{\sin[\Theta_{x0}(p)]\}$ is $$\sigma\{\sin[\Theta_{x0}(p)]\} = \frac{\sin\Theta_x}{2q}. \qquad (79)$$

Substituting the value for $\sigma[\Theta_{x0}(p)]$ given by equation (79) into equation (51) with $k=k_q$ gives the result $$\left(\frac{k_d d_0 \sin\Theta_x}{2q}\right) = \frac{1}{m}. \qquad (80)$$

Combining equations (65) and (80) to eliminate $k_q d_0 \sin\Theta_x$, the condition $$m \geq \frac{2}{\pi} \qquad (81)$$

is obtained. This condition is met when equation (48) condition is met, namely $m \geq 2$.

This system using the Fabry-Perot interferometer of FIG. 18 is relatively more complex as a total system than one when not using the Fabry-Perot filter but it does offer a system with a greater broadband operation than possible with a Variant 1 type system.

However, the reference grid pattern discussed earlier that can be used in metrology has been lost as evident from equation (74): all values of $\Theta_{x0}$ are accessible by the appropriate selection of $\Theta_x$ which is not the case by a Variant 1 type system. The filter for the second example will usually be in front of lenses 30 and 40 in FIGS. 7 and 8, respectively. If interested in observing M contiguous peaks in $T^t_{ps}$ of equation (43), then for the case where M is an odd integer, $$k_q d_0 \sin\left[\left(\frac{M-1}{2}\right)\Theta_{x0}\right] = q\pi = \left(q' + \frac{M-1}{2}\right)\pi \qquad (82)$$

where q is an integer and $k_{q'}$ determined by the filter. For a Fabry-Perot filter with plane parallel etalon plates, $$k_{q'} n' d \cos\Theta_x = q'\pi \qquad (83)$$

where d is the separation of the etalon plates. Combining the equations (82) and (83) to eliminate $k_{q'}$, we obtain $$\sin\left[\left(\frac{M-1}{2}\right)\Theta_{x0}\right] = \left(\frac{n' d \cos\Theta_x}{d_0}\right)\left(1 + \frac{M-1}{2q'}\right). \qquad (84)$$

If n' is chosen so that $$n'd = d_0 \qquad (85)$$

then $$\sin\left[\left(\frac{M-1}{2}\right)\Theta_{x0}\right] = \left(1 + \frac{M-1}{2q'}\right)\cos\Theta_x. \qquad (86)$$

Calculating the $\sigma<\sin\{[(M-1)/2]\Theta_{x0}\}>$ from equation (79) where q' is the variable, we obtain $$\sigma\left\{\sin\left[\left(\frac{M-1}{2}\right)\Theta_{x0}\right]\right\} = \left(\frac{M-1}{2}\right)\left(\frac{\sigma_{q'}}{\bar{q}^2}\right)\cos\Theta_x \qquad (87)$$

where $\bar{q}$ is the mean value of q'. But in order to maintain a relatively high sensitivity, we must require that $$\sigma\left\{\sin\left[\left(\frac{M-1}{2}\right)\Theta_{x0}\right]\right\} \gtrsim \left(\frac{\pi}{4kd_0}\right) \quad (88)$$

where $\pi/kd_0$ is the spacing in $\sin \Theta_{x0}$ between contiguous peaks. The restriction on $\sigma_{q'}$ as a result of equations (87) and (88) is $$\sigma_{q'} = \left(\frac{\bar{q}}{2(M-1)\cos\Theta_x}\right), \quad M \gtrsim 3. \quad (89)$$

The interpretation of equation (89) is that for a detector centered on peak $\bar{q}$ and recording a total of M transmission or reference grid peaks, the standard deviation of the number of passbands allowed from the Fabry-Perot is $\bar{q}/(2M)$, assuming $\cos \Theta_x=1$. This can be furnished by a single passband prefilter with a $$\left(\frac{\sigma_k}{k}\right) = \left(\frac{\sigma_{q'}}{\bar{q}}\right) = \left(\frac{1}{2(M-1)}\right). \quad (90)$$

If M is an even integer, then the right hand side of equation (90) is $1/(2M)$.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A method for discriminating an in-focus image from an out-of-focus image, comprising the steps of:
    (a) collimating light rays emanating from a point in an object plane in an object to produce collimated rays;
    (b) focusing the collimated rays onto a spot in an in-focus image plane;
    (c) detecting light impinging on the spot to measure the intensity thereof;
    (d) shifting the phase of a first portion of the collimated rays to produce a first quantity of phase-shifted rays and also shifting the phase of a second portion of the collimated rays to produce a second quantity of phase-shifted rays;
    (e) focusing the first and second quantities of phase-shifted rays onto the spot;
    (f) detecting light including the first and second quantities of phase-shifted rays impinging on the spot and remaining rays impinging on the spot to measure the intensity thereof; and
    (g) subtracting the intensities measured in step (f) from the intensities measured in step (c) to cancel the effects of light from the out-of-focus image impinging on the spot to obtain an accurate representation of the object at the point in the object plane.

2. The method of claim 1 wherein the point in the object plane from which the light rays emanate in step (a) is a pinhole.

3. The method of claim 1 wherein the point in the object plane from which the light rays emanate in step (a) is one of a plurality of like points along a line in a slit, step (a) including simultaneously collimating light rays emanating from all of the points.

4. The method of claim 1 wherein the point in the object plane from which the light rays emanate in step (a) is one of a plurality of like points located throughout a two-dimensional portion of the object plane, step (a) including simultaneously collimating light rays emanating from all of the points.

5. The method of claim 1 wherein the light rays emanating from the point in the object plane are incident light rays reflected from object material at the point or scattered by object material at the point.

6. The method of claim 1 wherein the light emanating from the point in the object plane is thermal radiation emitted by object material at the point.

7. The method of claim 1 wherein the light rays emanating from the point in the object plane are emitted therefrom due to stimulation of object material at the point.

8. The method of claim 1 wherein the light rays emanating from the point in the object plane are transmitted through object material at the point.

9. The method of claim 1 wherein the light rays emanating from the point in the object plane are transmitted through a turbulent medium between the point and the spot of focused rays in the in-focus image plane.

10. The method of claim 1 wherein the intensities measured in steps (c) and (d) are combined using speckle imaging techniques.

11. The method of claim 1 wherein step (d) is performed using rectangular phase shifters.

12. The method of claim 1 wherein step (d) is performed using annular, circular phase shifters or segmented sections thereof.

13. The method of claim 1 wherein the first and second quantities of phase-shifted rays are shifted $+\pi/2$ radians and $-\pi/2$ radians, respectively.

14. The method of claim 1 wherein step (d) is performed using broadband phase shifters.

15. The method of claim 1 wherein the subtracting of step (g) is performed in accordance with:

$$T^t_{ps}(z) = \left(\frac{1}{2}\right)[T_{ps}(z, \chi'_2 = 0) - T_{ps}(z, \chi'_2 = \pi)]$$

wherein: $T^t_{ps}(z,\chi'_2)$ is the tomographic point source transfer function, $T_{ps}(z,\chi'_2)$ is the point source transfer function, $z$ is the out-of-focus distance defined in FIG. 1, and $\chi'_2$ is the phase shift used in step (d) to produce first and second quantities of phase-shifted rays.

16. An object illumination method for use in conjunction with tomographic analysis, the method comprising the steps of:
    (a) collimating radiation from a source and directing the collimated radiation onto a grid;
    (b) collimating rays emanating from a point of the grid to produce collimated rays;
    (c) focusing the collimated rays onto object material at a point in an object plane, to thereby illuminate such object material;
    (d) operating on rays emanating from the illuminated object material to image such rays onto a spot in an image plane and measuring the intensity of the imaged rays;
    (e) shifting the phases of first and second quantities of the collimated rays;
    (f) focusing the phase-shifted first and second quantities of the collimated rays and remaining non-phase-shifted rays onto the object material, to thereby illuminate it;

(g) operating on phase-shifted rays and non-phase-shifted rays emanating from the illuminated object material to image such rays onto the spot and measuring the intensity of such imaged rays; and (h) combining the intensities measured in steps (d) and (g) to produce an accurate image of the illuminated object material.

17. The object illumination method of claim 16 wherein the combining of step (h) includes subtracting some of the intensities measured in steps (d) and (g) from others.

18. The object illumination method of claim 16 wherein step (d) includes:

i. collimating and redirecting rays emanating from the illuminated object material;

ii. focusing the collimated and redirected rays onto the spot in an in-focus image plane;

iii. detecting the rays impinging on the spot to measure the intensity thereof;

iv. shifting the phase of a first portion of the collimated and directed rays to produce a first quantity of phase-shifted rays and also shifting the phase of a second portion of the collimated and directed rays to produce a second quantity of phase-shifted rays;

v. focusing the first and second quantities of phase-shifted rays and remaining non-phase-shifted rays onto the spot;

vi. detecting the phase-shifted and non-phase-shifted rays impinging on the spot to measure the intensity thereof; and vii. combining the intensities measured in steps (iii) and (vi).

19. The object illumination method of claim 18 wherein step (g) includes:

viii. collimating and directing rays emanating from the illuminated object material;

ix. focusing the collimated and directed rays of step (viii) onto the spot in the in-focus image plane;

x. detecting the rays impinging on the spot as recited in step (ix) to measure the intensities thereof;

xi. shifting the phase of a first portion of the collimated and directed rays of step (viii) to produce a third quantity of phase-shifted rays and also shifting the phase of a second portion of the collimated and directed rays to produce a fourth quantity of phase-shifted rays;

xii. focusing the third and fourth quantities of phase-shifted rays and remaining non-phase-shifted rays onto the spot;

xiii. detecting the phase-shifted rays and remaining non-phase-shifted rays of step (xii) impinging on the spot to measure the intensities thereof; and xiv. combining the intensities measured in steps (x) and (xiii).

20. The object illumination method of claim 16, including, after step (h), shifting one of the grid and the object material relative to the other to illuminate portions of the object material not previously illuminated during steps (c) and (f), and then repeating steps (a) through (h).

21. The method of claim 16 wherein the light rays in steps (b) and (c) are transmitted through a turbulent medium.

22. A method for discriminating an in-focus image from an out-of-focus image, comprising the steps of:

(a) collimating radiation emanating from a point in an object plane in an object to produce collimated radiation;

(b) focusing the collimated radiation onto a spot in an in-focus image plane;

(c) detecting radiation impinging on the spot to measure the intensity thereof;

(d) shifting the phase of a first portion of the collimated radiation to produce a first quantity of phase-shifted radiation and also shifting the phase of a second portion of the collimated radiation to produce a second quantity of phase-shifted radiation;

(e) focusing the first and second quantities of phase-shifted radiation and remaining non-phase-shifted radiation onto the spot;

(f) detecting the first and second quantities of phase-shifted radiation and remaining non-phase-shifted radiation impinging on the spot to measure the intensity thereof; and (g) combining the intensities measured in step (f) with the intensities measured in step (c) to cancel the effects of radiation emanating from the out-of-focus image impinging on the spot to obtain an accurate representation of the object at the point in the object plane.

23. The method of claim 22 including:

i. passing the radiation focused on the spot recited in steps (b) and (e) through and array of phase shifters before focusing such radiation on the spot;

ii. causing the phase shifters to produce a first pattern of phase shifts of the radiation before it reaches the spot recited in step (b); and iii. causing the phase shifters to produce a second pattern of phase shifts, including the phase shifts of step (d), on the radiation after step (c) and before the radiation reaches the spot in step (e).

24. The method of claim 23 wherein:

(1) step (ii) includes causing the phase shifters to sequentially produce a first plurality of phase shift patterns and step (c) includes cumulatively detecting the resulting phase-shifted patterns of radiation impinging on the spot and then reading out a resulting intensity before performing step (iii);

(2) step (iii) includes causing the phase shifters to sequentially produce a second plurality of phase shift patterns and step (f) includes cumulatively detecting the resulting phase-shifted pattern of radiation impinging on the spot and then reading out a resulting intensity; and (3) step (g) includes combining the intensity obtained in step (2) with the intensity obtained in step (3).

25. The method of claim 22 wherein steps (c) and (f) include using CCD detectors to detect radiation impinging on the spot.

26. The method of claim 22 wherein steps (c) and (f) include using photographic film to detect radiation impinging on the spot.

27. The method of claim 22 including providing an apodizing layer on a surface of the phase shifters.

28. A method for discriminating images from out-of-focus light incident on points in the object from images arising from in-focus light incident on points in the object, comprising the steps of:

(a) collimating rays of light from a light source and directing them onto a grid;

(b) collimating light rays emanating from a point of the grid to produce a first quantity of collimated rays;

(c) focusing the first quantity of collimated rays onto a point in an object plane in the object;

(d) collimating light rays emanating from the point in the object plane in the object to produce collimated rays;

(e) focusing the collimated rays onto a spot in an in-focus image plane;

(f) detecting light impinging on the spot to measure the intensity thereof;

(g) shifting the phase of a first portion of the first quantity of collimated rays emanating from the point in the object plane to produce a first quantity of phase-shifted rays and also shifting the phase of a second portion of the first quantity of collimated rays to produce a second quantity of phase-shifted rays;

(h) focusing the collimated rays emanating from the point onto the spot in the in-focus image plane;

(i) detecting light impinging on the spot to measure the intensities thereof; and (j) subtracting the intensities measured in step (i) from the intensities measured in step (f) to thereby effectively cancel the effects of out-of-focus light in the in-focus image plane.

29. The method of claim 28 including the further steps of causing the light rays recited in step (d) to emanate from the point in the object plane by performing the steps of:

i. collimating rays of light from the light source and directing them onto the grid;

ii. after performing steps (a) through (j), laterally shifting the grid and then repeating steps (b) through (f); and iii. combining the two representations obtained by the subtracting of step (j) to provide a more accurate representation including low spatial frequency information lost in the subtracting of step (j).

30. A method for discriminating an in-focus image from an out-of-focus image, comprising the steps of:

(a) collimating light rays emanating from a point in an object plane in an object to produce collimated rays;

(b) splitting the collimated rays into first and second quantities of collimated rays;

(c) focusing the first quantity of collimated rays onto a first spot in a first in-focus image plane, and focusing the second quantity of collimated rays onto a second spot in a second in-focus image plane;

(d) detecting light impinging on the first spot to measure the intensity thereof, and detecting light impinging on the second spot to measure the intensity thereof;

(e) shifting the phase of a first portion of the first quantity of collimated rays to produce a first quantity of phase shifted rays and also shifting the phase of a second portion of the first quantity of collimated rays, to produce a second quantity of phase-shifted rays, and shifting the phase of a first portion of the second quantity of collimated rays to produce a third quantity of phase-shifted rays and also shifting the phase of a second portion of the second quantity of collimated rays, to produce a fourth quantity of phase-shifted rays;

(f) focusing the first and second quantities of phase-shifted rays and remaining non-phase-shifted rays of the first quantity of collimated rays onto the first spot, and focusing the third and fourth quantities of phase-shifted rays and remaining non-phase-shifted rays of the second quantity of collimated rays onto the second spot;

(g) detecting light including the first and second quantities of phase-shifted rays and non-phase-shifted rays impinging on the first spot to measure the intensity thereof, and detecting light including the third and fourth quantities of phase-shifted rays and non-phase-shifted rays impinging on the second spot to measure the intensity thereof; and (h) subtracting the intensities measured in step (g) from the intensities measured in step (d), respectively, to cancel the effects of out-of-focus light and simultaneously obtain accurate representations of the object at the point in the object plane.

31. A system for discriminating an in-focus image from an out-of-focus image, comprising in combination:

(a) a collimating lens positioned to collimate light rays emanating from a point in an object plane in an object to produce collimated rays;

(b) a focusing lens positioned to focus the collimated rays onto a spot in an in-focus image plane;

(c) a detector positioned to detect light impinging on the spot to measure the intensity thereof;

(d) a plurality of phase shifters positioned between the object plane and the in-focus image plane and adapted to shift the phase of a first portion of the collimated rays to produce a first quantity of phase shifted rays and also shift the phase of a second portion of the collimated rays to produce a second quantity of phase shifted rays;

(e) the detector detecting light including the first and second quantities of phase shifted rays impinging on the spot and remaining rays impinging on the spot to measure the intensity thereof; and (f) a computer adapted to receive and subtract the intensities measured of the first and second quantities of phase shifted rays impinging on the spot from the intensities measured of light impinging on the spot before shifting the phases of the first and second quantities of phase shifted rays to cancel the effects of light from the out-of-focus image impinging on the spot to obtain an accurate representation of the object at the point in the object plane.

32. An object illumination system for use in conjunction with tomographic analysis, the system comprising in combination:

(a) a first collimating lens positioned to collimate radiation from a source and direct the collimated radiation onto a grid;

(b) a second collimating lens positioned to collimate rays emanating from a point of the grid to produce collimated rays;

(c) a focusing lens positioned to focus the collimated rays onto object material at a point in an object plane, to thereby illuminate such object material;

(d) an imaging system receiving rays emanating from the illuminated object material, imaging such rays onto a spot in an image plane, and measuring the intensity of the imaged rays;

(e) a plurality of phase shifters positioned to shift the phases of first and second quantities of the collimated rays, the focusing lens focusing the phase-shifted first and second quantities of the collimated rays onto the object material, to thereby illuminate it;

(f) the imaging system operating on phase-shifted and non-phase-shifted rays emanating from the illuminated object material to image such rays onto the spot and measuring the intensity of such imaged rays; and (g) a computer adapted to receive and combine the intensities measured of the imaged rays before and after the shifting of the phases of the first and second quantities of the collimated rays to cancel effects of out-of-focus images of the grid and produce an accurate image of the illuminated object material in the object plane.

33. A system for discriminating an in-focus image from an out-of-focus image, comprising in combination:
- (a) a collimating lens positioned to collimate radiation emanating from a point in an object plane in an object to produce collimated radiation;
- (b) a focusing lens positioned to focus the collimated radiation onto a spot in an in-focus image plane;
- (c) a detector adapted to detect radiation impinging on the spot to measure the intensity thereof;
- (d) a phase shifter adapted to shift the phase of a first portion of the collimated radiation to produce a first quantity of phase shifted radiation and to shift the phase of a second portion of the collimated radiation to produce a second quantity of phase shifted radiation, the focusing lens focusing the first and second quantities of phase shifted radiation onto the spot, the detector detecting the first and second quantities of phase-shifted radiation and non-phase-shifted impinging on the spot to measure the intensities thereof; and
- (e) a computed adapted to receive and combine the intensities measured of the radiation impinging on the spot before and after the shifting of the first and second quantities of phase shifted radiation to cancel the effects of radiation emanating from the out-of-focus image impinging on the spot to obtain an accurate representation of the object at the point in the object plane.

34. A system for discriminating an in-focus image from an out-of-focus image, comprising in combination:
- (a) a collimating lens positioned to collimate light rays emanating from a point in an object plane in an object to produce collimated rays;
- (b) a splitter positioned to split the collimated rays into first and second quantities of collimated rays;
- (c) a first lens positioned to focus the first quantity of collimated rays onto a first spot in a first in-focus image plane, and a second lens positioned to focus the second quantity of collimated rays onto a second spot in a second in-focus image plane;
- (d) a first detector adapted to detect light impinging on the first spot to measure the intensity thereof, and a second detector adapted to detect light impinging on the second spot to measure the intensity thereof;
- (e) a first phase shifter adapted to shift the phase of a first portion of the first quantity of collimated rays to produce a first quantity of phase shifted rays and also shifting the phase of a second portion of the first quantity of collimated rays, to produce a second quantity of phase shifted rays, and a second phase shifter adapted to shift the phase of a first portion of the second quantity of collimated rays to produce a third quantity of phase shifted rays and also shifting the phase of a second portion of the second quantity of collimated rays, to produce a fourth quantity of phase shifted rays;
- (f) the first lens focusing the first and second quantities of phase shifted rays and remaining non-phase-shifted rays of the first quantity of collimated rays onto the first spot, and the second lens focusing the third and fourth quantities of phase shifted rays and remaining non-phase-shifted rays of the second quantity of collimated rays onto the second spot;
- (g) the first detector being adapted to detect light including the first and second quantities of phase shifted rays and remaining non-phase-shifted rays impinging on the first spot to measure the intensity thereof, and the second detector being adapted to detect light including the third and fourth quantities of phase shifted rays and remaining non-phase-shifted rays impinging on the second spot to measure the intensity thereof; and
- (h) a computer adapted to receive and combine the intensities measured before and after the phase shifting to cancel the effects of out-of-focus light and simultaneously obtain accurate representations of the object at the point in the object plane.

35. A system for discriminating images from out-of-focus light incident on points in an object from images arising from in-focus light incident on points in the object, comprising in combination:
- (a) a first collimating lens positioned to collimate rays of light emanating from a light source and directing them onto a grid;
- (b) a second collimating lens positioned to collimate light rays emanating from a point of the grid to produce a first quantity of collimated rays;
- (c) a first focusing lens positioned to focus the first quantity of collimated rays onto a point in an object plane in the object;
- (d) the second collimating lens collimating light rays emanating from the point in the object plane in the object to produce collimated rays;
- (e) a second focusing lens positioned to focus the collimated rays emanating from the point in the object plane and collimated by the second collimating lens onto a spot in an in-focus image plane;
- (f) a detector positioned to detect light impinging on the spot to measure the intensity thereof;
- (g) a phase shifter positioned to shift the phase of a first portion of the first quantity of collimated rays emanating from the point in the object plane to produce a first quantity of phase shifted rays and also to shift the phase of a second portion of the first quantity of collimated rays to produce a second quantity of phase shifted rays;
- (h) the second focusing lens focusing the collimated rays emanating from the point onto the spot in the in-focus image plane;
- (i) the detector detecting light impinging on the spot to measure the intensities thereof; and
- (j) a computer adapted to receive and combine the intensities measured by the detector before and after the shifting of the phase of the first quantity of collimated rays to cancel effects of out-of-focus images and produce an accurate image of the illuminated object material in the object plane.

36. The system of claim 35 including a grid translator adapted to laterally translate the grid, the computer being adapted to combine two representations of the object at the point in the object plane obtained by the combining before and after the lateral translating, respectively, to provide a more accurate image of the illuminated object material in the object plane including low spatial frequency information lost in the combining before the lateral translating.

37. A system for discriminating an in-focus image from an out-of-focus image, comprising in combination:
- (a) a collimating lens positioned to collimate light rays emanating from a first point in a first object plane in an object to produce collimated rays and to approximately collimate light rays emanating from a second point in a second object plane in the object to produce approximately collimated rays;
- (b) a splitter positioned to split the collimated rays into first and second quantities of collimated rays and first and second quantities of approximately collimated rays;

(c) a first lens positioned to focus the first quantity of collimated rays onto a first spot in a first in-focus image plane, and a second lens positioned to focus the second quantity of approximately collimated rays onto a second spot in a second in-focus image plane;

(d) a first detector adapted to detect light impinging on the first spot to measure the intensity thereof, and a second detector adapted to detect light impinging on the second spot to measure the intensity thereof;

(e) a first phase shifter adapted to shift the phase of a first portion of the first quantity of collimated rays to produce a first quantity of phase shifted rays and also shifting the phase of a second portion of the first quantity of collimated rays, to produce a second quantity of phase shifted rays, and a second phase shifter adapted to shift the phase of a first portion of the second quantity of approximately collimated rays to produce a third quantity of phase shifted rays and also shifting the phase of a second portion of the second quantity of approximately collimated rays, to produce a fourth quantity of phase shifted rays;

(f) the first lens focusing the first and second quantities of phase shifted rays onto the first spot, and the second lens focusing the third and fourth quantities of phase shifted rays onto the second spot;

(g) the first detector being adapted to detect light including the first and second quantities of phase-shifted rays and also non-phase-shifted rays impinging on the first spot to measure the intensity thereof, and the second detector being adapted to detect light including the third and fourth quantities of phase-shifted rays and also non-phase-shifted rays impinging on the second spot to measure the intensity thereof; and (h) a computer adapted to receive and combine the intensities measured before and after the phase shifting to cancel the effects of out-of-focus light and simultaneously obtain accurate representations of the object at the first point in the first object plane and the second point in the second object plane.

* * * * *